(12) United States Patent
Amemiya et al.

(10) Patent No.: US 7,813,640 B2
(45) Date of Patent: Oct. 12, 2010

(54) OPTICAL CONNECTION SWITCHING APPARATUS AND MANAGEMENT CONTROL UNIT THEREOF

(75) Inventors: Kouichirou Amemiya, Kawasaki (JP); Takao Naito, Kawasaki (JP); Toru Katagiri, Kawasaki (JP); Toshiki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 913 days.

(21) Appl. No.: 11/081,056

(22) Filed: Mar. 16, 2005

(65) Prior Publication Data

US 2005/0232629 A1    Oct. 20, 2005

Related U.S. Application Data

(63) Continuation-in-part of application No. 10/873,257, filed on Jun. 23, 2004, now abandoned.

(30) Foreign Application Priority Data

Mar. 30, 2004  (JP) .............................. 2004-100796
Jan. 27, 2005  (JP) .............................. 2005-020129

(51) Int. Cl.
    *H04J 14/00* (2006.01)
(52) U.S. Cl. .............................. 398/45; 398/46; 398/49
(58) Field of Classification Search .............. 398/45–57
    See application file for complete search history.

(56) References Cited

U.S. PATENT DOCUMENTS 5,894,481 A    4/1999  Book .......................... 370/412
6,647,010 B1   11/2003 Ford et al. .................... 370/391
6,813,407 B2 * 11/2004 Ramaswami et al. .......... 385/16
6,882,765 B1 *  4/2005 Erickson et al. ............... 385/16
7,151,893 B2   12/2006 Hayashi et al.
7,266,295 B2 *  9/2007 Ovadia et al. .................. 398/51
2002/0034354 A1 3/2002 Hayashi et al. ................ 385/17
2003/0009307 A1 1/2003 Mejia et al. .................. 702/125

(Continued)

FOREIGN PATENT DOCUMENTS

JP    HEI 10-135952    5/1998

(Continued)

OTHER PUBLICATIONS

Office Action issued in corresponding Japanese application No. 2005-020129 on Sep. 15, 2009.

*Primary Examiner*—Dzung D Tran
(74) *Attorney, Agent, or Firm*—Staas & Halsey LLP

(57) ABSTRACT

An optical connection switching according to the present invention comprises an optical connection switching facility capable of making a connection between any one of optical input ports and any one of optical output ports, one or more optical transmitting/receiving units connected to a portion of the optical input/output ports, and management control units for controlling the optical connection switching facility to make a connection between the optical input/output port connected to the optical transmitting/receiving unit and the optical input/output port connected to equipment for acquiring and managing information on the equipment by making a communication with the equipment through the use of the optical transmitting/receiving unit. This enables acquiring the information on the equipment having an optical communication interface to be optically connected, thereby automating the connection management of the equipment.

29 Claims, 39 Drawing Sheets

U.S. PATENT DOCUMENTS

2003/0185566 A1  10/2003  Nishi et al. .................. 398/56

FOREIGN PATENT DOCUMENTS

| JP | HEI 11-65980 | 3/1999 |
| JP | 2000-209622 | 7/2000 |
| JP | 2000-341359 | 12/2000 |
| JP | 2002-95023 | 3/2002 |
| JP | 2002-111588 | 4/2002 |
| JP | 2002-232409 | 8/2002 |
| JP | 2002-374277 | 12/2002 |
| JP | 2003-289557 | 10/2003 |
| JP | 2003-298540 | 10/2003 |
| JP | 2004-40726 | 2/2004 |

* cited by examiner

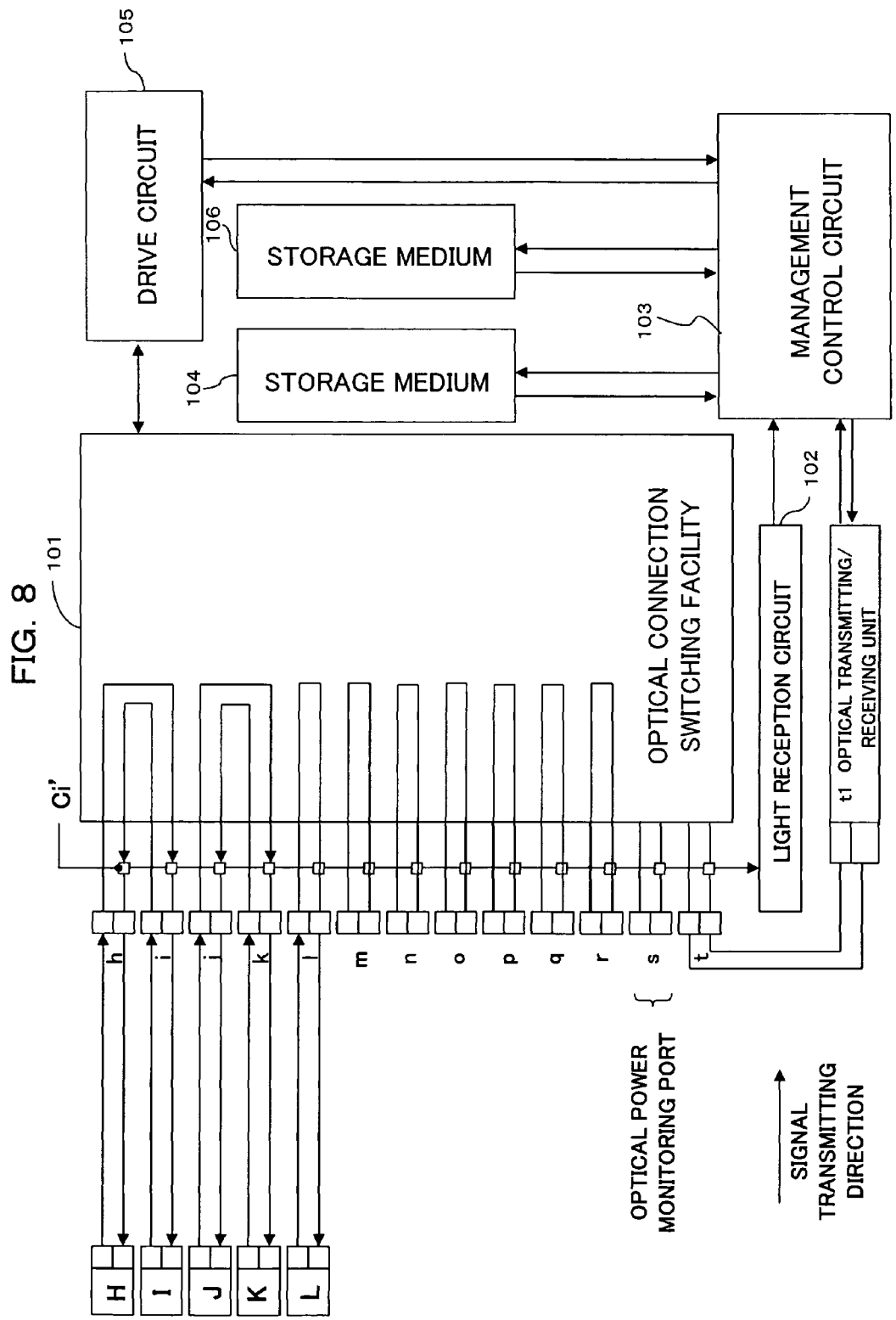

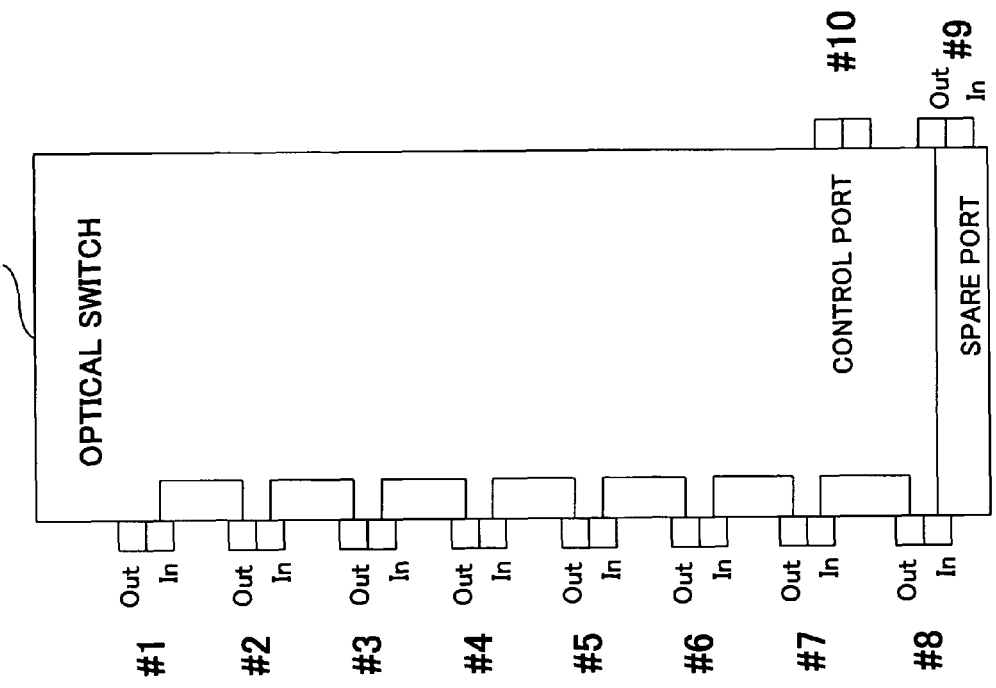

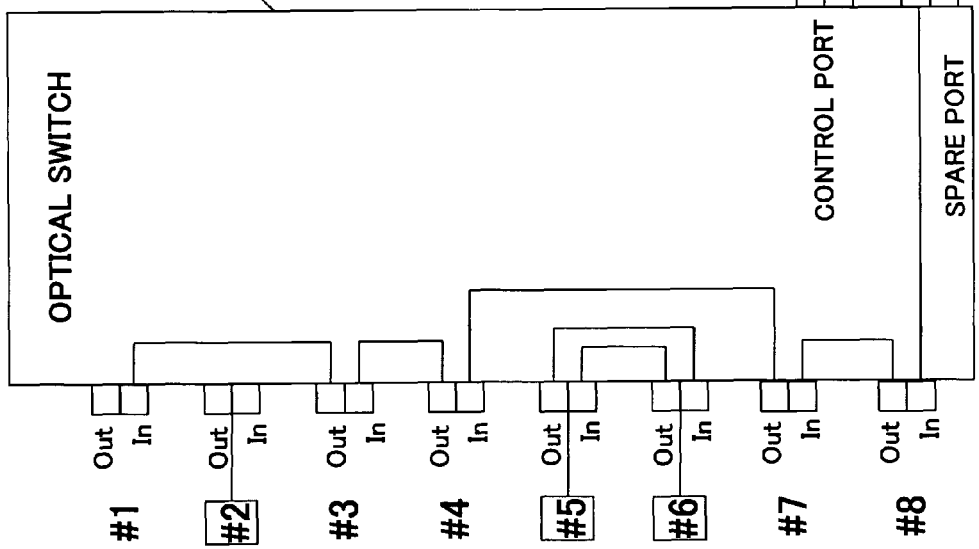

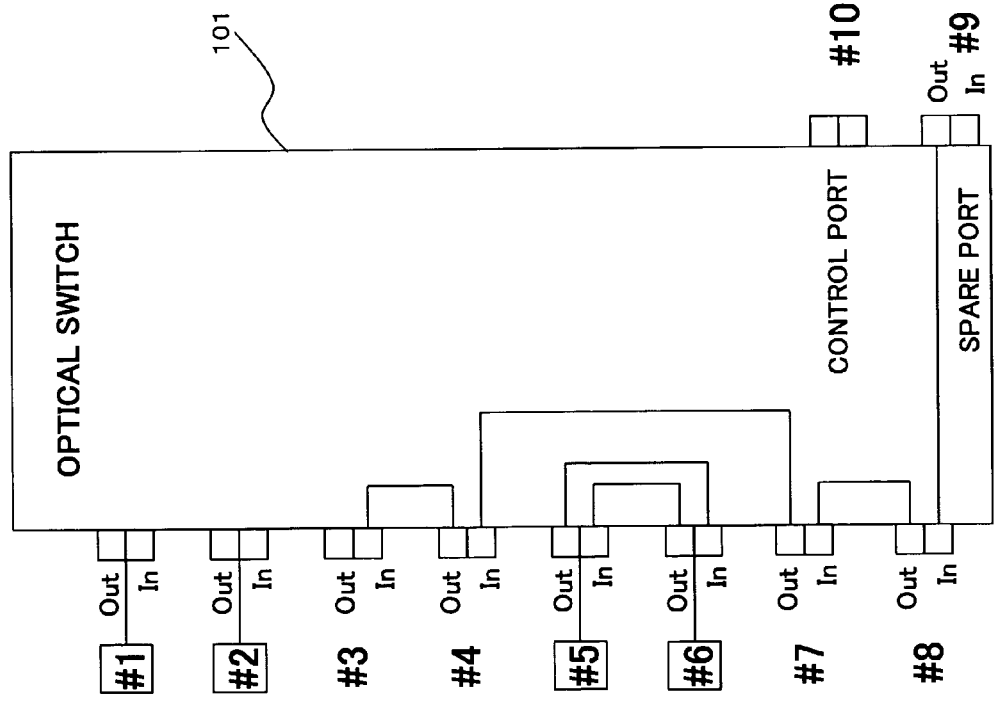

FIG. 18

| PORT NUMBER OF OPTICAL CONNECTION SWITCHING APPARATUS | PORT NUMBER OF CONNECTION DESTINATION AFTER PASSING THROUGH OPTICAL CONNECTION SWITCHING APPARATUS | CONNECTION EQUIPMENT | PORT NUMBER IN CONNECTION EQUIPMENT | TRANSMITTABLE WAVELENGTH OF EACH PORT |
|---|---|---|---|---|
| 1 | 6 | SWITCH A | 1 | $\lambda 2$ |
| 2 | 8 | SWITCH A | 2 | $\lambda 4$ |
| 3 | 7 | SWITCH A | 3 | $\lambda 3$ |
| 4 | 5 | SWITCH A | 4 | $\lambda 1$ |
| 5 | 4 | WAVELENGTH MULTIPLEXING/ DEMULTIPLEXING UNIT | 1 | $\lambda 1$ |
| 6 | 1 | WAVELENGTH MULTIPLEXING/ DEMULTIPLEXING UNIT | 2 | $\lambda 2$ |
| 7 | 3 | WAVELENGTH MULTIPLEXING/ DEMULTIPLEXING UNIT | 3 | $\lambda 3$ |
| 8 | 2 | WAVELENGTH MULTIPLEXING/ DEMULTIPLEXING UNIT | 4 | $\lambda 4$ |

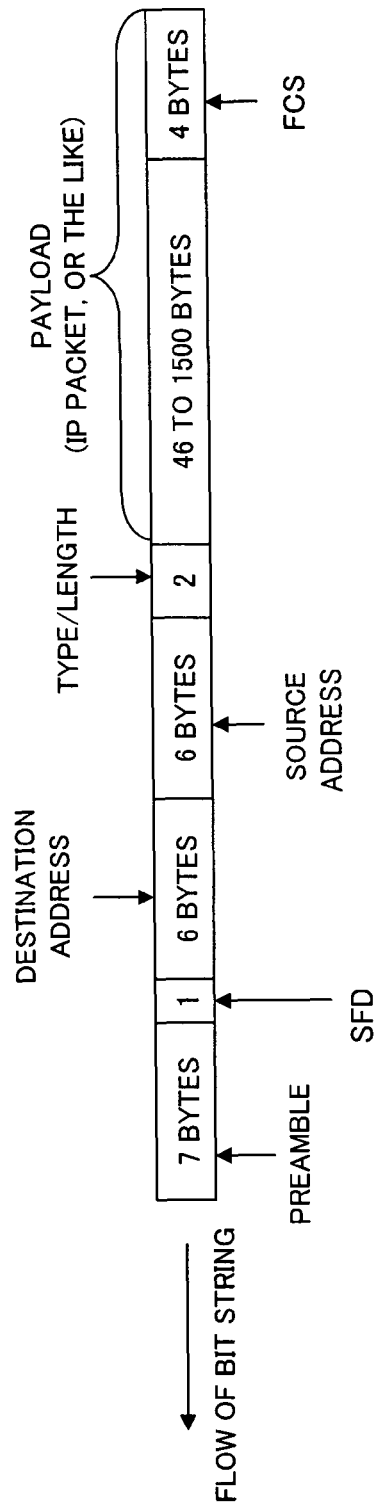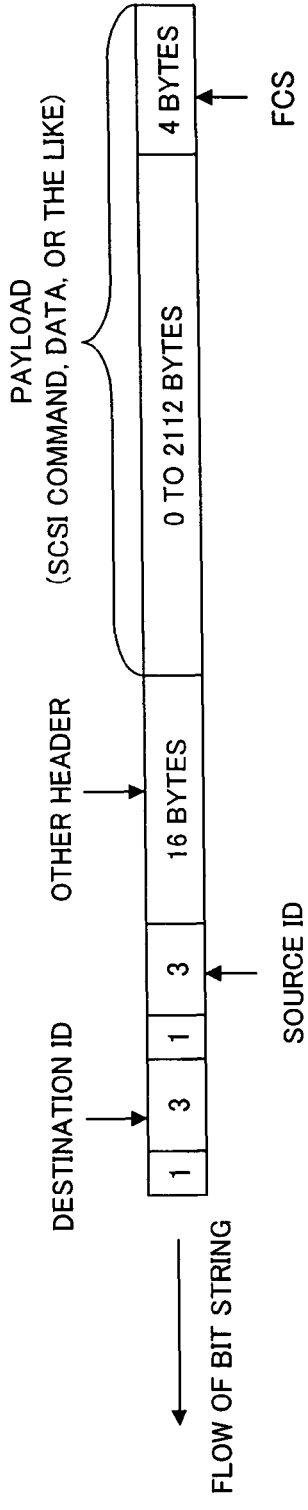

FIG. 31

DETECTION TABLE 500

| Case | 1 | 2 | 3 | 4 |
|---|---|---|---|---|
| A101 | - | - | ○ | ○ |
| A102 | - | - | ○ | ○ |
| A103 | - | - | ○ | × |
| A104 | - | - | ○ | × |
| B101 | ○ | × | - | - |
| B102 | ○ | × | - | - |
| B103 | ○ | ○ | - | - |
| B104 | ○ | ○ | - | - |
| ABNORMAL EQUIPMENT | NO | A | NO | B |

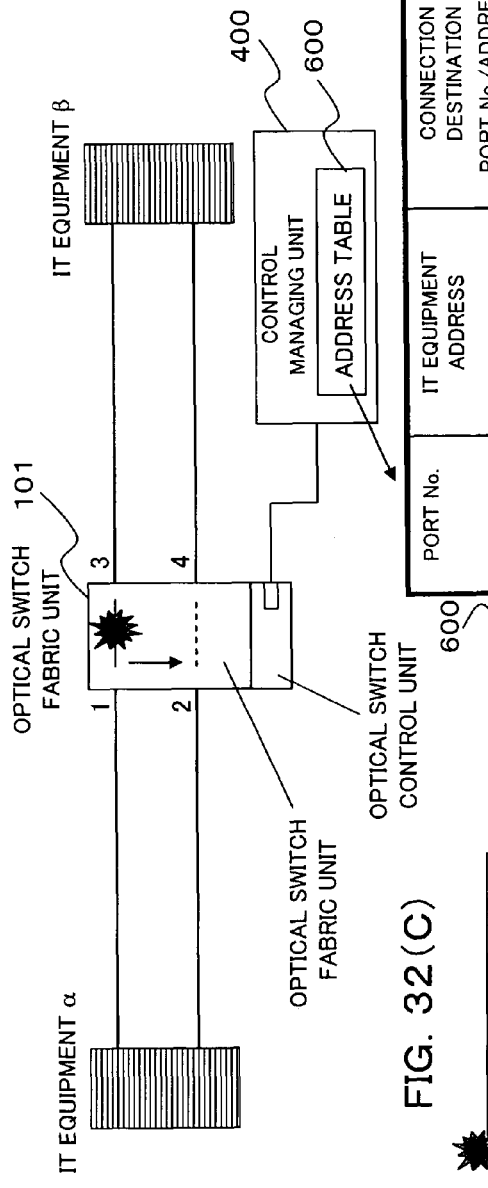

| PORT No. | IT EQUIPMENT ADDRESS | CONNECTION DESTINATION PORT No./ADDRESS | STATE OF PATH |
|---|---|---|---|
| 1 | α | 3, β | WORK 1 |
| 2 | α | — (4, β) | SPARE 1 |
| 3 | β | 1, α | WORK 2 |
| 4 | β | — (2, α) | SPARE 2 |

| PORT No. | IT EQUIPMENT ADDRESS | CONNECTION DESTINATION PORT No./ADDRESS | STATE OF PATH |
|---|---|---|---|
| 1 | α | — | — |
| 2 | α | 4, β | WORK |
| 3 | β | — | — |
| 4 | β | 2, α | WORK |

FIG. 32(C)

S31 OCCURRENCE OF TROUBLE
S32 DETECTION OF OPTICAL POWER DISCONNECTION BY POWER MONITOR IN OPTICAL CONNECTION AUTOMATIC-SWITCHING APPARATUS
S33 INQUIRY AT ADDRESS TABLE
S34 SWITCH TO SPARE-SYSTEM OPTICAL PATH
S35 REPLACEMENT OF ADDRESS TABLE

FIG. 34(A) NORMAL STATE

600A

| PORT No. | IT EQUIPMENT ADDRESS | CONNECTION DESTINATION PORT No./ADDRESS | STATE OF PATH |
|---|---|---|---|
| A-1 | α | A-3, β | WORK 1 |
| A-2 | γ | A-4, κ | WORK 2 |
| A-3 | β | A-1, α | WORK 3 |
| A-4 | κ | A-2, γ | WORK 4 |

| PORT No. | IT EQUIPMENT ADDRESS | CONNECTION DESTINATION PORT No./ADDRESS | STATE OF PATH |
|---|---|---|---|
| B-7 | α | — (B-9, β) | SPARE 1 |
| B-8 | γ | — (B-10, κ) | SPARE 2 |
| B-9 | β | — (B-7, α) | SPARE 3 |
| B-10 | κ | — (B-8, γ) | SPARE 4 |

600B

FIG. 34(B) AFTER OCCURRENCE OF TROUBLE

600A

| PORT No. | IT EQUIPMENT ADDRESS | CONNECTION DESTINATION PORT No./ADDRESS | STATE OF PATH |
|---|---|---|---|
| A-1 | α | — | — |
| A-2 | γ | A-4, κ | WORK 2 |
| A-3 | β | — | — |
| A-4 | κ | A-2, γ | WORK 4 |

| PORT No. | IT EQUIPMENT ADDRESS | CONNECTION DESTINATION PORT No./ADDRESS | STATE OF PATH |
|---|---|---|---|
| B-7 | α | B-9, β | WORK |
| B-8 | γ | — (B-10, κ) | SPARE 2 |
| B-9 | β | B-7, α | WORK |
| B-10 | κ | — (B-8, γ) | SPARE 4 |

600B

FIG. 36(A) NORMAL STATE

600A

| PORT No. | IT EQUIPMENT ADDRESS | CONNECTION DESTINATION PORT No./ADDRESS | STATE OF PATH |
|---|---|---|---|
| A-1 | α | A-3, β | WORK 1 |
| A-2 | γ | A-4, κ | WORK 2 |
| A-3 | β | A-1, α | WORK 3 |
| A-4 | κ | A-2, γ | WORK 4 |

| PORT No. | IT EQUIPMENT ADDRESS | CONNECTION DESTINATION PORT No./ADDRESS | STATE OF PATH |
|---|---|---|---|
| B-7 | α | – (B-9, β) | SPARE 1 |
| B-8 | γ | – (B-10, κ) | SPARE 2 |
| B-9 | β | – (B-7, α) | SPARE 3 |
| B-10 | κ | – (B-8, γ) | SPARE 4 |

600B

FIG. 36(B) AFTER OCCURRENCE OF TROUBLE

600A

| PORT No. | IT EQUIPMENT ADDRESS | CONNECTION DESTINATION PORT No./ADDRESS | STATE OF PATH |
|---|---|---|---|
| A-1 | α | – | – |
| A-2 | γ | – | – |
| A-3 | β | – | – |
| A-4 | κ | – | – |

| PORT No. | IT EQUIPMENT ADDRESS | CONNECTION DESTINATION PORT No./ADDRESS | STATE OF PATH |
|---|---|---|---|
| B-7 | α | B-9, β | WORK |
| B-8 | γ | B-10, κ | WORK |
| B-9 | β | B-7, α | WORK |
| B-10 | κ | B-8, γ | WORK |

MANAGEMENT USING TWO TABLES

600A

| PORT No. | IT EQUIPMENT ADDRESS | CONNECTION DESTINATION PORT-No./ADDRESS | STATE OF PATH |
|---|---|---|---|
| A-1 | α | A-3, β | WORK 1 |
| A-2 | γ | A-4, κ | WORK 2 |
| A-3 | β | A-1, α | WORK 3 |
| A-4 | κ | A-2, γ | WORK 4 |
| ... | ... | ... | ... |

600B

| PORT No. | IT EQUIPMENT ADDRESS | CONNECTION DESTINATION PORT-No./ADDRESS | STATE OF PATH |
|---|---|---|---|
| ... | ... | ... | ... |
| B-7 | α | — (B-9, β) | SPARE 1 |
| B-8 | γ | — (B-10, κ) | SPARE 2 |
| B-9 | β | — (B-7, α) | SPARE 3 |
| B-10 | κ | — (B-8, γ) | SPARE 4 |
| ... | ... | ... | ... |

FIG. 39

MANAGEMENT USING ONE TABLE BY VIRTUALLY HANDLING AS COMMON PORT OF ONE OPTICAL SWITCH — 600
400

| CORRESPONDING PORT No. | PORT No. | IT EQUIPMENT ADDRESS | CONNECTION DESTINATION PORT-No./ADDRESS | STATE OF PATH |
|---|---|---|---|---|
| A-1 | 1 | α | — | — |
| A-2 | 2 | γ | A-4, κ | WORK 2 |
| A-3 | 3 | β | — | — |
| A-4 | 4 | κ | A-2, γ | WORK 4 |
| ... | ... | ... | ... | ... |
| B-7 | 107 | α | B-9, β | WORK |
| B-8 | 108 | γ | — (B-10, κ) | SPARE 2 |
| B-9 | 109 | β | B-7, α | WORK |
| B-10 | 110 | κ | — (B-8, γ) | SPARE 4 |
| ... | ... | ... | ... | ... |

OPTICAL CONNECTION SWITCHING APPARATUS AND MANAGEMENT CONTROL UNIT THEREOF

CROSS REFERENCE TO RELATED APPLICATIONS

This application is a continuation-in-part application of application Ser. No. 10/873,257, filed Jun. 23, 2004, now abandoned.

This application is based on and hereby claims priority to Japanese Applications No. 2004-100796 filed on Mar. 30, 2004 and No. 2005-20129 filed on Jan. 27, 2005 in Japan, the contents of which are hereby incorporated by reference.

BACKGROUND OF THE INVENTION (1) Field of the Invention

The present invention relates to an optical connection (wiring) switching apparatus and a management control unit thereof, for example, an optical connection switching apparatus and a management control unit thereof suitable for the connection management in in-datacenter or in-company optical network or the like.

(2) Description of the Related Art

Along with the recent speeding-up of transmission signals and wide-spreading of networks, an optical signal network is being constructed which employs, as a transmission medium, an optical fiber having a large-bandwidth property and a low-loss property. Although the high-speed signal and the broadband transmission has been peculiar to the communications in the backbone networks so far, because of the appearance of various types of Ethernets (registered trademark), such as the Giga-bit Ethernet (GbE) and 10-Giga-bit Ethernet (10 GbE), and a fiber channel (FC), the speeding-up of transmission signals and the wide-spreading of the networks are advancing even in Ethernets such as LAN (Local Area Network) and other networks.

Along with this situation, the construction of an optical network is advancing even in a LAN using an Ethernet, a SAN (Storage Area Network) using a fiber channel and others. In such an optical network, various types of information apparatus (IT equipment) such as personal computers and a layer-2/layer-3 electric switch are connected to each other through the use of an optical fiber on a one-to-one basis, and at the construction or change of a network, there is a need to employ a facility capable of switching the optical signal path when a trouble (disorder) occurs.

For example, as the network in which these LAN and SAN exist in a state mixed, there is an in-datacenter network. In general, the optical connection in the datacenter is under management through the use of a control panel, in which optical adapters are arranged, called a patch panel and, for example, the optical path switching is realized by manually inserting/drawing fiber connectors, and the connection management is made through the tag attachment to both the ends of a fiber and the connection state recording made by the manual inputting.

Thus, as an enterprise network such as an in-datacenter network, a network has been constructed through the use of a Giga-bit Ethernet, 10-Giga-bit Ethernet, fiber channel (FC) or the like, and the transmission rate of this network has been as high as 1.0 Gbps, 10 Gbps or more and, as represented by a service such as a wide-area Ethernet, the transmission distance has been lengthened. For this reason, as the transmission medium, there has been employed an optical fiber superior in large-bandwidth property and low-loss property.

So far, the connection between IT (Information Technology) equipment and layer-2/layer-3 electric switch has been made on a one-to-one basis and, hence, there is a need to install a large number of optical fibers. Moreover, the connection management for these optical fibers has been made in the present situation. In general, the construction and change of a network system or the change of the connection of optical fibers stemming from the occurrence of a trouble lead to complicated operations such as optical fiber connection device confirmation tagging, connection diagram renewal and connection confirmation.

Such a network environment management method creates a problem in that there is a need to take a large number of processes. Moreover, inmost cases, the actual wiring operations and the network construction operations are conducted in a separate fashion and there is a need to share the information on connection devices even in remote sites.

In addition, since the signals flowing an optical fiber range widely in type, such as various Ethernets (Ethernet, Fast Ethernet, Giga-bit Ethernet, 10-Giga-bit Ethernet) and fiber channels, mainframe interfaces (OCLINK, ESCON/FICON), for the connection of equipment having these interfaces (protocol and bit rate) through an electric switch, the number of electric switches (Ethernet switch, fiber channel switch, and others) is required to be equal to the number of types of interfaces, which leads to an extremely high cost.

For this reason, as the route switching apparatus handling high-speed signals in the Giga-bit Ethernet, the fiber channel or the like, a hopeful view is taken on an optical connection switching apparatus. This optical switch was originally developed for use in a transmission apparatus of a trunk network (backbone network) and, since the route switching can be made in a state of optical signal, the optical switch does not suffer from the delay occurring in an electric switch. Moreover, since there is no need to convert an optical signal into an electric signal, it also has a transparency in that it is possible to make the route switching on arbitrary protocols and arbitrary bit-rate signal.

In this connection, as a conventional technique on the fiber channel, there are techniques proposed, for example, in Japanese Patent Laid-open Nos. HEI 10-135952 and HEI 11-65980. The technique of Japanese Patent Laid-open No. HEI 10-135952 is for providing a fiber channel exchange which mutually connects a plurality of equipment to each other through node ports (N ports) related thereto, and the technique of Japanese Patent Laid-open No. HEI 11-65980 is for, in the connection configuration using fabrics in a fiber channel interface, speeding up the response of the fabrics.

In addition, as the conventional network interface apparatus, there are the techniques proposed in Japanese Patent Laid-Open Nos. 2000-341359 and 2000-209622. The technique of Japanese Patent Laid-Open No. 2000-341359 is for providing an apparatus capable of making the re-construction of ports in a communication network efficiently at a low cost, and includes a plurality of optical ports and a plurality of electronic circuits and an electronic switch disposed between the plurality of optical ports and the plurality of electronic circuits to re-construct the connection between one selected from the plurality of optical ports and one of the electronic circuits. The technique of Japanese Patent Laid-Open No. 2000-209622 relates to a serial transmission switching system capable of coping flexibly with the addition or change of the existing transmission-rate communication equipment and the addition of new transmission-rate communication equipment.

Still additionally, as the conventional techniques related to the fiber channel and the Giga-bit Ethernet, there is a technique proposed in Japanese Patent Laid-Open No. 2002-232409. This technique relates to a pattern detecting method and apparatus for monitoring a data stream in the fiber channel, Giga-bit Ethernet and others. That is, to most interfaces, as in the case of the fast fiber channel and Giga-bit Ethernet interface, it is useful to produce a special data stream with attention being paid to a given jitter in the interface and/or the equipment or other similar deterioration characteristics. Therefore, such a test apparatus is operated at a specified time of the data stream.

Meanwhile, for incorporating these network apparatus into a system, a redundant configuration is employed in most cases. In the case of routers acting as a network apparatus, information are interchanged between the routers in order to grasp states. Companies have presented diverse protocols for placing the routers into a redundant condition by interchanging the information.

For example, Cisco Systems Co., Ltd. has prepared HSRP (Hot Standby Routing Protocol) as the protocol for making the router redundant. That is, in a state where one IP (Internet Protocol) address is allocated to each router, one IP address is further allocated to all the routers multiplexed and, for making communications, a request is transmitted to the IP address for all the routers. The router to be used for common communication is one in number and, when the router which is in use comes to a stop, the other one router automatically makes communications in place of the router which has come to a stop. The time needed for the switching therefor is approximately one second.

In addition, although there is no interoperability (interchangeability), as a similar technique, there has been known VRRP (Virtual Router Redundancy protocol). A plurality of routers matching with the VRRP are grouped into one group and, usually, one of the routers takes care of communications, and when this router falls into a trouble, a router belonging to the same group automatically takes over the communications. Although the router which makes communications is limited to one in the same group, since one router can belong to a plurality of groups, it is also possible to realize the load distribution simultaneously according setting.

The foregoing techniques relate to a technique in which a routing table which is information on the layer 3 is interchanged among a plurality of routers and, when a router falls into a trouble, a path is set so as to bypass the router which has fallen into the trouble, thereby securing a communication route.

Moreover, as redundant arrangements of an optical switch, there are techniques proposed in Japanese patent Laid-Open Nos. 2002-95023 and 2003-289557, and others. In these techniques, power is monitored in each port of an optical switch set as a work system and, at the time of the detection of a power disconnection, switching is made to a port of an optical switch set as a spare (protection) system. In the arrangement, in addition to N×N optical switches which are a main switch, switches for the selection of the work system and the spare system are connected vertically, and a port relationship for placing an arrangement into a redundant condition is uniquely determined because of the physical connections. Still moreover, in the technique proposed in Japanese patent Laid-Open Nos. 2004-40726, when a trouble is detected on the work link side in a redundant input/output link of an optical switch, switching is made with reference to a protection table (port information) which specifies a portion to be restored at the detection of the trouble.

For the management of the optical connections (wiring) in a optical network such as an optical LAN (Local Area Network) constructed using an optical connection switching apparatus (optical switch) in a datacenter or in an enterprise, there is a need to capture what type (for example, protocol or bit rate) of equipment is connected to each port of the optical connection switching apparatus (information about the equipment). Although this requires monitoring the contents of an optical signal, it is impossible, for that the existing optical connection switching apparatus is not designed to analyze the contents of an optical signal while conducting the route switching in a state of the optical signal. This also applies to the aforesaid Japanese Patent Laid-Open Nos. HEI 10-135952, 2000-341359, HEI 11-65980, 2000-209622 and 2002-232409, and these documents does not disclose nor teach a technique of capturing which of ports of an optical switch is connected to what type of equipment for the connection management.

Furthermore, in the case of the employment of the above-mentioned optical connection switching apparatus, in a datacenter network, there is a need to construct a system for looking toward the nonstop for 365 days and 24 hours. For this reason, there is a need to enhance the reliability of the system by making this apparatus and power supply redundantly. The redundant optical connection switching apparatus requires a link redundancy for the switching to a spare link when a trouble occurs in a work link and requires a node redundancy for the switching to a spare apparatus (a plurality of collected ports) when a trouble occurs in a work apparatus.

Since the above-mentioned optical connection switching apparatus is designed to acquire the information on the apparatus having an optical communication interface to be connected optically for managing the connection between the apparatuses, in the work and spare systems, the same apparatus is not connected to the port with the same number, but the number of a port to be connected is optionally determined. Therefore, in the case of the conventional switching to a spare apparatus at the occurrence of a trouble, since the frequency of change of the apparatus to be connected is high, there is a high possibility that only the link switching cannot achieve the normal connection. Moreover, since the control in the physical layer is principally conduced instead of the control in the layer 3 such as a routing table, a redundancy protocol for a router cannot cope with it and, hence, a new switching procedure becomes necessary. Still moreover, in the case of the employment of a protection table (port information), an increase in the number of ports causes a complicated management and then leads to a low reliability.

SUMMARY OF THE INVENTION

The present invention has been developed with a view to eliminating the above-mentioned problems, and it is therefore an object of the invention to provide an optical connection switching apparatus and a management control unit therefor capable of acquiring the information on equipment having an optical communication interface to be optically connected, for carrying out the automatic connection management on this equipment. In addition, another object of the present invention is to improve the reliability in the case of the incorporation of these apparatus and unit into a network system.

For this purpose, in accordance with an aspect of the present invention, there is provided an optical connection switching apparatus to which a plurality of equipment each having an optical communication interface are connected and which is made to establish an optical connection therebetween, the apparatus comprising an optical connection switching facility having a plurality of an optical input/output ports each of which includes a pair of optical input port and an optical output port and is capable of making a connection between any one of the optical input ports and any one of the optical output ports, one or more optical transmitting/receiving units connected to a portion of the optical input/output ports, and a management control unit for controlling the optical connection switching facility to make a connection between the optical input/output port connected to the optical transmitting/receiving unit and the optical input/output port connected to the equipment for acquiring and managing information on the equipment by making a communication with the equipment through the use of the optical transmitting/receiving unit.

In this case, it is also appropriate that the management control unit includes an equipment information storing unit for storing identification information on the equipment, as information on the equipment acquired by the communication with the equipment in a state associated with information on the optical input/output port.

In addition, it is also appropriate that the management control unit includes an equipment state monitoring unit for monitoring connection, a disconnection or a communication state of the equipment by monitoring optical power information on the optical input/output port.

Still additionally, it is also appropriate that, in the optical connection switching apparatus, a light-receiving element is provided with respect to the optical input port of the optical connection switching facility, and the equipment state monitoring unit is constructed as an input port equipment state monitoring unit which handles, as the optical power information, a quantity of light reception by the light-receiving element to monitor the connection, disconnection or communication state of the equipment by monitoring a variation of the optical power information.

Furthermore, in accordance with a further aspect of the present invention, there is provided a management control unit for an optical connection switching apparatus which includes an optical connection switching facility having a plurality of an optical input/output ports each of which is composed of a pair of optical input port and an optical output port and which is capable of making a connection between any one of the optical input ports and any one of the optical output ports, with each of a plurality of equipment each having an optical communication interface being connected to any one of the optical input/output ports to establish an optical connection between the equipment, the management control unit comprising one or more optical transmitting/receiving units connected to a portion of the optical input/output ports and a management control unit for controlling the optical connection switching facility to make a connection between the optical input/output port connected to the optical transmitting/receiving unit and the optical input/output port connected to the equipment for acquiring and managing information on the equipment by making a communication with the equipment through the use of the optical transmitting/receiving unit.

In addition, for the above-mentioned purpose, it is also appropriate that an optical connection switching apparatus according to the present invention further comprises a light source connected to one of the input ports of the optical connection switching facility and a light reception circuit connected to one of the output ports of the optical connection switching facility, and the management control unit further comprises a first trouble detecting unit designed to make the detection of a trouble of the optical connection switching facility by monitoring a light-reception state in the light reception circuit while switching a connection state between the input port connected to the light source and the output port connected to the light reception circuit.

Still additionally, in an optical connection switching apparatus according to the present invention, it is also appropriate that at least the optical connection switching facility and the management control unit are placed into a redundant condition (redundant configuration), and a first light source connected to one of the input ports of one optical connection switching facility and a second light source connected to one of the input ports of the other optical connection switching facility are provided so that an output port of the one optical connection switching facility which outputs light from the first light source is connected to an input port other than the input port connected to the second light source of the other optical connection switching facility and an output port of the other optical connection switching facility which outputs light from the second light source is connected to an input port other than the input port connected to the first light source of the one optical connection switching facility, and the management control unit further includes a second trouble detecting unit designed to make the detection of a trouble of one of the optical connection switching facilities by monitoring an output light power from each of the output ports of one of the optical connection switching facilities.

Yet additionally, in the optical connection switching apparatus according to the present invention, it is also appropriate that, when one equipment is connected to two of the input/output ports to use one as a work port and the other as a spare port, the management control unit includes an equipment information storing unit for storing an equipment identification information table in which identification information on the equipment connected to the optical connection switching facility is associated with information on the work port and the spare port, and a work/spare switching control unit for, when an optical disconnection on the work port is detected, controlling the optical connection switching facility on the basis of the equipment identification information table in the equipment information storing unit to make the switching from the port used by the equipment to the spare port.

Moreover, in the optical connection switching apparatus according to the present invention, it is also appropriate that at least the optical connection switching facility and the management control unit are placed into a redundant condition, and each of the management control units includes an equipment information storing unit for storing a main equipment identification information table in which identification information on equipment connected to the work optical connection switching facility is associated with information on the input/output port of the work optical connection switching facility and a sub equipment identification information table in which identification information on the equipment connected to the spare optical connection switching facility is associated with information on the input/output port in the spare optical connection switching facility, a work/spare switching control unit for, when a trouble occurs in the input/output port of the work optical connection switching facility or the work optical connection switching facility itself, controlling each of the optical connection switching facilities on the basis of each of the tables on the optical connection switching facilities for switching the port used by the equipment to the input/output port of the spare optical connection switching facility, and a table synchronization updating unit for updating the contents of each of the tables in the management control unit, it pertains to, in synchronism with the contents of each of the tables in the other management control unit.

Still moreover, an optical connection switching apparatus according to the present invention comprises an optical connection switching facility connected to a plurality of equipment each having an optical communication interface for making an optical connection between the equipment, an optical receiver for receiving partial or full light to be transmitted/received between the equipment optically connected by the optical connection switching facility, and a management control unit for acquiring information on the equipment connected to the optical connection switching facility on the basis of the light received by the optical receiver to manage it.

According to the present invention, the optical connection switching facility is controlled to make the connection between the optical input/output port connected to the optical transmitting/receiving unit and the optical input/output port connected to the equipment so that the communication is made with the connected equipment through the use of the optical transmitting/receiving unit to acquire and manage the information on the equipment, thus automating the connection management on the connected equipment to considerably shortening the time needed for this operation, which can considerably reduce the operation management cost as a result.

Moreover, the connection, disconnection or communication state of the equipment can be monitored by monitoring the optical power information on the optical input/output port of the optical connection switching facility, which can achieve the automation of the inter-port connection switching and which can also automate the connection switching at the re-construction of a network using this optical connection switching apparatus or at the occurrence of a trouble. This can considerably reduce the time needed for this operation and can cut the operation management cost of the network.

Still moreover, when an optical connection switching apparatus is placed into a redundant condition according to the present invention, the speeding-up of the detection of a trouble point based on a detection in a physical layer becomes feasible. In addition, since the switching becomes possible by making reference to identification information (for example, address information) on equipment, the switching to a spare system becomes easily and quickly achievable. Still additionally, the employment of the above-described technique can shorten the system-down time and the time needed for the switching to the spare system, which can shorten the suspension time of the system and enhance the reliability of the network system.

BRIEF DESCRIPTION OF THE DRAWINGS

FIG. 8 is a block diagram useful for explaining an IT equipment connection recognition function according to an input/output port direct-coupling method of the optical connection automatic-switching apparatus shown in FIG. 1;

FIG. 9 is a block diagram showing a connection example in an optical connection switching facility for explaining an IT equipment connection recognition function according to an adjacent input/output port direct-coupling method (quasi-fixing method) of the optical connection automatic-switching apparatus shown in FIG. 1;

FIG. 10(A) is a block diagram showing a connection example in an optical connection switching facility for explaining an IT equipment connection recognition function according to an adjacent input/output port direct-coupling method (quasi-fixing method) of the optical connection automatic-switching apparatus shown in FIG. 1;

FIG. 10(B) is an illustration of a registration example of an equipment information table in the connection example shown in FIG. 10(A);

FIG. 11(A) is a block diagram showing a connection example in an optical connection switching facility for explaining an IT equipment connection recognition function according to an adjacent input/output port direct-coupling method (quasi-fixing method) of the optical connection automatic-switching apparatus shown in FIG. 1;

FIG. 11(B) is an illustration of a registration example of an equipment information table in the connection example shown in FIG. 11(A);

FIG. 18 is an illustration of one example of a table showing a port connection relationship in the configuration shown in FIG. 17;

FIG. 26(A) is an illustration of one example of a frame structure of the Ethernet;

FIG. 26(B) is an illustration of one example of a frame structure of a fiber channel;

FIG. 31 is an illustration of one example of a trouble detecting table in the node redundant configuration shown in FIG. 30;

FIG. 32(A) is a block diagram showing an example of a link redundant configuration of an optical connection automatic-switching apparatus according to this embodiment;

FIG. 32(B) is an illustration of one example of an address table in the configuration shown in FIG. 32(A);

FIG. 32(C) is a flow chart for explaining a method of switching to a spare system in the link redundant configuration shown in FIGS. 32(A) and 32(B);

FIGS. 34(A) and 34(B) are illustrations for explaining a method of updating an address table at the occurrence of a link trouble in the node redundant configuration shown in FIG. 33;

FIGS. 36(A) and 36(B) are illustrations for explaining a method of updating an address table at the occurrence of a node trouble in the node redundant configuration shown in FIG. 35;

FIG. 38 is an illustration for explaining a method of managing an address table in the control system shown in FIG. 37; and FIG. 39 is an illustration for explaining a different method of managing an address table in the control system shown in FIG. 37.

DESCRIPTION OF THE PREFERRED EMBODIMENTS

[A] Description of Embodiment

Figure 1:
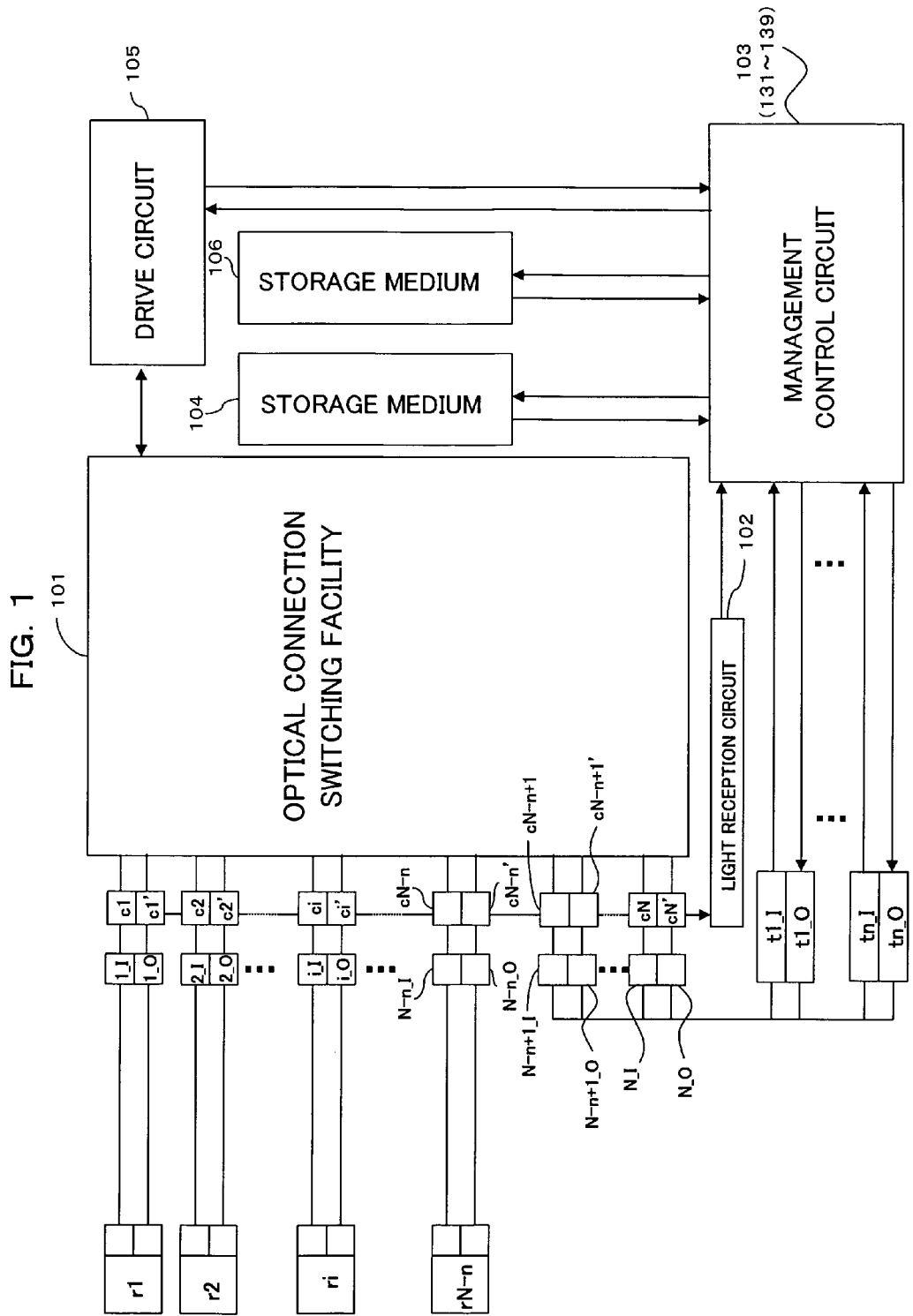
FIG. 1 is a block diagram showing a configuration of an optical connection automatic-switching apparatus (optical connection switching apparatus) according to an embodiment of the present invention.

FIG. 1 is a block diagram showing a configuration of an optical connection automatic-switching apparatus according to an embodiment of the present invention. In FIG. 1, the optical connection automatic-switching apparatus is made up of optical input ports $1\_I, 2\_I, \ldots, N\text{-}n\_I$ and optical output ports $1\_O, 2\_O, \ldots, N\text{-}n\_O$ serving as a plurality (N-n) of sets of IT equipment connection ports which come into connection with a plurality of IT equipment (information equipment) $r1, r2, \ldots, rN\text{-}n$ ($N \geq 2$, $1 \leq n < N$) each having a desired optical communication interface (communication protocol and bit rate, optical input ports $N\text{-}b+1\_I, \ldots, N\_I$ and optical output ports $N\text{-}n+1\_O, \ldots, N\_O$ serving as n sets of control ports corresponding to the number of types of handled interfaces of the IT equipment $r1, r2, \ldots, rN\text{-}n$, an optical connection switching facility (optical switch) 101 connected through optical wiring (optical fibers) to the n sets of ports $1\_I, 2\_I, \ldots, N\_I$ and $1\_O, 2\_O, \ldots, N\_O$ in total, a light reception circuit 102, a management control circuit 103, storage media 104, 106, a drive circuit 105, and a plurality (n) of sets of optical transmitters $t1\_O, t2\_O, \ldots, tn\_O$ and optical receivers $t1\_I, t2\_I, \ldots, tn\_1$ (which sometimes will collectively be referred to hereinafter as optical transmitting/receiving units $t1, t2, \ldots, tn$).

In addition, in this optical connection automatic-switching apparatus, each of the N (sets) ports in total is equipped with an optical branch circuit for taking a portion of input light and/or output light and a light-receiving element such as a PIN photodiode for measuring the optical intensity. In this configuration, there are a case in which the respective optical output ports (transmission ports) $1\_O, 2\_O, \ldots, N\_O$ are equipped with these optical branch circuits and light-receiving elements as indicated by marks $c1', c2', \ldots, cN'$ in FIG. 1, a case in which the respective optical input ports (reception ports) $1\_I, 2\_I, \ldots, N\_I$ are equipped with these optical branch circuits and light-receiving elements as indicated by marks $c1, c2, \ldots, cN$ in FIG. 1, and a case in which both the optical input ports $1\_I, 2\_I, \ldots, N\_I$ and optical output ports $1\_O, 2\_O, \ldots, N\_O$ are equipped therewith. In the following description, when the paired optical input ports $i\_I$ ($i=1$ to N) and optical output ports $i\_O$ are discriminated from each other, they will be referred to collectively as optical input/output ports $i\_IO$.

Still additionally, the n optical input ports (control ports) $N\text{-}n+1\_I, \ldots, N\_I$ are connected to the n optical transmitters $t1\_O, t2\_O, \ldots, tn\_O$ on a one-to-one basis, and the n optical receivers $t1\_I, t2\_I, \ldots, tn\_I$ are respectively connected to the n optical output ports (control ports) $N\text{-}n+1\_O, \ldots, N\_O$, paired with the aforesaid optical input ports $j\_I$ ($j=N\text{-}n$ to N), in one-to-one relation to each other, and in accordance with the inter-port connection switching in the optical connection switching facility, the communication can be made between any one of the IT equipment (which sometimes will hereinafter be referred to simply as "equipment") r1, r2, ..., rN-n and the management control circuit 103 through these control ports j_I and J_O.

Incidentally, in this embodiment, the control ports and optical transmitting/receiving units are n ($\geqq 1$) in number, which corresponds to the number of types of handled optical communication interfaces (which sometimes will hereinafter be referred to simply as "interfaces") of the IT equipment r1, r2, ..., rN-n, and which depends upon the numbers of the handled protocols and bit rates of the IT equipment r1, r2, ..., rN-n. However, if multi-interface handling optical transmitting/receiving units t1, t2, ..., tn can be prepared which have a plurality of types of communication functions corresponding to a plurality of types of interfaces (multi-interface, multi-bit-rate) which can be provided in the IT equipment r1, r2, ..., rN-n, it is possible to decrease the number of control ports and number n of optical transmitting/receiving units up to n=1 which is at a minimum, thus realizing the cost reduction of this optical connection automatic-switching apparatus.

In this configuration, the optical connection switching facility (optical switch) 101 is driven by the drive circuit 105 to switch the connection (optical link) between any ports 1_I, 2_I, ..., N_I and 1_O, 2_O, ..., N-O, thereby enabling the communication between any IT equipment r1, r2, ..., rN-n (if discriminated from each other, they will hereinafter be referred to as "IT equipment r") connected to this optical connection automatic-switching apparatus.

The light reception circuit 102, the management control circuit 103, the storage media 104, 106 and the drive circuit 105 constitute a management control unit which controls the optical connection switching facility 101 to make a connection between the control port (optical input/output port) j_IO connected to the optical transmitting/receiving unit tk (k=1 to n) and the IT equipment connection port i-IO connected to the IT equipment r so that a communication with the IT equipment r is made through the use of this optical transmitting/receiving unit tk to acquire and manage information (equipment identifying information such as address information) on the equipment r.

That is, the light reception circuit 102 receives the optical power information obtained by the light-receiving elements c1, c2, ..., cN or c1', c2', ..., cN' and transmits it to the management control circuit 103, while the management control circuit (management control unit) 103 has a function to analyze a data frame obtained by making communication with an arbitrary IT equipment connected to the optical connection switching facility 101 through the use of any one of the optical transmitting/receiving units tk, a function (network automatic-construction function) to control the drive circuit 105 for controlling the inter-port connection switching in the optical connection switching facility 101, a function of storage control on the storage media 104 and 106, an IT equipment connection/disconnection automatic-recognition function, an IT equipment interface automatic-recognition function, an inter-IT-equipment communication monitor function, a redundant path switching function, and others.

In this connection, when this management control circuit 103 itself, or together with the storage media 104, 106 and the drive circuit 105, is mounted as one function such as maintenance terminal remote from the optical connection switching facility 101, the remote control can also be made with respect to the optical connection switching facility 101. Moreover, each of the aforesaid optical transmitters t1_O, t2_O, ..., tn_O has an electrical/optical (E/O) conversion function while each of the optical receivers t1_I, t2_I, ..., tn_I has an optical/electrical (O/E) conversion function, and the communication is made between the management control circuit 103 and these optical transmitting/receiving units tk through electric signals.

The storage medium (equipment information storage unit) 104 is for storing the information (equipment information) about the IT equipment r connected to each of the ports 1_I, 2_I, ..., N-n_I and 1_O, 2_O, ..., N-n_O and, for example, retains address information [one of or both a physical address and logical address (attainable through the aforesaid data frame analysis)] serving as identification information on the IT equipment r and an IT equipment connection port number in a state associated with each other for specifying the IT equipment r (for example, see table 2 shown later). Another storage medium (optical power information storage unit) 106 is for retaining transmission optical power information (obtained through the light-receiving elements c1, c2, ..., cN or c1', c2', ..., cN' and the light reception circuit 102) from the IT equipment r in a state associated with the IT equipment connection port number.

Incidentally, as each of these storage media 104 and 106, a random access memory (RAM), a magnetic disk, an optical disk, a magneto optical disk or the like is employable. Moreover, these storage media 104 and 106 can also be realized by dividing a storage area of a single storage medium according to information to be stored.

With the above-described configuration, the user of this optical connection automatic-switching apparatus can realize the correct connections and communications without being aware of the optical communication interface (protocol and bit rate) used in that IT equipment r only by making a connection of the IT equipment r with any IT equipment connection port 1_I, 2_I, ..., N-n_I and 1_O, 2_O, ..., N-n_O. A more detailed description will be given hereinbelow.

(a) IT Equipment Connection and Disconnection Recognition Function

With the above-described configuration, the management control circuit 103 can automatically recognize the fact that IT equipment r is newly connected to the optical connection automatic-switching apparatus.

Figure 2:
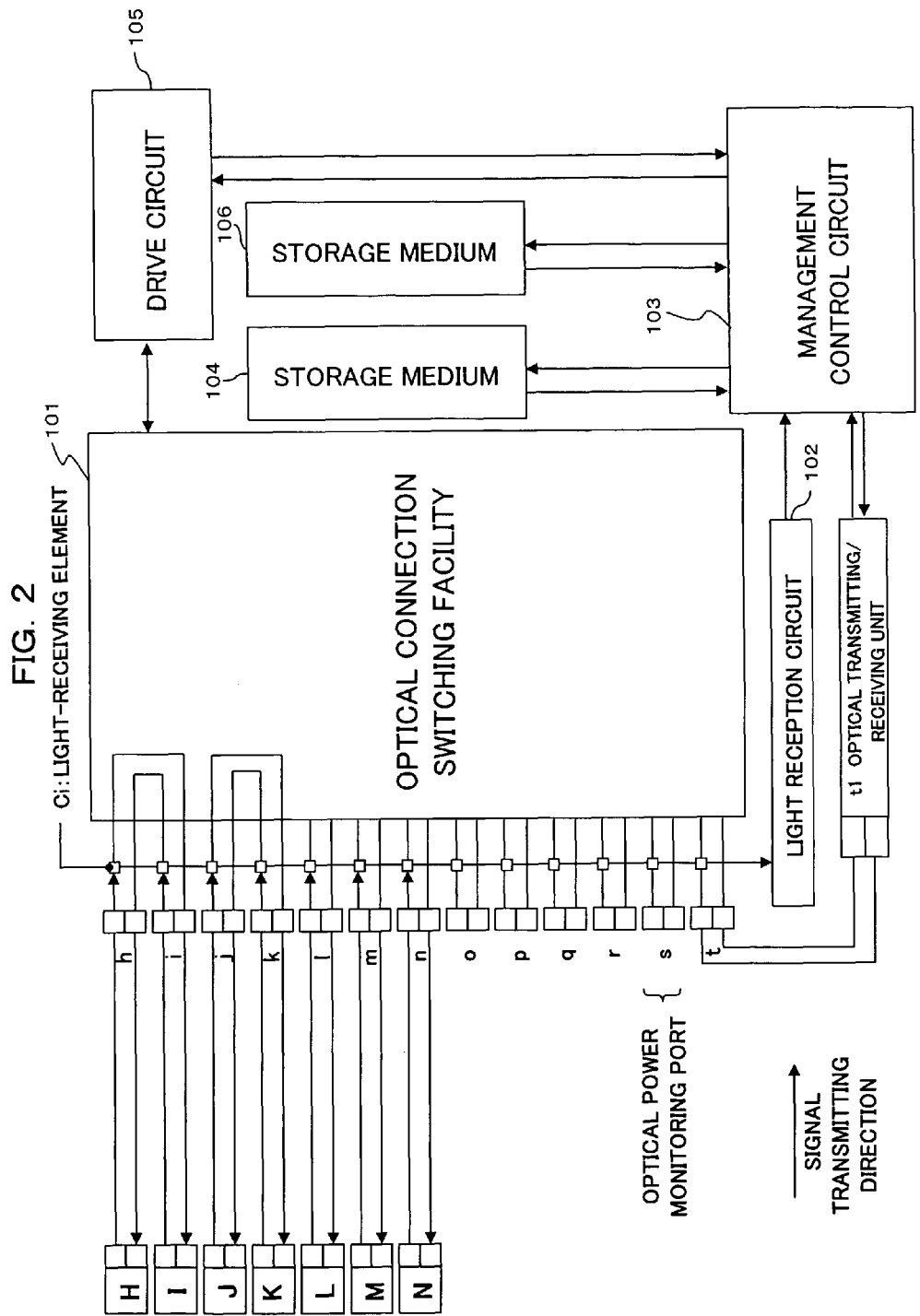
FIG. 2 is a block diagram useful for explaining an IT equipment connection and disconnection automatic-recognition function (in a case in which an optical input port is equipped with a light-receiving element) of the optical connection automatic-switching apparatus shown in FIG. 1.

(a-1) Case in which a Light-Receiving Element is Provided in an Optical Input Port of the Optical Connection Automatic-Switching Apparatus (See FIG. 2)

In a case in which the light-receiving elements c1, c2, ..., cN are provided in the optical input ports 1_I, 2_I, ..., N_I of the optical connection automatic-switching apparatus as described above with reference to FIG. 1, the management control circuit 103 is set to monitor the optical power information, obtained from the light-receiving elements c1, c2, ..., cN through the light reception circuit 102, at all times. In FIG. 2, for convenience only, without making a discrimination between the optical input ports and the optical output ports, the number of all the ports (optical input/output ports) are set at 13 (ports h to t) as port number=h to t, and the IT equipment H to N are connectable to the ports h to n, respectively.

For example, in a case in which the IT equipment J having an optical communication interface [optical/electrical (O/E) conversion function] is connected to the IT equipment connection port j, light is incident from this IT equipment J on the port j and is received by the light-receiving element cj provided in the port j and transmitted through the light reception circuit 102 to the management control circuit 103.

Accordingly, the management control circuit 103 can recognize a variation of the light reception quantity (an increase in light reception quantity) about the port j, and it can automatically recognize the fact that the IT equipment J having the optical communication interface is connected to the port j.

Incidentally, although in FIGS. 1 and 2 all the optical input ports $1\_I, 2\_I, \ldots, N\_I$ are respectively equipped with the light-receiving elements $c1, c2, \ldots, cN$, when the optical input ports (IT equipment connection ports) $1\_I, 2\_I, \ldots, N\text{-}n\_I$ to which at least the IT equipment r is connectable are equipped therewith, the connection/disconnection automatic-recognition of the IT equipment r becomes feasible.

Figure 3:
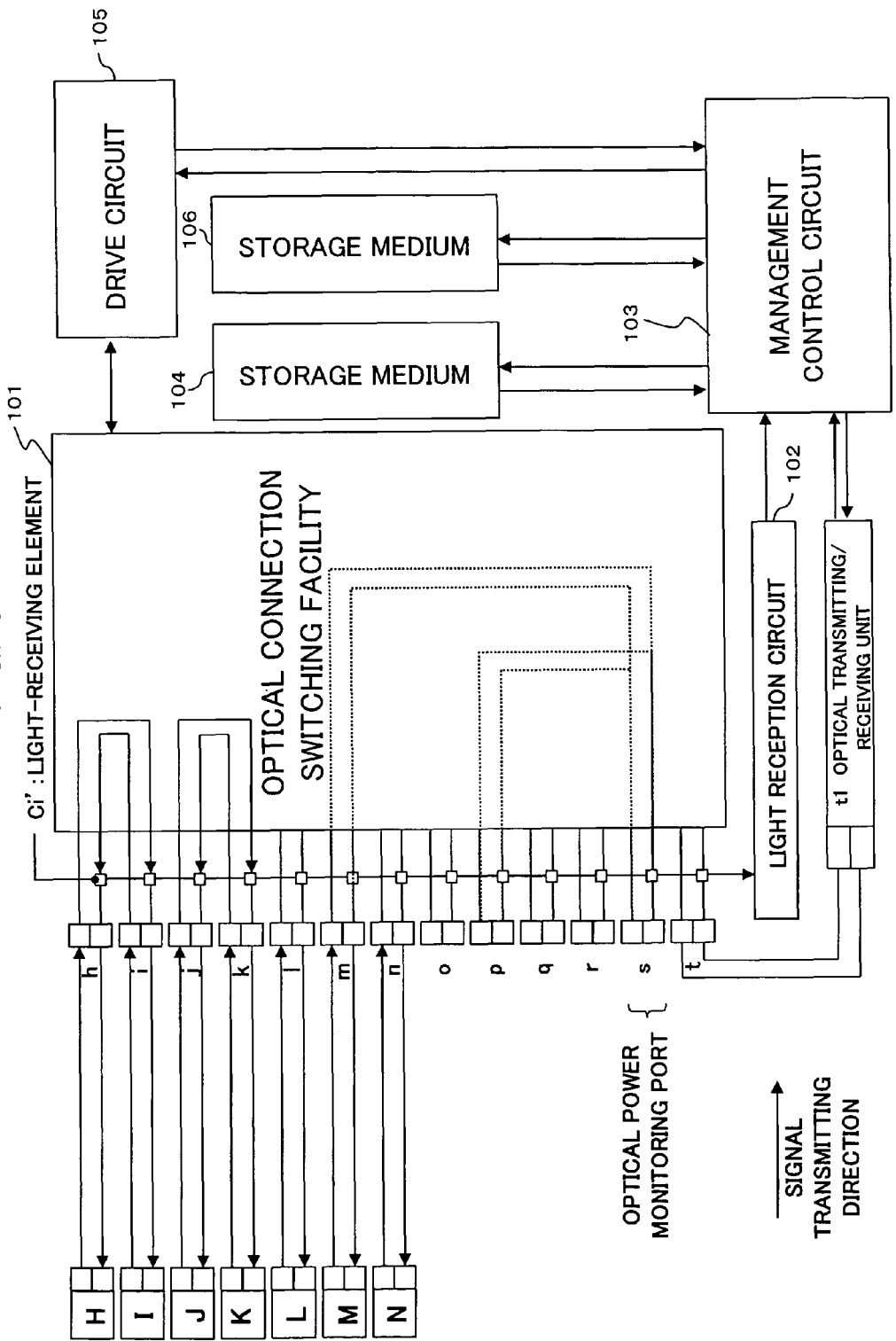
FIG. 3 is a block diagram useful for explaining an IT equipment connection and disconnection automatic-recognition function (in a case in which an optical output port is equipped with a light-receiving element) of the optical connection automatic-switching apparatus shown in FIG. 1.

(a-2) Case in which a Light-Receiving Element is Provided in an Optical Output Port of the Optical Connection Automatic-Switching Apparatus (See FIG. 3)

In a case in which the respective optical output ports $1\_O, 2\_O, \ldots, N\_O$ of the optical connection automatic-switching apparatus are equipped with the light-receiving elements $c1', c2', \ldots, cN'$ (when the light-receiving elements $c1, c2, \ldots, cN$ are not provided in the optical input ports $1\_I, 2\_I, \ldots, N\_I$), even if the IT equipment r is connected to this optical connection automatic-switching apparatus, the connection is not recognizable in this state. Therefore, in this case, the port of port number=s is used as the control port (optical power monitoring port), and the management control circuit 103 controls the optical connection switching facility 101 through the use of the drive circuit 105 to successively (in a circulative manner) make connections of a plurality of IT equipment connection ports h to r with the optical power monitoring port s (no order required) so that the optical power monitor information obtained by the light-receiving element cs' provided in the optical output port of the optical power monitoring port s is transmitted to the management control circuit 103.

Thus, the management control circuit 103 can monitor the optical power information on the respective IT equipment connection ports h to r at all times and, in a case in which the IT equipment r having the optical communication interface is connected to any equipment connection port h to r, the optical power information is transferred to the management control circuit 103, thereby enabling the automatic recognition on the new connection of the IT equipment r. Therefore, in the case of this embodiment, if at least the control port (optical power monitoring port) s is equipped with the light-receiving element cs', the connection/disconnection automatic-recognition on the IT equipment becomes feasible.

That is, the functions of the aforesaid (a-1) and (a-2) signify that the management control circuit 103 has a function as an equipment state monitoring unit 131 (see FIG. 1) to monitor the connection, disconnection or communication state of the IT equipment r by monitoring the optical power information on the optical input/output port i_IO of the optical connection switching facility 101 and this equipment state monitoring unit 131 has the following functions (1) and (2) according to the light-receiving element location (port), with the function (2) including the following function (3). That is:

(1) a function as an input port equipment state monitoring unit 132 (see FIG. 1) to, in a case in which the optical input port i_I is equipped with the light-receiving element ci, monitor the connection, disconnection or communication state of the IT equipment r by monitoring a variation of the light reception quantity in the light-receiving element ci with the light reception quantity being handled as the optical power information;

(2) a function as an output port equipment state monitoring unit 133 to, in a case in which the optical output port i_O is equipped with the light-receiving element ci', control the optical connection switching facility 101 for making a connection between the optical input port which is connected to the IT equipment r and the optical output port (optical power monitoring port) s which is not connected to the IT equipment so that a variation of the light reception quantity in the light-receiving element cs' of this port s is monitored with the light reception quantity being handled as the optical power information, thereby monitoring the connection, disconnection or communication state of the IT equipment r; and (3) a function as a port circulation (cyclic) connection control unit 134 to control the optical connection switching facility 101 for making the circulative connections between a plurality of optical input ports i_I connected to the IT equipment r and the optical output port j_O serving as the optical power monitoring port which is not connected to the IT equipment r.

Figure 4:
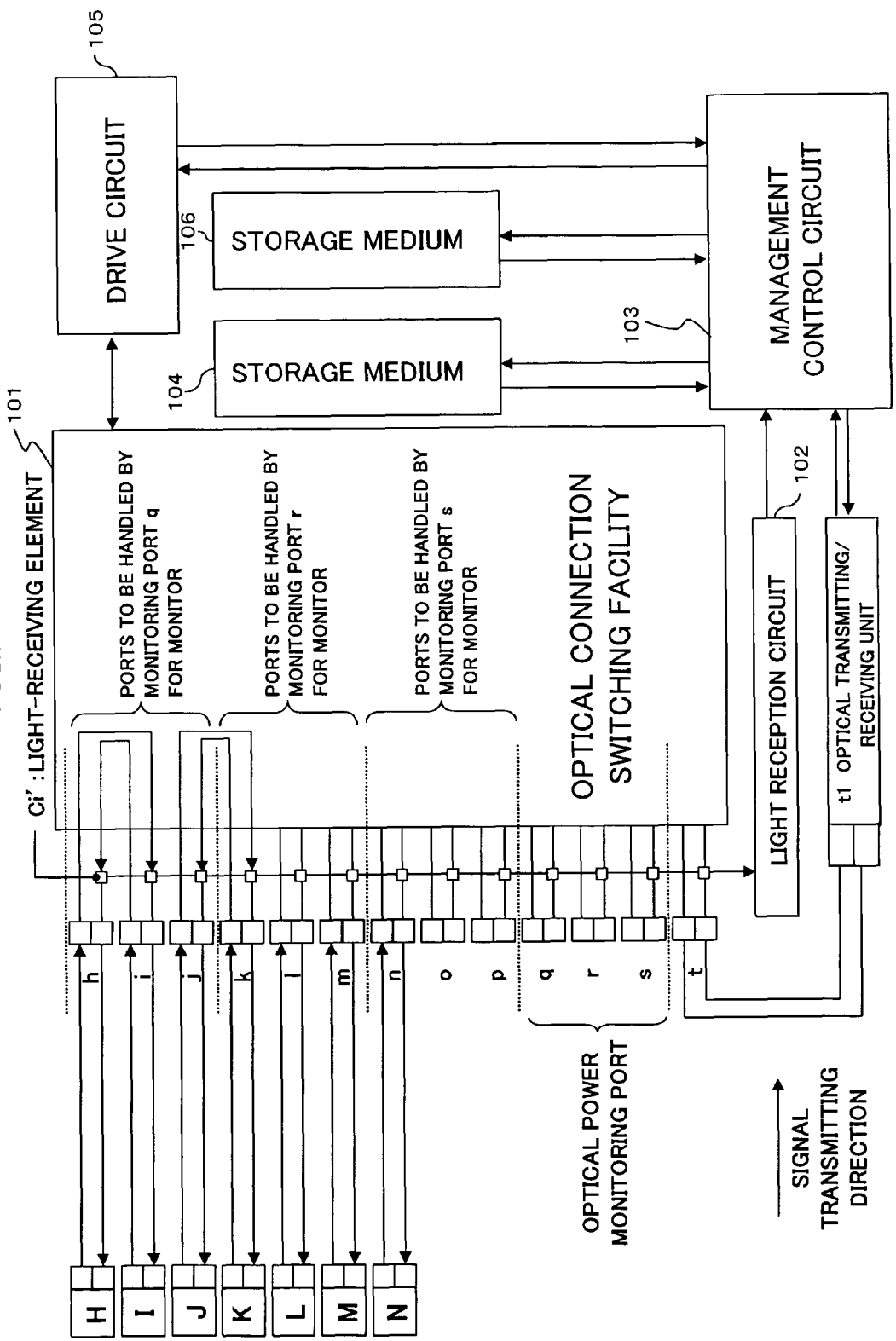
FIG. 4 is a block diagram showing an example of the allocation of a monitor charge port in a case in which a plurality of optical power monitoring ports are provided in the optical connection automatic-switching apparatus shown in FIG. 1.

Meanwhile, in the case of the employment of the aforesaid methods, since the IT equipment connection ports h to rare monitored in succession (in a circulating fashion), the time lag (delay) occurs in terms of the equipment connection recognition. Accordingly, for example, it is considered to employ a method in which not only the number of optical power monitoring ports is increased but also the number of equipment connection ports to be monitored through the optical power monitoring ports is decreased and even the circulation period is shortened. That is, for example, as shown in FIG. 4, each of the ports q, r and s is used as the optical power monitoring port so that these ports q, r and s share the IT equipment connection ports i_IO which are an object of monitor (in FIG. 4, the port q monitors the optical power information on the ports h, i, j, the port r monitors the optical power information on the ports k, l, m, and the port s monitors the optical power information on the ports n, o, p).

This can reduce the number of equipment connection ports one optical power monitoring port takes charge of and shorten the circulation monitor period, which can achieve the fast monitor more efficiently. Incidentally, the maximum number of optical power monitoring ports to be used becomes equal to the number of equipment connection ports.

Moreover, in the case of both the above-mentioned (a-1) and (a-2), a decision as to whether the IT equipment r is connected or not is made according to the following method. That is, a given threshold is set with respect to the optical power monitor value and, when the optical power monitor value varies to exceed the threshold, a decision is made that the connection of the equipment r newly takes place. On the other hand, if the optical power monitor value varies to become a value below the threshold, a decision is made that the equipment r is connected or some trouble occurs.

(b) In-Datacenter IT Equipment Automatic-Recognition by the Optical Connection Automatic-Switching Apparatus (Single Interface)

In a case in which the equipment r is newly connected to any one of the ports i_IO of this optical connection automatic-switching apparatus, as mentioned above, owing to the light-receiving element $c1, c2, \ldots, cN$ provided in the optical input port $1\_I, 2\_I, \ldots, N\_1$ of the optical connection automatic-switching apparatus or the light-receiving element $c1', c2', \ldots, cN'$ provided in the optical output port $1\_O, 2\_O, \ldots, N\_O$ thereof, the information indicative of the new connection of the equipment r is sent to the management control circuit 103. The management control circuit 103 controls the optical connection switching facility 101 through the use of the drive circuit 105 to make a connection of the optical input/output port i_IO connected to the equipment r with any optical input/output port (control port) j_IO connected to the optical transmitting/receiving unit tk connected to the management control circuit 103.

Moreover, the management control circuit 103 transmits a response request through the optical transmitting/receiving unit tk to the connected equipment r. Upon receipt of the response request, the equipment r transmits a data frame including the information on an address (logical or physical address) allocated to this equipment r to the transmission side address, and the management control circuit 103 receives the data frame through the optical transmitting/receiving unit tk in the form of an electric signal and acquires the transmission side address information stored in the data frame. Thus, the management control circuit 103 can make out a port-address correspondence table in which the acquired address information and the port (number) of the optical connection automatic-switching apparatus are associated with each other. This correspondence table is retained and managed in the storage medium 104.

(c) n-Datacenter IT Equipment Automatic-Recognition by the Optical Connection Automatic-Switching Apparatus (Multi-Interface)

In a case in which the equipment r is newly connected to any one of the ports i_IO of this optical connection automatic-switching apparatus, also in this case, owing to the light-receiving element c1, c2, ..., cN provided in the optical input port 1_I, 2_I, ..., N_1 of the optical connection automatic-switching apparatus or the light-receiving element c1', c2', ..., cN' provided in the optical output port 1_O, 2_O, ..., N_O thereof, the information indicative of the connection of the equipment r is sent to the management control circuit 103. Upon receipt of this information, the management control circuit 103 carries out an interface decision process on the connected equipment r.

That is, as the optical transmitting/receiving unit tk to be connected to the management control circuit 103 of this optical connection automatic-switching apparatus, there is prepared the Ethernet, fiber channel or other data frame readable means. The management control circuit 103 performs the protocol and bit rate scanning on the equipment r connected to the equipment newly connected through the optical transmitting/receiving unit tk to obtain the type of the interface of this equipment r and the physical address and/or the logical address of the equipment r and further to preserve these information, for example, in the storage medium 104 or 106.

The following table 1 shows an example of the scanning items. Although this example includes the Ethernet and fiber channel, naturally, it is possible to handle the equipment r1, r2, ..., rN-n using other protocols as communication means by employing the optical transmitting/receiving unit tk capable of reading the other protocols.

TABLE 1

Example of Bit Rate/Protocol Scanning Items

|  | 100 Mbps | 200 Mbps | 400 Mbps | 1 Gbps | 2 Gbps | 4 Gbps | 10 Gbps |
|---|---|---|---|---|---|---|---|
| Ethernet | OK | — | — | OK | — | — | OK |
| FC*1 | OK | OK | OK | OK | OK | OK | — |
| Others | *2 | *2 | *2 | *2 | *2 | *2 | *2 |

In this table 1, *1 represent FC: Fiber Channel, and *2 signifies depending on protocol to be used.

Secondly, referring to a flow chart of FIG. 5, a description will be given hereinbelow of a detailed procedure to be conducted from when the equipment r is connected to this optical connection automatic-switching apparatus until the communication is realized between the equipment r. In the following description, Although, as the order of the interface scanning, the protocol scanning is first conducted and the bit rate scanning is then done, the reverse order is also acceptable.

First of all, when the equipment r having an optical connection port is newly connected to any port i_IO of the optical connection automatic-switching apparatus (step S1), according to any one of the methods mentioned above in the item (a), the management control circuit 103 detects that the equipment r is connected to the port i_IO (step S2). Concretely, as mentioned above, a given threshold is set in conjunction with the light reception level and, when the light reception level exceeds this threshold, a decision is made as the connection of the equipment r.

Following this, the management control circuit (which will herein after be referred to simply as a "control circuit") 103 controls the optical connection switching facility 101 to make a connection between the port i_IO connected to the equipment r and the port j_IO connected to the optical transmitting/receiving unit tk corresponding to the protocol to be scanned (steps S3 and S4). In this connection, if an optical transmitting/receiving unit tk is employed which handles the multi-interface (protocol), instead of this port switching by the optical connection switching facility 101, the selection/setting of the communication function (protocol) of the optical transmitting/receiving unit tk by the management control circuit 103 alone will avail.

Subsequently, for example, according to the aforesaid table 1, the control circuit 103 sets a bit rate of the optical transmitting/receiving unit tk (step S5), and transmits a response request through this optical transmitting/receiving unit tk to the connected equipment r. If there is a response (reception of a data frame) from that equipment r, the control circuit 103 analyzes the contents of the data frame and the specification of the equipment r reaches completion. Accordingly, the control circuit 103 stores, for example, in the storage medium 104, the information peculiar to the equipment r such as the information on one of or both the physical address and logical address of the equipment r (through Yes route of step S6 to step S7).

On the other hand, in the case of no response to the aforesaid response request, the control circuit 103 confirms whether or not the processing on all the bit rates which are an object of scanning reaches completion (through No route of step S6 to step S8). If it does not reach completion yet, the control circuit 103 changes the bit rate setting of the optical transmitting/receiving unit tk (through No route of step S8 to step S5). At this time, if the optical transmitting/receiving unit tk can handle the multi-bit-rate, also in this case, instead of the port switching by the optical connection switching facility 101, the bit rate setting on the optical transmitting/receiving unit tk by the management control circuit 103 will avail. If the optical transmitting/receiving unit tk cannot handle the multi-bit-rate, the optical transmitting/receiving unit tk is provided for each bit rate and the control circuit 103 controls the optical connection switching facility 101 to make a connection between the port j_IO connected to that optical transmitting/receiving unit tk and the port i_IO connected to the equipment r which is an object of scanning at present.

In a case in which there is no response when the scanning on all the bit rates takes place (No in step S6 and Yes in step S8), for changing the interface, the control circuit 103 controls the optical connection switching facility 101 to make a connection between the port i_IO connected to the equipment r and the port k_IO connected to another optical transmitting/receiving unit tk (k=1 to n, k≠i) (through No route of step S9 to step S4). Also in this case, if the multi-protocol handling optical transmitting/receiving unit tk is provided, instead of the port switching by the optical connection switching facility 101, the setting by the control circuit 103 alone will avail.

Thereafter, the control circuit 103 repeatedly carries out the processing in the aforesaid steps S4, S5 and S6 (i.e., bit rate scanning and protocol scanning) until the corresponding interface is found by the reception of a response from the connected equipment r. If the corresponding interface is found, at this time, the information peculiar to this equipment r is stored, for example, in the storage medium 104 (step S7).

In a case in which, although the protocol scanning on all the protocols reaches completion, the corresponding interface is not found yet (Yes in step S9), the control circuit 103 makes a decision that it is impossible to handle the interface of this equipment r (step S10). In this case, a maintenance person or the like manually sets the peculiar information such as address information on this equipment r (step S11).

That is, in this case, the control circuit 103 has a function as an interface scanning unit 135 (see FIG. 1) to control the optical connection switching facility 101 for making circulating connections of the optical input/output ports j_IO connected to a plurality of optical transmitting/receiving units tk with the optical input/output port i_IO connected to the IT equipment r (no order necessary) so that the information on the IT equipment r is acquired through the use of the optical transmitting/receiving units tk, or to perform the circulating selection/setting of the communication function (protocol, bit rate and others) of the multi-interface handling optical transmitting/receiving unit tk so that the information on the IT equipment r is acquired through the use of the optical transmitting/receiving unit tk.

Moreover, the above-mentioned interface scanning processing is conducted with respect to all the newly connected equipment r, so a table in which the respective ports i_IO and the connected equipment r are associated with each other is produced in the storage medium 104. Still moreover, the control circuit 103 controls the optical connection switching facility 101 on the basis of the contents of this table to make the mutual connections among the equipment r (optical connection setting) (step S12). Thus, the connections among the equipment r come to an end. That is, the control circuit 103 functions as a inter-port connection control unit 136 to implement the inter-port connection control in the optical connection switching facility 101 on the basis of the equipment information in the storage medium 104.

Through the use of the above-described methods, the user of this optical connection automatic-switching apparatus can realize the correct inter-equipment connections only by making the connection to any port i_IO of this optical connection automatic-switching apparatus without paying attention to the type (protocol) of the optical communication interface of the equipment r to be connected, the bit rate and others.

Figure 17:
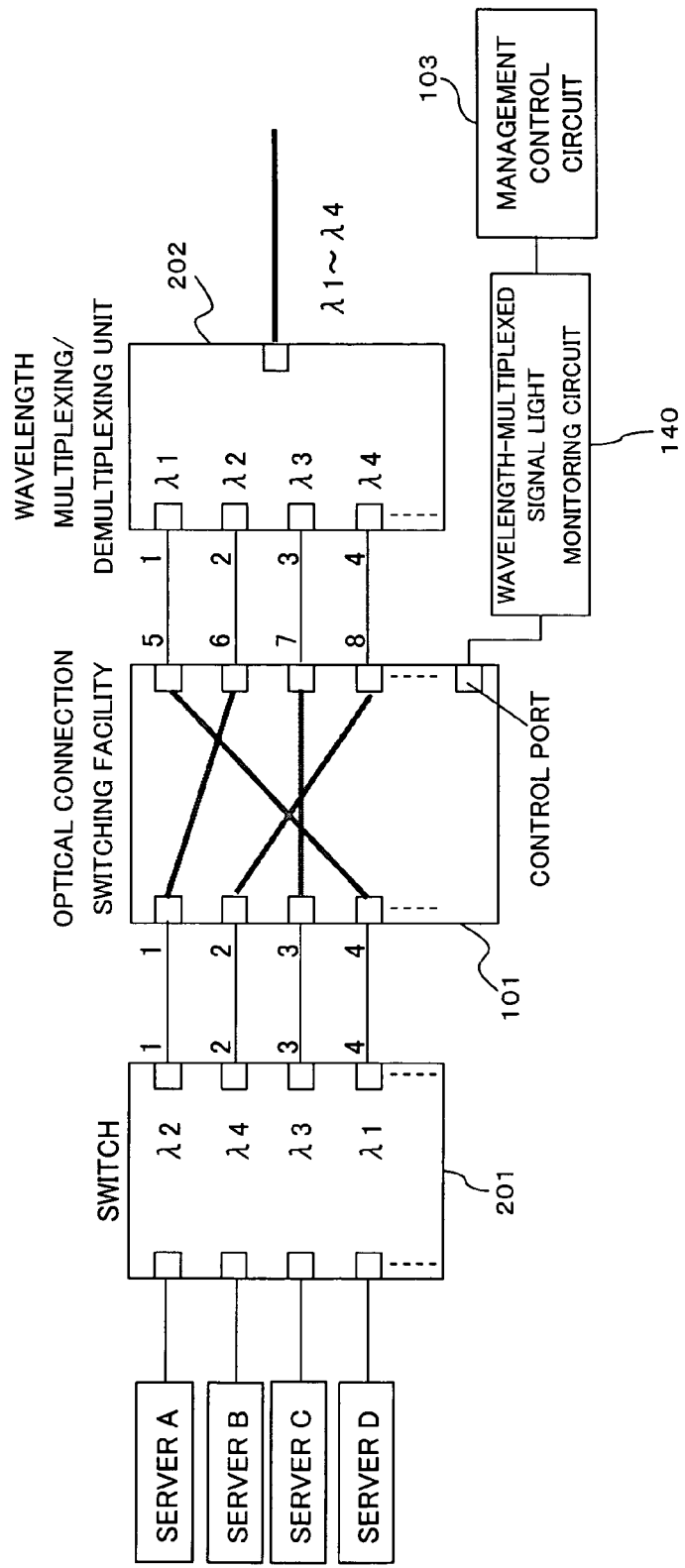
FIG. 17 is a block diagram showing an example of a configuration in a case in which an optical connection automatic-switching apparatus according to this embodiment is employed for a connection of equipment having a wavelength multiplexing (WDM) optical interface.

Furthermore, a description will be given hereinbelow of a case in which this optical connection automatic-switching apparatus (optical connection switching apparatus) is employed for the connection of equipment having a wavelength multiplexing (WDM: Wavelength Division Multiplex) optical interface. This configuration is shown in FIG. 17. As shown in FIG. 17, to an optical connection switching facility 101, there are connected a switch 201 having a wavelength multiplexing optical interface and a wavelength multiplexing/demultiplexing unit 202. Reference numeral 140 denotes a wavelength-multiplexed signal light monitoring circuit, which is equivalent to a circuit including the above-mentioned light reception circuit 102, optical transmitting/receiving units t1, t2, ..., tn, light-receiving elements c1', c2', ..., cN' (c1, c2, ..., cN) and others. Incidentally, in FIG. 17, the above-mentioned storage mediums 104, 106, drive circuit 105 and others are omitted from the illustration.

The aforesaid wavelength multiplexing optical interface is capable of introducing different wavelengths (for example, $\lambda 1, \lambda 2, \lambda 3, \lambda 4$) into each port, and the optical interface is replaceable. Moreover, as the optical interface of the switch 201, not until an appropriate wavelength is introduced into each port, a signal light passes when connected to the wavelength multiplexing/demultiplexing unit 202. Therefore, in a case in which an arbitrary optical interface is incorporated into each port of the switch 201, there is a need to make the matching between the wavelength and the port. For this reason, when an optical connection automatic-switching apparatus is employed like the above-described configuration, the matching between the wavelength and the port becomes feasible.

That is, when one port of the switch 201 is connected to the optical connection switching facility 101, the management control circuit 103 recognizes the wavelength of that port and the port number in the switch 201. In the management control circuit 103, for example, as shown in FIG. 18, the information about the port of the optical connection switching facility connected to each port of the wavelength multiplexing/demultiplexing unit 202 is grasped as data or the like in the form of a table (for example, stored in the above-mentioned storage medium 104 or 106) in advance, and a decision is made on the port which should be connected to the previously recognized port, thus achieving the appropriate connection. At this time, if there are wavelengths duplicated or when a problem arises in the signal light power of this wavelength, the central wavelength information and others, error information or the like can be notified from the management control circuit 103 to the manager.

(d) In-Datacenter Network Monitoring Function

Since the information flowing on an in-datacenter network is mission critical, the network monitoring function is significantly important. A description will be given hereinbelow of a network monitoring function using this optical connection automatic-switching apparatus.

For example, in FIG. 2 or 3, let it be assumed that, in a normal operation in which a work application is in action on a network, the IT equipment H, I, J and K in which applications are in action are connected to the ports h, i, j and k of the optical connection automatic-switching apparatus and the connection is made through the optical connection automatic-switching apparatus between the ports h-i and between the ports j-k. Moreover, to the different ports l, m and n, there are connected the IT equipment L, M and N each of which is in a stand-by condition, while the other ports o, p, q and r are in a free condition. In this state, there is a need to implement the network monitor through the use of the ports h, i, j and k without affecting the applications which are in action. The procedure therefor is as follows.

(d-1) Case in which a Light-Receiving Element is Provided in an Optical Input Port of an IT Equipment Connection Port in the Optical Connection Automatic-Switching Apparatus When each light-receiving element $c_i$ is provided in each IT equipment connection port (optical input port) i_I of the optical connection automatic-switching apparatus as mentioned above with reference to FIG. 1, the optical power monitor can be made through the use of this light-receiving element $c_i$ without exerting influence on the application which is in operation (while continuing the operation). The monitor information is transmitted through the light reception circuit 102 to the control circuit 103 and is retained as the optical power monitor information, for example, in the storage medium 106.

(d-2) Case in which no Light-Receiving Element is Provided in an Optical Input Port of the IT Equipment Connection Port of the Optical Connection Automatic-Switching Apparatus In a case in which, as mentioned above with reference to FIG. 1, the light-receiving element ci' is provided in the IT equipment connection port (optical output port i_O) of the optical connection automatic-switching apparatus while no light-receiving element is provided in the paired IT equipment connection port (optical input port), also in this embodiment, for example, the port s is used as an optical power monitoring port for monitoring the optical power. This optical power monitoring port s and the other control port can be put in common use. Moreover, the number of optical power monitoring ports are increasable as far as the number of ports of the optical connection automatic-switching apparatus permits. However, the increase in number of optical power monitoring ports enhances the monitoring efficiency as mentioned above with reference to FIG. 4 but decreasing the number of ports connectable to the IT equipment r, which leads to the trade-off.

First, a description will be given hereinbelow of a procedure in the case of monitoring the ports o, p, q, r to which the IT equipment r is not connected and the ports l, m, n which are not in connection with the IT equipment r but in which an application is not in operation.

In this case, the management control circuit 103 controls the optical connection switching facility 101 to make connections of the respective ports l to r to the optical power monitoring port s in succession (in a circulating fashion) so that the optical power can be monitored by the light-receiving element cs' placed in the optical input port of the optical power monitoring port s. The optical power monitor information is transmitted from the light reception circuit 102 to the management control circuit 103 and is retained in the storage medium 106.

On the other hand, the procedure of monitoring the ports h, i, j and k in which the application is in action is as follows. In this case, let it be assumed that the connection is made through the optical connection switching facility 101 between the ports h-i and between the ports j-k.

In this case, difficulty is encountered in breaking the connection between the IT equipment r to make the connection thereof to the optical power monitoring port s for monitoring. For this reason, in this case, the input optical power from the equipment H connected to the port h is monitored by the light-receiving element ci' provided in the optical output port of the port i connected thereto. Likewise, the input optical power from the IT equipment I, the input optical power from the IT equipment J and the input optical power from the IT equipment K are monitored by the light-receiving elements ch', ck' and cj' of the ports h, k and j, respectively. Also in this case, each of the optical power monitor information is transmitted from the light reception circuit 102 to the management control circuit 103 and is retained in the storage medium 106.

Through the use of the above-mentioned procedures, the optical power monitor becomes feasible without cutting off the data on the application which is in operation on the network. Incidentally, in both the aforesaid cases of (d-1) and (d-2), a decision as to whether the IT equipment r is connected or not is made, for example, according to the following procedure. That is, also in this case, a given threshold set with respect to the optical power monitor value and, when the optical power monitor value varies to exceed the threshold, a decision is made as the new connection of the IT equipment r. On the other hand, when the optical power monitor value varies to be lower than the threshold, a decision is made that the IT equipment r is disconnected or that some trouble occurs.

(e) Switching Function to Redundant Path

Secondly, a description will be given hereinbelow of an example in which the function of the switching to a redundant path is realized through the use of the above-mentioned monitoring function.

Figure 6:
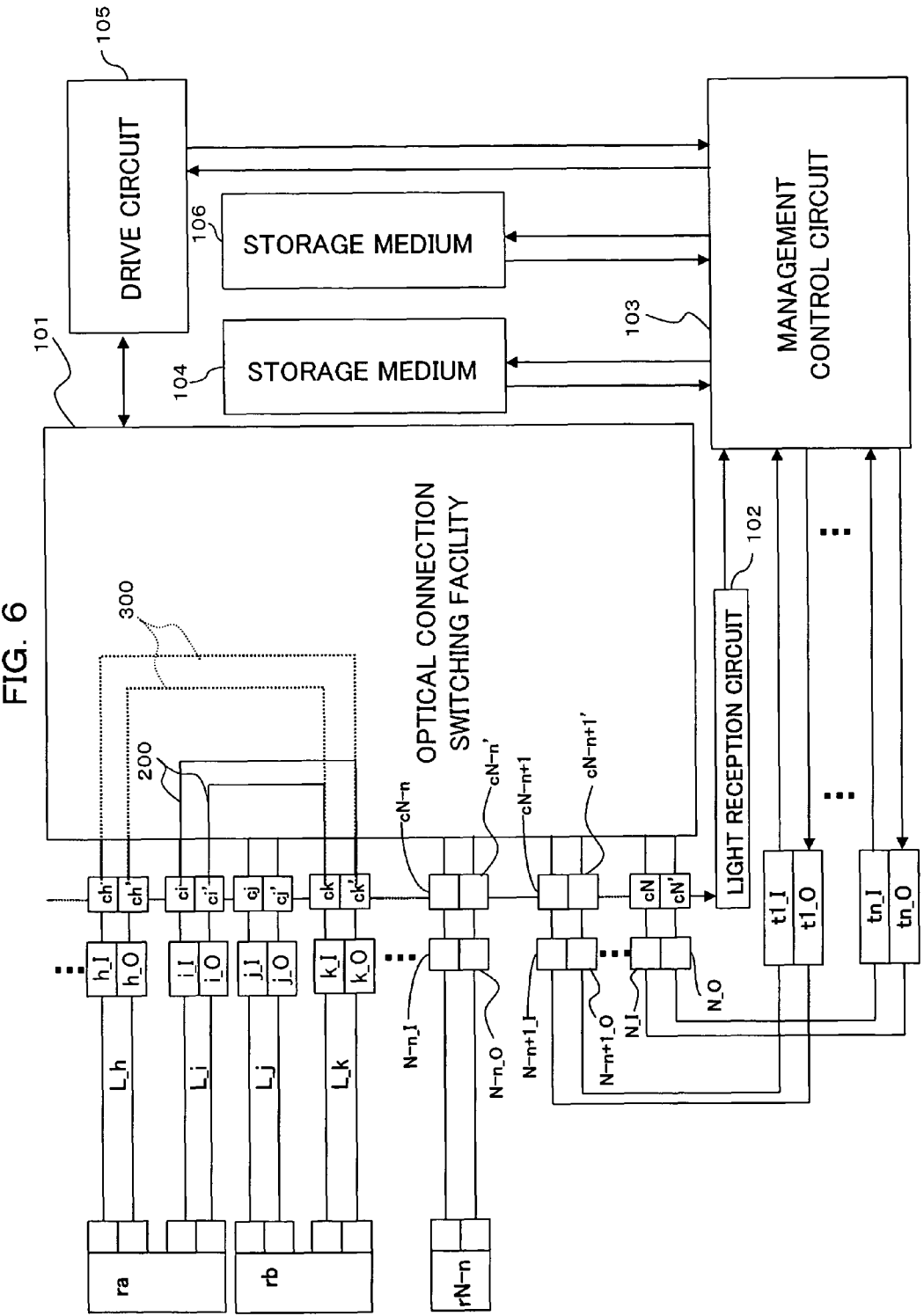
FIG. 6 is a block diagram useful for explaining a redundant path switching function of the optical connection automatic-switching apparatus shown in FIG. 1.

For example, let it be assumed that, as shown in FIG. 6, each of the IT equipment ra and rb has two pairs of optical transmitting/receiving unit ports (four ports in total) as the input and output and the IT equipment r are connected through the optical transmitting/receiving unit ports to two sets of optical input/output ports of the optical connection switching facility 101 wherein one is used as a work port and the other is used as a spare (protection) port. However, in this case, it is not required that the IT equipment ra and rb themselves internally include the two pairs of ports, and for example, it is also considered that, as shown in FIG. 7, the IT equipment ra and rb internally include one pair of optical transmitting/receiving unit ports and units (signal branching units) sa and sb for splitting a signal are inserted thereinto separately so that the IT equipment ra and rb are apparently equipped substantially with two pairs of optical transmitting/receiving unit ports.

Figure 7:
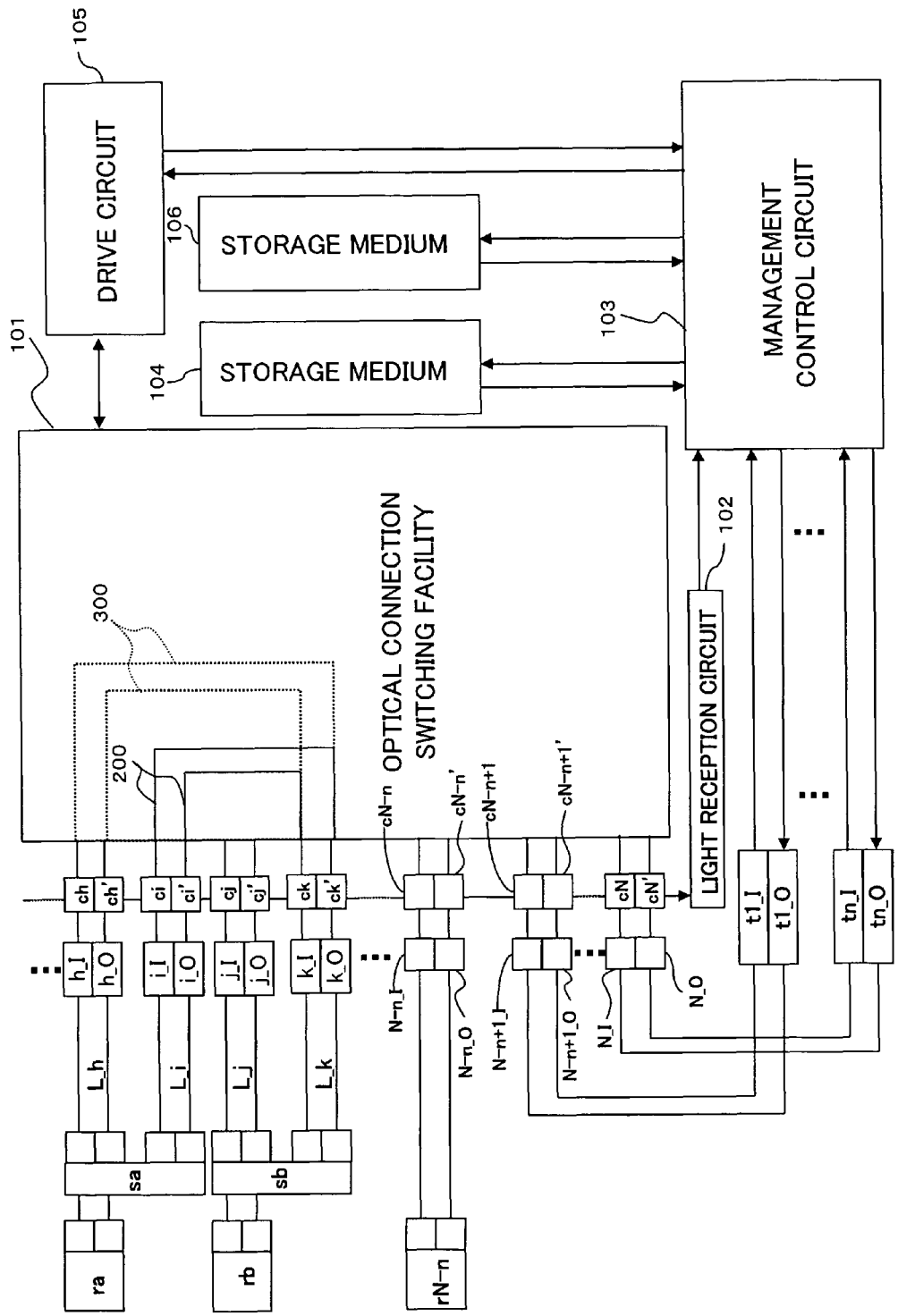
FIG. 7 is a block diagram showing a modification of a redundant path switching function of the optical connection automatic-switching apparatus shown in FIG. 1.

Moreover, in FIGS. 6 and 7, one pair of the two pairs of optical transmitting/receiving unit ports of the IT equipment ra are connected to optical input/output ports h_I and h_O and the other pair are connected to optical input/output ports i_I and I_O, while one pair of the two pairs of optical transmitting/receiving unit ports of the IT equipment rb are connected to optical input/output ports j_I and j_O and other pair are connected to optical input/output ports k_I and k_O. In this case, although the optical input/output ports with the same number are allocated to one pair of optical transmitting/receiving unit ports of the IT equipment ra, rb, the optical input port number and the optical output port number are sometimes different from each other.

In addition, as the following setting items, the ports h_I, h_O and the ports i_I, i_O are set to have a redundant configuration, and the ports j_I, j_O and the ports k_I, k_O are set to have a redundant configuration. In FIGS. 6 and 7, each of L_h, L_i, L_j and L_k represents an optical link.

Still additionally, in the service providing state, let it be assumed that in the optical connection automatic-switching apparatus, the connection is made between the optical input port h_I and the optical output port k_0 and between the optical input port k_I and the optical output port h_0, and the communication is established through the optical links L_h and L_k between the IT equipment ra and the IT equipment rb (see dotted-line paths 300 in FIGS. 6 and 7).

In this state, if a trouble occurs in the optical link L_h between the IT equipment ra and the optical input/output port h_IO, through the use of the light-receiving element ch or ch' provided in this optical input/output port h_IO, the control circuit 103 detects the optical power disconnection through the light reception circuit 102. This detection procedure is conducted as mentioned above in the item (c). When detecting the optical power disconnection, the control circuit 103 controls the optical connection switching facility 101 to connect the optical input/output port k_IO to a redundant path port (spare port) i_IO set in the optical input/output port h_IO in advance (see solid-line paths 200 in FIGS. 6 and 7). Thus, even if a trouble occurs in a path between the IT equipment ra and rb, the trouble is detectable through the optical power monitor to enable the automatic restoration from the trouble within a short time.

That is, in this case, in response to the detection of optical disconnection of the working port, the management control circuit 103 functions as a work/spare switching control unit 137 (see FIG. 1) to control the optical connection switching facility 101 for switching the using port for the IT equipment r to the aforesaid spare port.

(f) Network Automatic-Constructing Function

On the basis of the logical address and/or physical address of the IT equipment r, the IT equipment r are previously set which are to be mutually connected in constructing a network in a datacenter. According to the procedures mentioned above in the items (a), (b) and (c), a correspondence table (port-address correspondence table) between the logical addresses and/or physical addresses of the newly connected equipment r and the ports is produced in the storage medium 104 and preserved therein. Therefore, by making reference to both the port-address correspondence table and the connection setting between the logical addresses and/or physical addresses made in advance, it is possible to automatically realize the new equipment connection to the network construction (inter-port connections).

(g) Method of Confirming New IT Equipment Connection in Non-Connected (Free) Port of Optical Switch In a case in which the monitor is made using the method mentioned above in the item (d-2), since the optical connection switching facility 101 is controlled so as to switch the inter-port connection one by one for the monitor, the extra time is taken. A description will be given hereinbelow of a method of recognizing the connection of the new equipment r without making the connection switching by the optical connection switching facility (optical switch) 101.

(g-1) Input/Output (Transmission/Reception) Port Direct-Coupling Method

FIG. 8 shows an example of connection in the case of the employment of this method. In this example, the light-receiving element ci' is provided in only the optical output port I_O of each of the optical input/output ports i_IO (h to t). In FIG. 8, unless otherwise specified particularly, the same reference marks as those used above designate the same or corresponding parts.

Moreover, as shown in FIG. 8, in the ports (free ports) l, m, n, o, p, q and r to which the IT equipment r (=H, I, J, K) is not connected, the optical input port and the optical output port are set in a state directly coupled by the optical switch 101.

In this state, for example, as shown in FIG. 8, in a case in which the IT equipment L is newly connected to the port l, light from this IT equipment L is inputted through the optical input port of the port l and is directly inputted to the light-receiving element of the optical output port of the port l by means of the turn-around connection in the optical connection switching facility 101. This enables the management control circuit 103 the optical power variation information through the light reception circuit 102, and the management control circuit 103 can recognize the new connection of the IT equipment L to the port l without performing the inter-port connection switching by the optical switch 101.

That is, in this case, in a state where the aforesaid equipment state monitoring unit 131 (see FIG. 1) controls the optical connection switching facility 101 to directly couple the optical input port i_I and the optical output port I_O, paired, as the optical input/output port i_IO to which the IT equipment is not connected, the control circuit 103 functions as a port turn-around connection equipment state monitoring unit 138 (see FIG. 1) which, with the light reception quantity in the light-receiving element ci' of the optical output port i_0 being handled as the light power information, monitors a variation thereof for monitoring the connection, disconnection or communication state of the IT equipment r.

Following this, as well as the above-described example, the management control circuit 103 controls the optical connection switching facility 101 to establish the connection between the optical transmitting/receiving unit tk and the newly connected equipment L so that the communication is made with this IT equipment L to acquire the necessary information such as the address information for produce a port-address correspondence table, thereby controlling the optical switch 101 on the basis of this correspondence table to establish the connection between the IT equipment L and another IT equipment r which is the other communication party.

(g-2) Quasi-Fixing Method

In a case in which the IT equipment r is connected to the optical switch 101 according to the method mentioned above in the item (g-1), the light outputted from the IT equipment L is returned through the optical switch 101 to the receiving port of the IT equipment r. For example, if the connected IT equipment r is a layer-2 switch, due to this connection, disorder occurs in the MAC (Media Access Control) address table retained in the equipment r so that the communication abnormality occurs.

Accordingly, another method is taken. That is, in the optical switch 101, with respect to the free ports, instead of the direct coupling between the optical input and output of the same free port, for example, as shown in FIG. 9, the optical input port (In) and the optical output port (Out) of the free ports adjacent to each other (in this case, the eight ports with numbers 1 to 8 in total) are set in a state directly coupled (turn-around-connected) to each other to, when the IT equipment r is newly connected to the free port of the optical switch 101, prevent the output light of this IT equipment from returning directly to the IT equipment.

In addition, for example, when, as shown in FIG. 10(A), the equipment r is connected to the free port of port number=2 (however, in a service non-providing condition) and the equipment r, which mutually make communication with each other, are connected to the free port of the port number=5 and the free port of port number=6 and the service is in a providing condition, the optical switch 101 takes a connection set condition in which the optical input port of the port number=5 and the optical output port of the port number=6 are connected to each other, the optical output port of the port number=5 and the optical input port of the port number=6 are connected to each other, and the other free ports are directly coupled to each other. The optical switch 101 shown in FIG. 10(A) is additionally equipped with a spare port (port number=9) and a control port (port number=10).

In this case, for example, as shown in FIG. 10(B), the control circuit 103 retains and manages, in the storage medium 104 or 106, the information for each port (number) of the optical switch 101, such as the occurrence or non-occurrence of equipment connection, whether this equipment r is in operation (in service) and the optical input port connection party (monitor position) (=port number), as data in the form of a table (equipment information management table 107). In this example, the ports (in FIG. 10A, port numbers=2, 5 and 6) connected to the IT equipment are not put to use for the optical power monitor. Moreover, the management control circuit 103 does not monitor these ports connected to the IT equipment r at all times and, at the occurrence of an instruction on the inter-equipment connection or the like, controls the optical switch 101 as needed to make the connection with the control port (optical power monitoring port) (in FIG. 10, port number=10) for monitoring them.

FIG. 11(A) shows a connection state in the optical switch 101 when the It equipment (in a service non-providing condition) is further connected to the optical input/output port of the port number=1 in the state shown in FIG. 10(A), and FIG. 11(B) shows a concrete example of the aforesaid equipment information management table 107 in this state. As shown in FIG. 11(B), in this example, the occurrence and non-occurrence of the equipment connection are designated at "1" (occurrence) and "0" (non-occurrence), and each of the other connection party to the equipment and the other connection party to the optical input port is expressed by a port number.

For example, in FIG. 11(B), the entry ("1", "0", "--") for the port number=1, 2 signifies that, although the equipment r are connected to the ports corresponding to the port number=1, 2 ("1"), since the service is in a non-providing condition, the other connection party does not exist ("0") and there is no need for the monitor. Moreover, the entry ("0", "0", "4"/"7") for the port number=3, 4 signifies that the ports corresponding to the port number=3, 4 are free and the optical input ports thereof are connected (directly coupled) to the free ports (optical output ports) corresponding to the port number=4, 7.

Moreover, the entry ("1", "6", "6") for the port number=5 signifies that the equipment r is connected to the port of the port number=5 and the other connection party (communication party) therefor is the equipment r connected to the port of the port number=6 and the communication is monitored by the optical output port of the port number=6. Likewise, the entry ("1", "5", "5") for the port number=6 signifies that the equipment r is connected to the port of the port number=6 and the other connection party (communication party) therefor is the aforesaid equipment r connected to the port of the port number=5 and the communication is monitored by the optical output port of the port number=5.

Still moreover, the entry ("0", "0", "8") for the port number=7 signifies that the port of the port number=7 is free and the optical input port thereof is connected (directly coupled) to the optical output port of the port number=8 so that the optical power monitor is made through the use of this optical output port, and the entry ("0", "0", "9") for the port number=8 signifies that the port of the port number=8 is free and the optical input port thereof is connected (directly coupled) to the optical output port (spare port) of the port number=9 so that the optical power monitor is made through the use of this spare port.

Figures 12A, 12B, 12C:
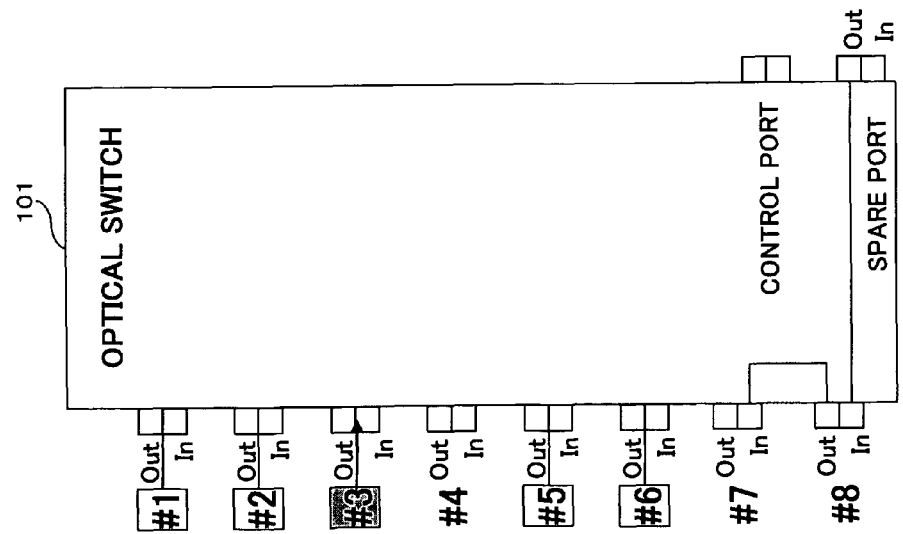
FIG. 12(A) is a block diagram showing a connection example in an optical connection switching facility for explaining an IT equipment connection recognition function according to an adjacent input/output port direct-coupling method (quasi-fixing method) of the optical connection automatic-switching apparatus shown in FIG. 1.
FIG. 12(B) is an illustration of a variation of the registration contents in an optical power information table in the connection example shown in FIG. 12(A)
FIG. 12(C) is an illustration of a variation of the registration contents in an equipment information table in the connection example shown in FIG. 12(A)

In this state, for example, as shown in FIG. 12(A) when the equipment r is newly connected to the free port (port number=3) of the optical switch 101, the output light from this equipment r is incident on the light-receiving element c4' provided in the optical output port of the port number=4 and is transmitted through the light reception circuit 102 to the control circuit 103. Therefore, for example, as shown in FIG. 12(B), the control circuit 103 updates that entry contents of the optical power information (optical power information management table 108) for each port retained and managed in the storage medium 106. FIG. 12(B) shows a state in which the optical power before the connection of the equipment r is "−40 dBm" and it is updated to "−8 dBm" through the connection of the equipment r.

In addition, the management control circuit 103 controls the optical switch 101 to cancel the connection (direct coupling) between the optical input port of the port number=3 and the optical output port of the port number=4 and, for example, as shown in FIG. 12(C), updates the entry contents of the equipment information management table 107. That is, with respect to the entry of the port number=3, the "equipment connection" is set at "1" (occurrence) and the re-allocation is made in terms of the monitor position. In FIG. 12(C), although the monitor position (port) is in a non-allocated condition since the newly connected equipment r is in a service non-providing condition, the allocation of the monitor position is determined afterwards when the equipment r is determined as the other communication party and the mutual connection is established therebetween. Following this, the control circuit 103 carries out the optical power monitor at this monitor position.

That is, in this case, the management control circuit 103 functions as an adjacent port connection equipment state monitoring unit 139 which, in a state where the aforesaid equipment state monitoring unit 131 (see FIG. 1) controls the optical connection switching facility 101 to directly couple the optical input port i_I and the optical output port I_O of the adjacent optical input/output port (free port) i_IO to which the equipment r is not connected and the light reception quantity in the light-receiving element ci' of the optical output port i_I0 is handled or employed as the optical information, port i_I0 is handled or employed as the optical information, monitors a variation thereof.

Figure 13:
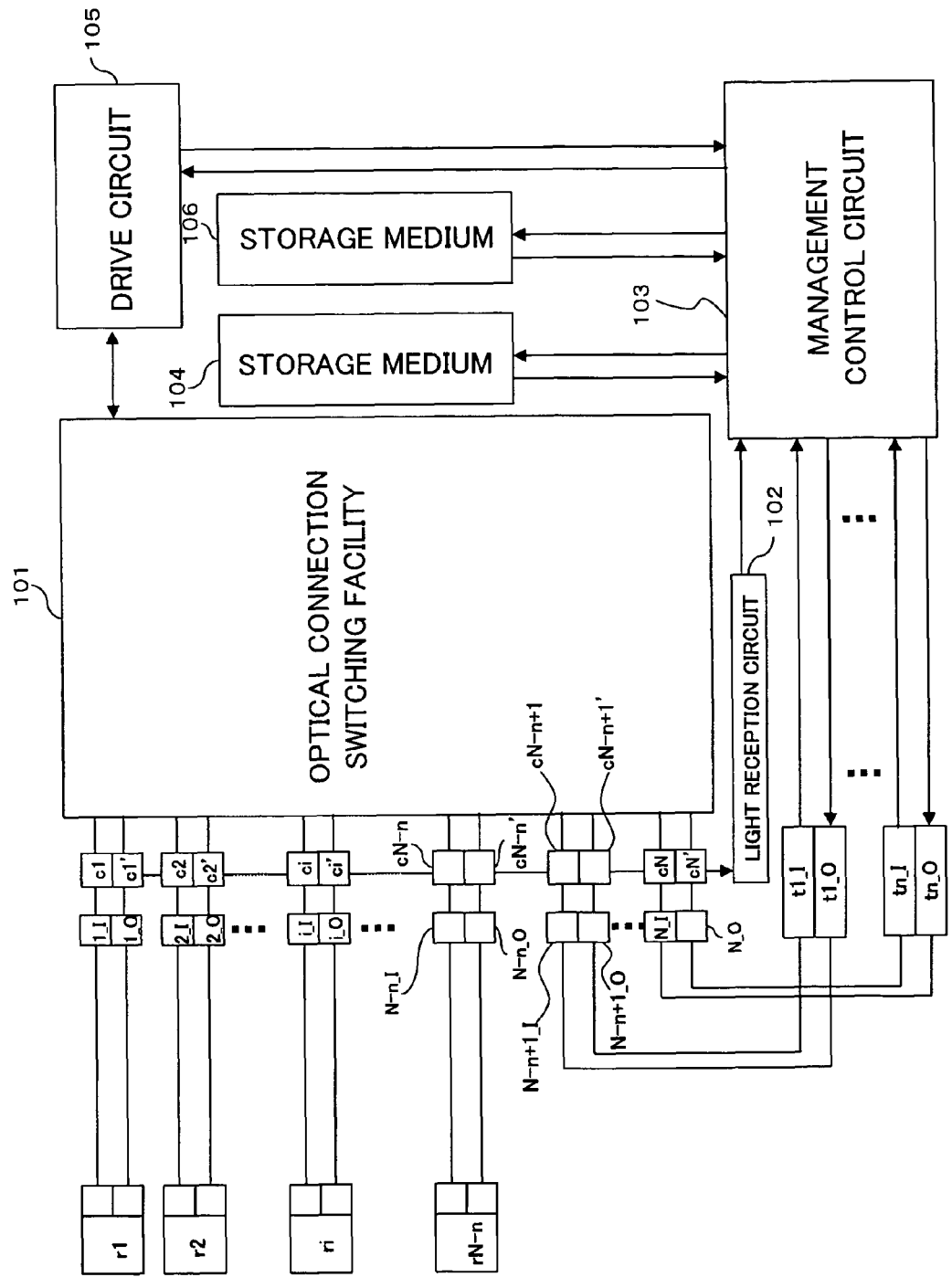
FIG. 13 is a block diagram useful for explaining an IT equipment connection recognition function based on the association between equipment information and optical power information in the optical connection automatic-switching apparatus shown in FIG. 1.
Figure 14:
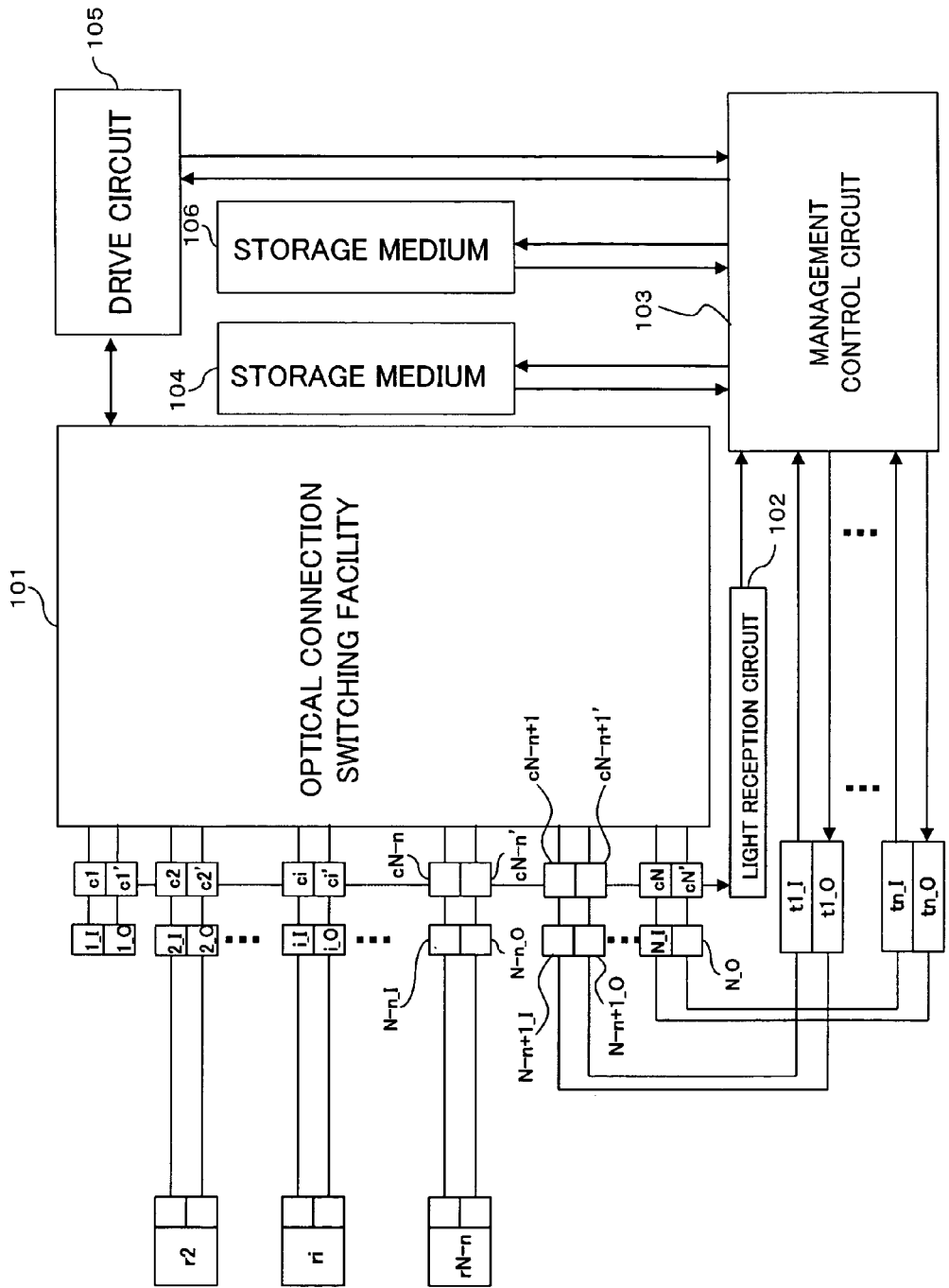
FIG. 14 is a block diagram useful for explaining an IT equipment connection recognition function based on the association between equipment information and optical power information in the optical connection automatic-switching apparatus shown in FIG. 1.
Figure 15:
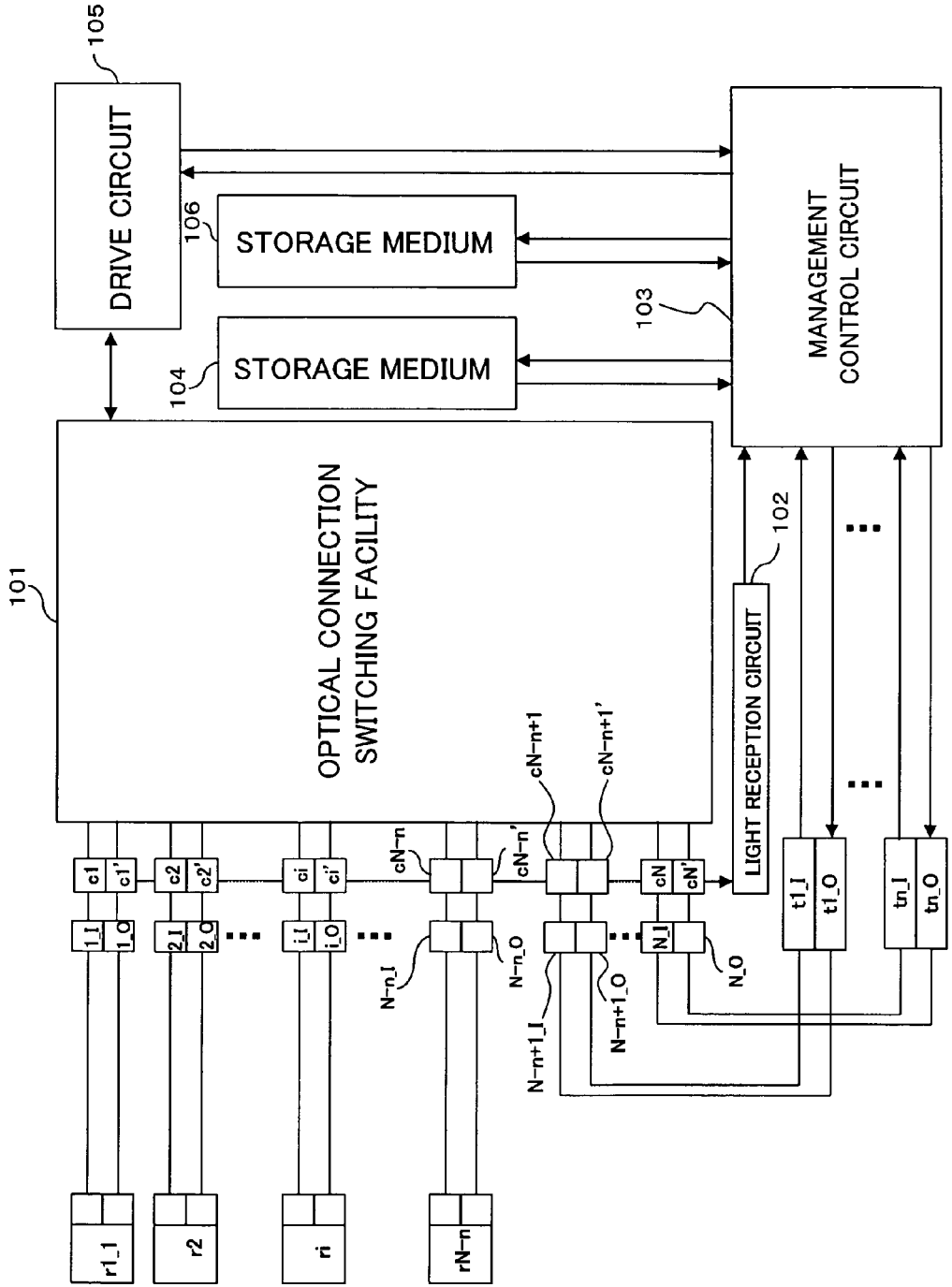
FIG. 15 is a block diagram useful for explaining an IT equipment connection recognition function based on the association between equipment information and optical power information in the optical connection automatic-switching apparatus shown in FIG. 1.

(h) IT Equipment Connection Automatic-Recognition Based on Cooperation between Connected Equipment Information and Optical Power Information As FIG. 13 shows, let it be assumed that the IT equipment r1, r2, ri, . . . , rN-n are connected to this optical connection automatic-switching apparatus (state h1) and, in this state, the IT equipment r1, which has been connected to the port 1_IO, is disconnected from this optical connection automatic-switching apparatus as shown in FIG. 15 (state h2) and, thereafter, the IT equipment r1_1 is newly connected to the same port 1_IO as shown in FIG. 15 (state h3).

In this case, according to only the information in the optical power information retaining storage medium 106, even if the equipment connection state varies such that the state h1→the state h2→the state h3, the management control circuit 103 observes only the optical power variation of rise (up)→fall (down)→rise (up) for the port 1_IO, and difficulty is encountered in distinguishing between the state h1 and the state h3.

In this case, the additional use of the information in the equipment information retaining storage medium 104 enables finer state management.

First, in the case of the state h1 (see FIG. 13), for example, the equipment information in the storage medium 104 and the optical power information in the storage medium 106 are as shown in the following tables 2 and 3.

TABLE 2

Information in Storage Medium 104

| Port No. | Equipment |
|---|---|
| 1 | r1 |
| 2 | r2 |
| . | . |
| . | . |
| . | . |
| H | rh |
| I | ri |
| . | . |
| . | . |
| . | . |
| N − n | — |

TABLE 3

| Information in Storage Medium 106 | |
| --- | --- |
| Port No. | Optical Power [dBm] |
| 1 | −6 |
| 2 | −8 |
| . | . |
| . | . |
| . | . |
| H | −9 |
| I | −7 |
| . | . |
| . | . |
| . | . |
| N − n | −40 |

In the case of shifting to the aforesaid state h2, for example, the equipment information in the storage medium 104 and the optical power information in the storage medium 106 become as shown in the following tables 4 and 5, and due to the cutoff of the optical power and the disappearance of the connected equipment information, the control circuit 103 can recognize that the IT equipment r1, which has been connected to the port 1_IO of the port number=1, is disconnected therefrom.

TABLE 4

| Information in Storage Medium 104 | |
| --- | --- |
| Port No. | Equipment |
| 1 | |
| 2 | r2 |
| . | . |
| . | . |
| . | . |
| H | rh |
| I | ri |
| . | . |
| . | . |
| . | . |
| N − n | — |

TABLE 5

| Information in Storage Medium 106 | |
| --- | --- |
| Port No. | Optical Power [dBm] |
| 1 | −40 |
| 2 | −8 |
| . | . |
| . | . |
| . | . |
| H | −9 |
| I | −7 |
| . | . |
| . | . |
| . | . |
| N − n | −40 |

Moreover, when the IT equipment r1_1 is connected to the port 1_I0 and the shifting to the aforesaid state h3 occurs, the equipment information in the storage medium 104 and the optical power information in the storage medium 106 become as shown in the following tables 6 and 7.

TABLE 6

| Information in Storage Medium 104 | |
| --- | --- |
| Port No. | Equipment |
| 1 | r1_1 |
| 2 | r2 |
| . | . |
| . | . |
| . | . |
| H | rh |
| I | ri |
| . | . |
| . | . |
| . | . |
| N − n | — |

TABLE 7

| Information in Storage Medium 106 | |
| --- | --- |
| Port No. | Optical Power [dBm] |
| 1 | −6 |
| 2 | −8 |
| . | . |
| . | . |
| . | . |
| H | −9 |
| I | −7 |
| . | . |
| . | . |
| . | . |
| N − n | −40 |

In this case, although difficulty is experienced in distinguishing from the state 1 on the basis of only the optical power information, by making reference to the connected equipment information in the storage medium 104, the control circuit 103 can recognize that the IT equipment r1_1 different from that in the state 1 is newly connected thereto.

(i) Trouble Detection at Disconnection of Output Side Fiber

Figure 16:
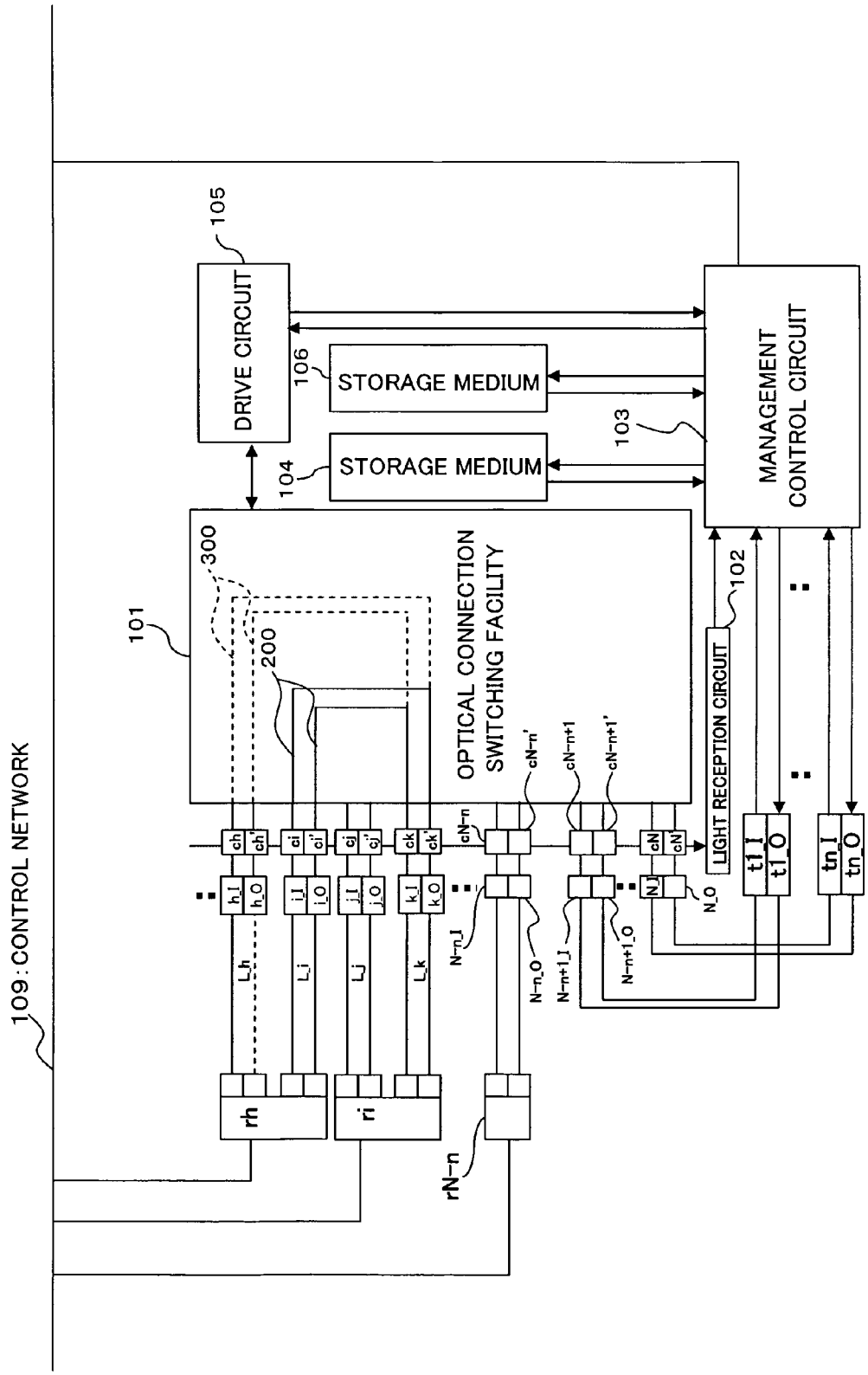
FIG. 16 is a block diagram useful for explaining a redundant path switching function in a case in which a disconnection of an optical output port side optical link in the configuration shown in FIG. 6 or 7.

In the redundant configuration (see FIGS. 6 and 7) described above in the item (e), if a trouble (disorder) occurs in the optical link L_h connected to the optical output port h_O of this optical connection automatic-switching apparatus, the light-receiving element ch or ch' provided in this connection automatic-switching apparatus cannot detect that trouble. For this reason, the trouble is detected through the use of a separate line network 109 shown in FIG. 16. This network will be referred to hereinafter as a control network 109. This control network 109 is a network connected so that the management control circuit 103 and each IT equipment r are communicable with each other.

Accordingly, an interface is provided in each of the IT equipment r and the management control circuit 103 of this optical connection automatic-switching apparatus for the connection to this control network 109. Moreover, in a case in which a trouble occurs in the optical link L_h connected to the optical output port h_O of this optical connection automatic-switching apparatus, the communication is cut off between the equipment rh and the equipment ri. The equipment rh or ri detects this information on the communication cutoff and notifies the trouble information through the control network 109 to the management control circuit 103 of the optical connection automatic-switching apparatus. Therefore, the optical connection automatic-switching apparatus (management control circuit 103) can recognize the trouble and can perform the switching to the redundant path as mentioned above.

As described above in detail, according to this embodiment, the optical network connection switching can be automated at the equipment connection management, the optical network re-construction and the occurrence of a trouble and, hence, the time needed for that operation is considerably reducible up to approximately 1 hour, as compared with the conventional technique depending on the manual operation and requiring several days to several weeks for the operation. Therefore, the maintenance/operation/management cost of an optical network constructed through the use of this optical connection automatic-switching apparatus is considerably reducible.

In addition, since one optical connection automatic-switching apparatus (body of equipment) can cope with diverse types of optical communication interfaces, the number of connection switching apparatus to be used for the connections is considerably reducible, thus lowering the initial introduction cost at the optical network construction.

Still additionally, when the management control circuit 103 or this circuit 103 and the storage media 104 and 106 is mounted as one function of a remote maintenance terminal or the like, the aforesaid connection management or the connection switching is remotely controllable from the terminal, which enables the operations such as the connection management and the connection switching in the optical connection switching facility 101 to be conducted more efficiently.

[B] Description of Further Embodiment

First One (B1) Different Configuration 1

Figure 19:
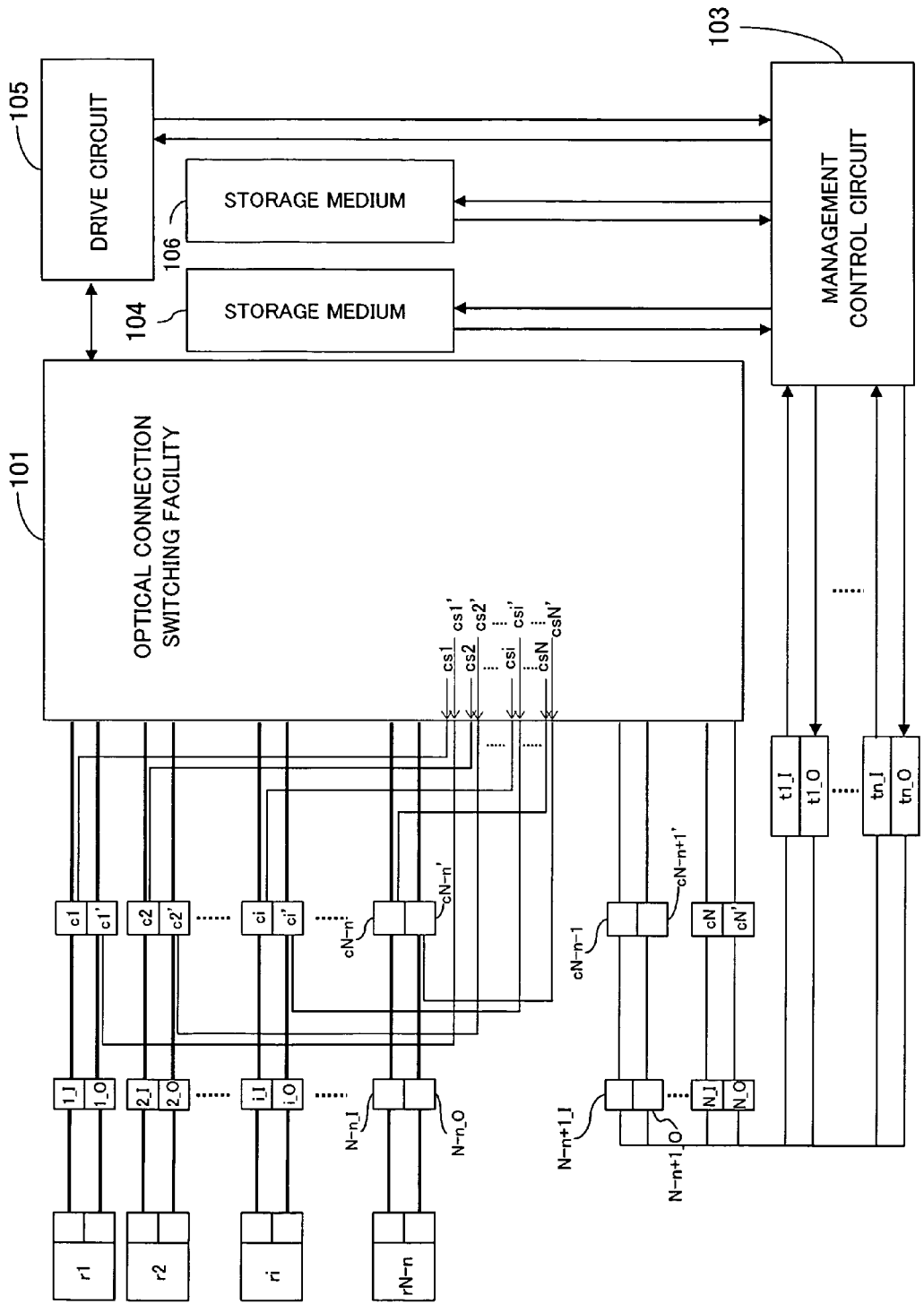
FIG. 19 is a block diagram showing a configuration of an optical connection automatic-switching apparatus (optical connection switching apparatus) according to a further embodiment (first one) of the present invention.

FIG. 19 is a block diagram showing a configuration of an optical connection automatic-switching apparatus (optical connection switching apparatus) according to a further embodiment (first one) of the present invention. As well as the configuration described above, the optical connection automatic-switching apparatus shown in FIG. 19 is made up of N sets of optical input/output ports 1_I, 2_I, ..., N-n_I and i_0, 2_O, ..., N-n_O in total, optical input ports M-n+1_I, ..., N_I and optical output ports N-n+1_O serving as n sets of control ports corresponding to the number of corresponding types of interfaces of IT equipment r1, r2, ..., rN-n, an optical connection switching facility (optical switch) 101 connected through optical wiring (optical fibers) to the n sets of ports 1_I, ..., N_1 and i_O, ..., N_O in total, a management control circuit 103, storage mediums 104, 106, a drive circuit 105, and a plurality of (n) sets of optical transmitters t1_O, t2_O, ..., tn_O or optical receivers t1_I, t2_I, ..., tn_I or both (which will sometimes be referred to generally as optical transmitting/receiving units t1, t2, ..., tn). In the following description, the same reference numerals as those used above designate the same or similar parts unless otherwise specified particularly.

Each of the total of N (sets) ports of this optical connection automatic-switching apparatus is equipped with an optical branch circuit whereby a portion of inputted light and/or outputted light branches. These optical branching circuits can be provided in the optical output ports (transmission ports) 1_O, 2_O, ..., N-O as indicated by reference numerals c1', c2', ..., cN' in FIG. 19, in the optical input ports (reception ports) 1_I, 2_I, ..., N-I as indicated by reference numerals c1, c2, ..., cN in FIG. 19, or in both the optical input ports 1_I, 2_I, ..., N-I and the optical output ports 1_O, 2_O, ..., N-O.

Moreover, two branched signal lights from each of the optical branch circuits c1, c2, ..., cN, c1', c2' ..., cN' are led through optical wiring (optical fibers) to the optical connection switching facility (optical switch) 101. In detail, since one of the branched lights is used as a main signal and used for the connection between the IT equipment (see thick solid lines in FIG. 19) while the other branched light is used as a monitor control signal, they are connected to monitor control ports cs1, cs2, ..., csN, cs1', cs2', ..., csN' provided in the optical connection switching facility 101, respectively.

(B1-1) IT Equipment Connection and Disconnection Automatic-Recognition

The management control circuit 103 controls the optical connection switching facility 101 through the drive circuit 105 and connects the monitor control ports cs1, cs2, ..., csN, cs1', cs2', ..., csN' to the control ports connected to the optical transmitting/receiving units t1, t2, ..., tn. At this time, in a case in which the number of optical transmitting/receiving units t1, t2, ..., tn is smaller than the number of monitor control ports cs1, cs2, ..., csN, cs1', cs2', ..., csN', a plurality of monitor control ports are successively (in a circulative manner) connected to the control ports connected to some optical transmitting/receiving units t1, t2, ..., tn (no order required).

Thus, a portion of main signal light between the optical connection switching facility 101 and the IT equipment, connected, is sectioned by the branch circuits c1, c2, ..., cN, c1', c2', ..., cN' to be transmitted through the monitor control ports cs1, cs2, ..., csN, cs1', cs2', ..., csN', the optical connection switching facility 101 and the optical transmitting/receiving units t1, t2, ..., tn to the management control circuit 103.

Accordingly, the optical power information on the respective ports 1_IO to N_IO can be monitored in the management control circuit 103 without using the above-mentioned light reception circuit 102 (for example, see FIG. 1) and, in a case in which the IT equipment r having an optical communication interface is connected to any one of the ports 1_IO to N_IO (or disconnected from any one of the ports 1_IO to N_IO), the optical power fluctuation information is sent to the management control circuit 103, which enables the automatic recognition on the fact that the IT equipment r is newly connected (or the IT equipment r is removed). Moreover, the management control circuit 103 can read (analyze) the contents of the signal.

Figure 20:
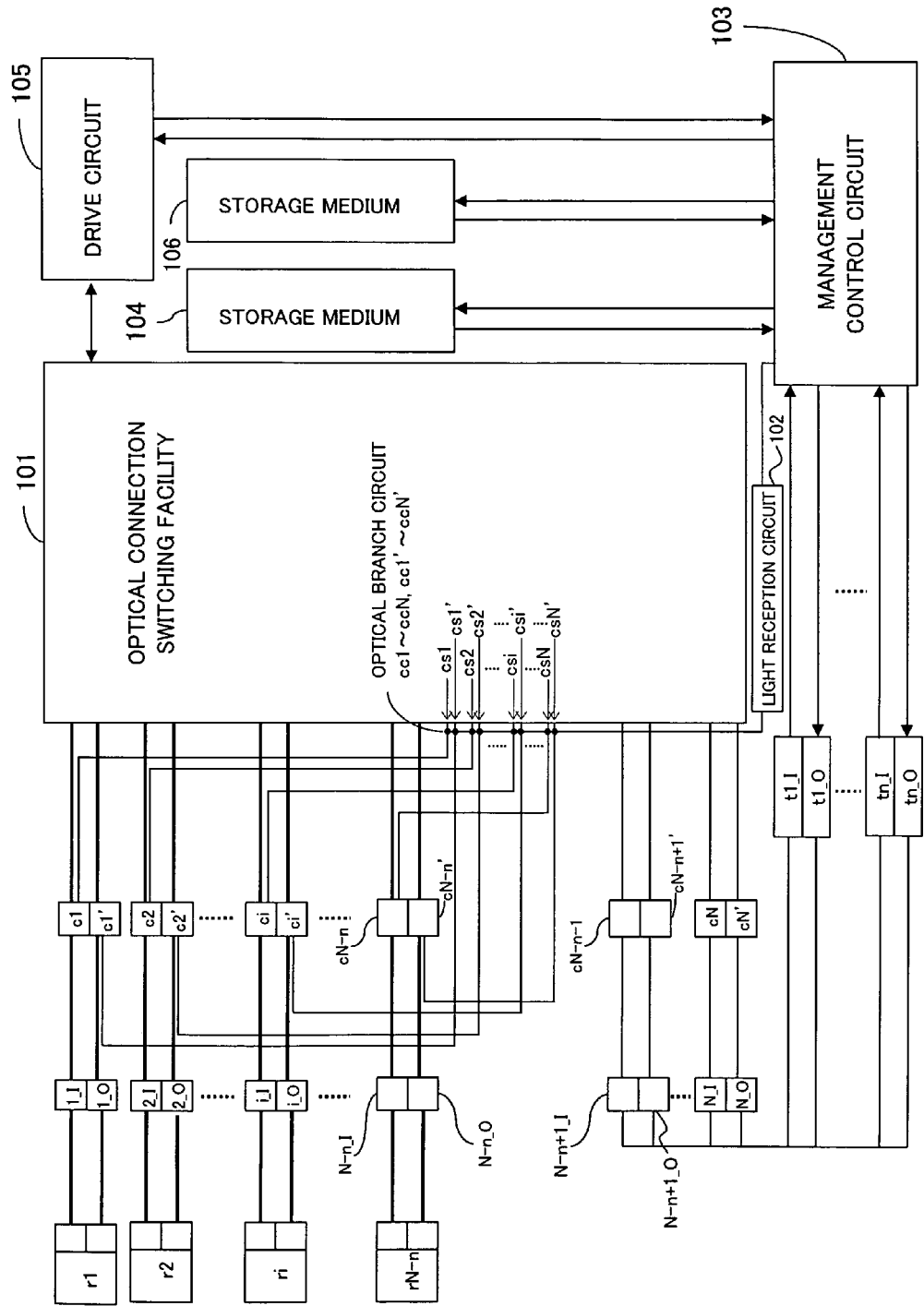
FIG. 20 is a block diagram showing another configuration of the optical connection automatic-switching apparatus shown in FIG. 19.

In this connection, for example, as shown in FIG. 20, in the case of the employment of an arrangement in which each of optical branch circuits made to further divide (diverge) each of the branched lights (monitor control lights) from the aforesaid optical branch circuits c1, c2, ..., cN, c1', c2' ..., cN' is additionally provided so that one of the divided lights from each of these optical branch circuits cc1, cc2, ..., ccN, cc1', cc2' ..., ccN' is coupled to the optical connection switching facility 101 (monitor control ports cs1, cs2, ..., csN, cs1', cs2', ..., csN') while the other is coupled to a light reception circuit 102, the management control circuit 103 can monitor the optical power fluctuation of the ports 1_IO to N_IO (connection/disconnection of equipment) at all times by way of the light reception circuit 102.

(B1-2) IT Equipment Automatic-Recognition (Multi-Interface)

In a case in which an equipment r is newly connected to one port i_IO of this optical connection automatic-switching apparatus, the information on the new connection of the equipment r is fed to the management control circuit 103 as mentioned above. The management control circuit 103 controls the optical connection switching facility 101 through the drive circuit 105 to connect the optical input/output port i_IO connected to the equipment r to one optical input/output port (control port) j_IO connected to the optical transmitting/receiving unit tk connected to the management control circuit 103.

In addition, the management control circuit 103 waits for a signal from the equipment r connected thereto. When the equipment r carries out some communication and transmits a data frame, the management control circuit 103 acquires, as identification information on the equipment r, the transmitting-side address information put in the data frame. Thus, the management control circuit 103 can make out a port-address correspondence table in which the acquired address information and the port (number) of the optical connection automatic-switching apparatus are associated with each other. For example, this correspondence table is retained and kept in the storage medium 104.

That is, in the aforesaid optical connection automatic-switching apparatus, the optical branch circuits $c_1, c_2, \ldots, c_N, c_1', c_2' \ldots, c_N'$ are provided with respect to one of or both the input port and output port of the optical connection switching facility 101, and one of the outputs from each of the optical branch circuits $c_1, c_2, \ldots, c_N, c_1', c_2' \ldots, c_N'$ is fed as a main signal light to the optical connection switching facility 101 while the other is fed as a monitor control light thereto, and the management control circuit 103 controls the optical connection switching facility 101 to make connections between the optical input/output ports connected to the optical transmitting/receiving units $t_1, t_2, \ldots, t_n$ and the optical input/output ports coupled to the monitor control lights for, through the use of the optical transmitting/receiving units $t_1, t_2, \ldots, t_n$, acquiring the information on the equipment r (equipment identification information such as address information) from the aforesaid monitor control light and managing it and further for monitoring the optical power information on the optical input/output ports.

(B1-3) IT Equipment Automatic-Recognition (Multi-Interface)

In a case in which the equipment r is newly connected to one port i_IO of this optical connection automatic-switching apparatus, the information on the new connection of the equipment r is sent to the management control circuit 103. Upon receipt of this information, the management control circuit 103 carries out an interface decision process.

That is, the Ethernet, a fiber channel or means capable of reading a data frame is prepared as the optical transmitting/receiving unit tk to be connected to the management control circuit 103 of this optical connection automatic-switching apparatus, and the management control circuit 103 scans the protocol and the bit rate with respect to the newly connected equipment r through this optical transmitting/receiving unit tk to acquire the type of the interface of this equipment r and the address information (information on one of or both the physical address and logical address) on this equipment r and preserve this address information in, for example, the storage medium 104 or 106 in a state associated with the port information (number) or the like.

Figure 5:
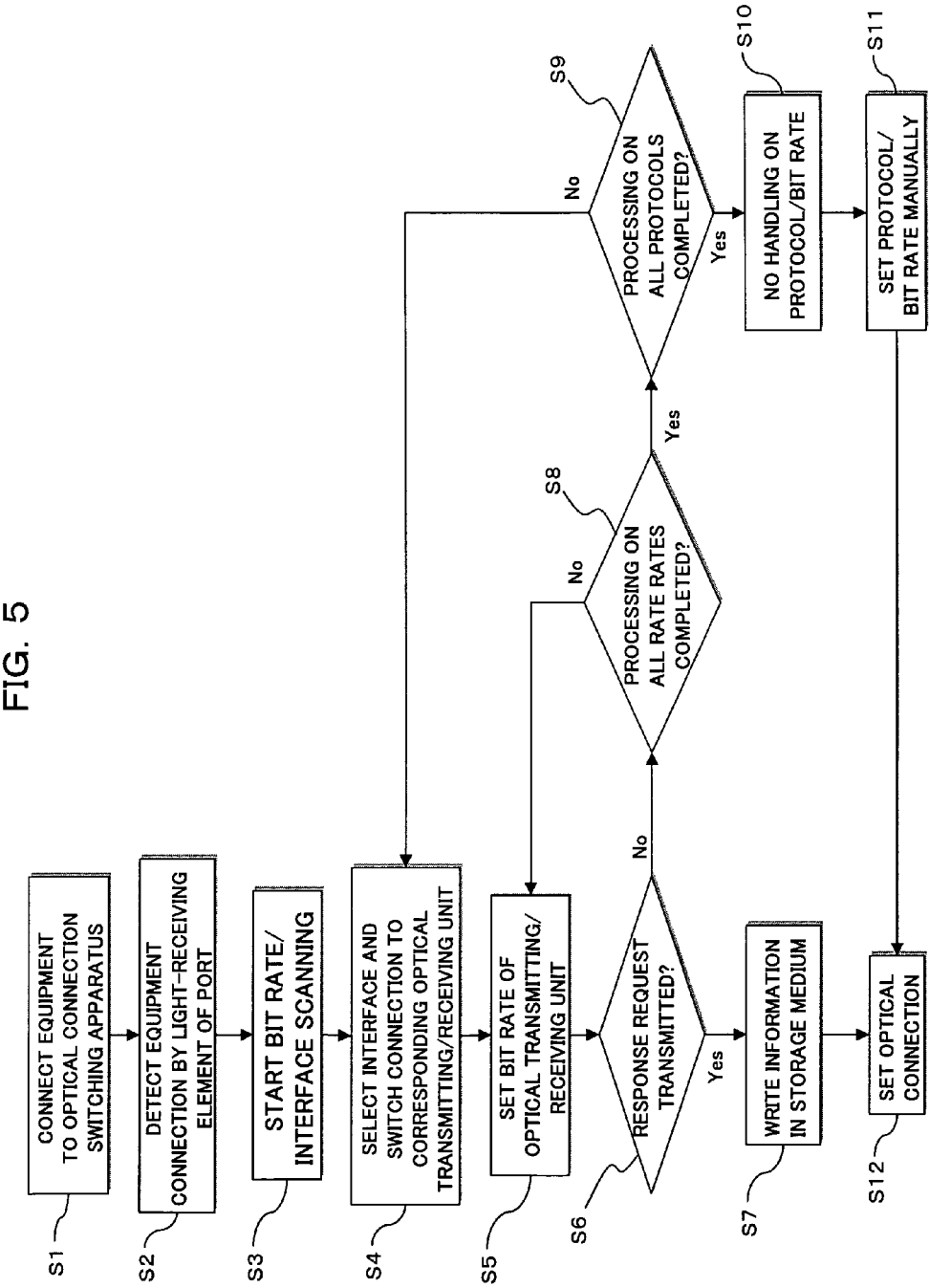
FIG. 5 is a flow chart useful for explaining an operation (control) at equipment connection by the optical connection automatic-switching apparatus (management control circuit) shown in FIG. 1.

Incidentally, the scanning items in the aforesaid protocol and bit rate scanning processing are the same as those shown in the above-mentioned table 1, and the detailed procedure from the connection of the equipment r to this optical connection automatic-switching apparatus to the realization of the communication between equipment r is the same as the above-described procedure in the flow chart (steps S1 to S12) of FIG. 5.

(B) Different Configuration 2

Figure 21:
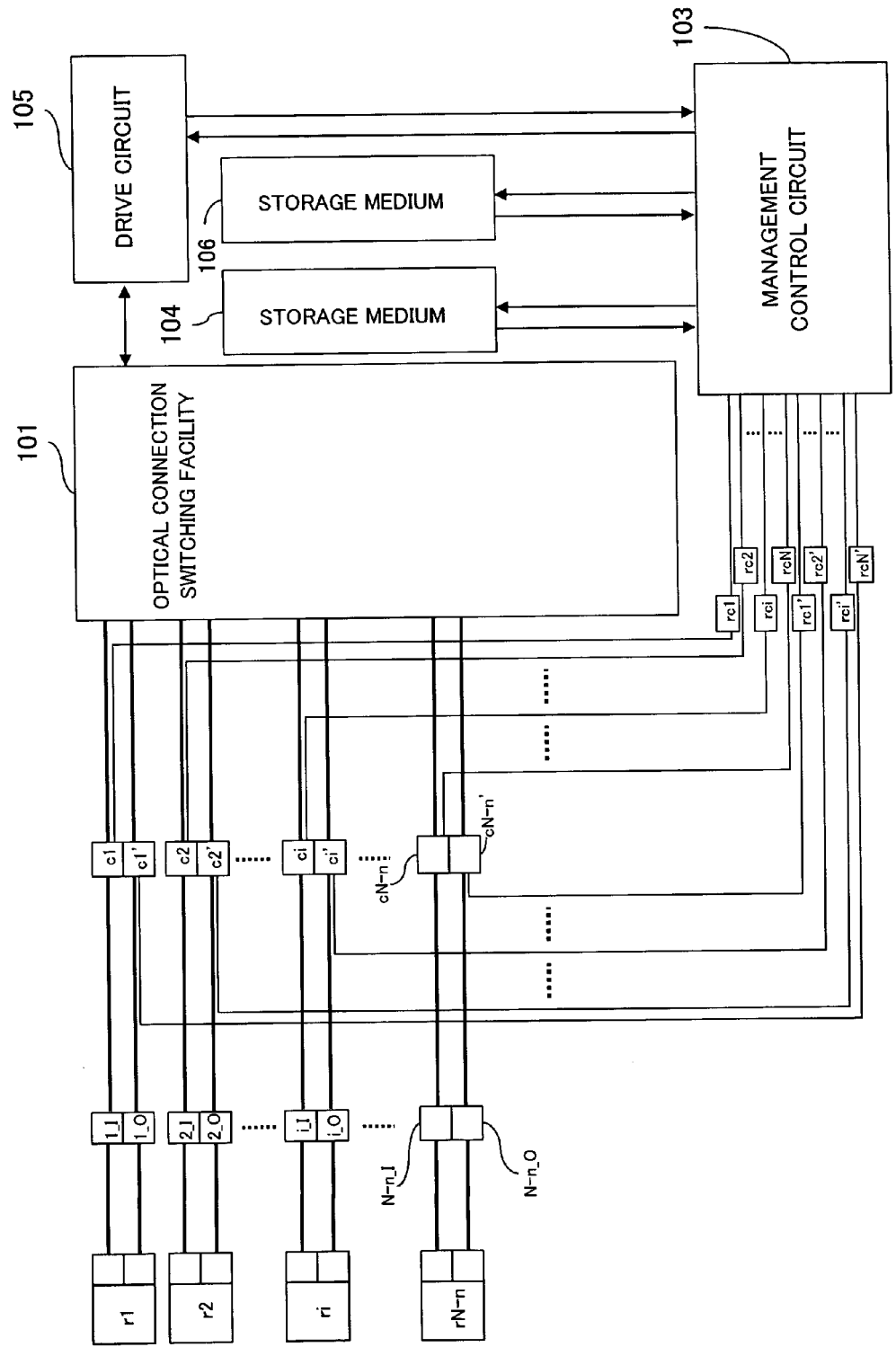
FIG. 21 is a block diagram showing a further configuration of the optical connection automatic-switching apparatus shown in FIG. 19.

FIG. 21 is a block diagram showing a different configuration of the optical connection automatic-switching apparatus (optical connection switching apparatus) according to a further embodiment (second one) of the present invention. As well as the configuration described above, the optical connection automatic-switching apparatus shown in FIG. 21 is made up of N sets of optical input/output ports $1\_I, 2\_I, \ldots, N\_I$ and $1\_O, 2\_O, \ldots, N\_O$ in total, an optical connection switching facility (optical switch) 101, a management control circuit 103, storage mediums 104, 106 and a drive circuit 105.

In addition, each of the total of N (sets) ports of this optical connection automatic-switching apparatus is equipped with an optical branch circuit whereby a portion of inputted light and/or outputted light branches. These optical branching circuits can also be provided in the optical output ports (transmission ports) $1\_O, 2\_O, \ldots, N\text{-}O$ as indicated by reference numerals $c_1', c_2', \ldots, c_N'$ in FIG. 21, in the optical input ports (reception ports) $1\_I, 2\_I, \ldots, N\text{-}I$ as indicated by reference numerals $c_1, c_2, \ldots, c_N$ in FIG. 21, or in both the optical input ports $1\_I, 2\_I, \ldots, N\text{-}I$ and the optical output ports $1\_O, 2\_O, \ldots, N\text{-}O$.

Moreover, one of the signals from the optical branch circuits $c_1, c_2, \ldots, c_N, c_1', c_2' \ldots, c_N'$ is led through an optical wiring (optical fiber) to the optical connection switching facility (optical switch) 101, while the other is coupled through an optical wiring (optical fiber) to the corresponding one of optical receivers indicated by the reference numerals $rc_1, rc_2, \ldots, rc_N, rc_1', rc_2', \ldots, rc_N'$ in FIG. 21 on a one-to-one basis. Each of these optical receivers $rc_1, rc_2, \ldots, rc_N, rc_1', rc_2', \ldots, rc_N'$ is connected to the management control circuit 103 and has a function to convert an inputted optical signal into an electric signal and a function to transmit this electric signal to the management control circuit 103.

Thus, an optical signal from each IT equipment is partially divided and received by the corresponding optical receiver $rc_1, rc_2, \ldots, rc_N, rc_1', rc_2', \ldots, rc_N'$ to be converted into an electric signal and sent to the management control circuit 103, thereby allowing the optical power fluctuations of the input/output ports $1\_I, 2\_I, \ldots, N\text{-}n\_I$ and $1\_O, 2\_O, \ldots, N\text{-}n\_O$ to be monitored in the management control circuit 103 without exerting influence such as suspension of communication even if the IT equipment are in communication to each other, and enabling reading (analyzing) the contents of the signal, for example, acquiring the information on the equipment r (equipment identification information such as address information).

Incidentally, a reception port (optical reception function) of an optical transmitting/receiving unit such as an optical transceiver can also be used as the optical receivers $rc_1, rc_2, \ldots, rc_N, rc_1', rc_2', \ldots, rc_N'$.

(B2-1) IT Equipment Connection and Disconnection Automatic-Recognition

For example, in a case in which an IT equipment r having an optical communication interface is connected to one port, light emitted from this IT equipment is incident on the port and a portion of the light diverges by one optical branch circuit $c_1, c_2, \ldots, c_N$ provided in the port and transmitted through the corresponding one optical receiver $rc_1, rc_2, \ldots, rc_N$ to the management control circuit 103.

Thus, the management control circuit 103 can recognize a fluctuation of the light reception quantity (increase in light reception quantity) on the aforesaid port and can automatically recognize the fact that the IT equipment r having an optical communication interface has been connected to the port.

(B2-2) IT Equipment Automatic-Recognition (Single Interface)

In a case in which an IT equipment is newly connected to one port i_IO of this optical connection automatic-switching apparatus, as mentioned above, the information on the new connection of the IT equipment r is sent to the management control circuit 103 by way of the optical branch circuits c1, c2, . . . , cN provided in the optical input ports 1_I, 2_I, . . . , N_I of the optical connection automatic-switching apparatus and the optical receivers rc1, rc2, . . . , rcN, or the optical branch circuits c1', c2', . . . , cN' provided in the optical output ports 1_O, 2_O, . . . , N_O and the optical receivers rc1', rc2', . . . , rcN'.

The management control circuit 103 analyzes the contents of a data frame accommodating information on source and destination addresses (logical or physical addresses), sent from the IT equipment r, and acquires the source address information. Therefore, the management control circuit 103 can produce a port-address correspondence table [address (equipment identification information) table] in which the acquired address information and the information on the port of the optical connection automatic-switching apparatus are associated with each other. This address table is retained and managed, for example, in the storage medium 104.

(B2-3) IT Equipment Automatic-Recognition (Multi-Interface)

Figure 22:
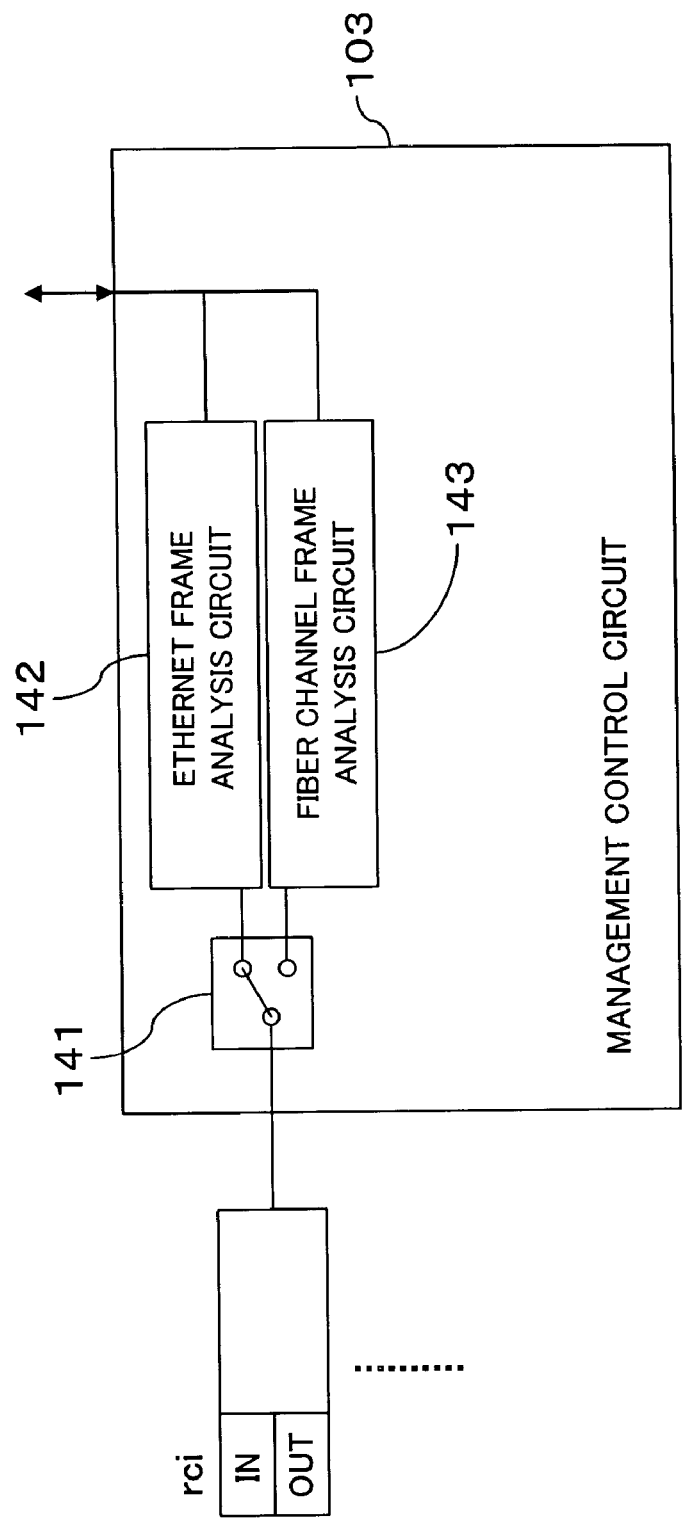
FIG. 22 is a block diagram showing a configuration of the management control circuit shown in FIG. 21.

In the configuration shown in FIG. 21, for realizing the IT equipment automatic-recognition handling the multi-interface, the processing using an electric circuit becomes necessary. The Ethernet and a fiber channel are taken as an example. FIG. 22 shows an example of a configuration of the management control circuit 103 in this case. In FIG. 22, reference mark rci represents any one of the optical receivers rc1, rc2, . . . , rcN in FIG. 21. Moreover, as shown in FIG. 22, as the optical receiver rci, it is also possible to prepare a reception-dedicated optical receiver, or to employ a reception port (reception function) of a general-purpose optical transceiver.

The management control circuit 103 includes an electric signal path switching switch 141m an Ethernet frame analysis circuit 142 and a fiber channel frame analysis circuit 143.

For example, as well as the case shown in FIG. 2, in a case in which an IT equipment J having an optical communication interface is connected to one port j, according to the above-described procedure, the management control circuit 103 automatically recognizes the connection of the IT equipment J and, thereafter, implements an analysis process on an inputted optical signal.

That is, the management control circuit 103 first connects the internal switch 141 to one (for example, Ethernet frame analysis circuit 142) of the analysis circuits 142 and 143 and, hence, a signal is inputted to the Ethernet frame analysis circuit 142, and the Ethernet frame analysis circuit 142 analyzes the contents of the inputted signal (frame). When, as a result, the signal contents can correctly read, the Ethernet frame analysis circuit 142 makes a decision that this inputted signal is an Ethernet frame and then reads a source address (one of or both logical address and physical address) from this frame. Accordingly, the management control circuit 103 can produce a port-address correspondence table in which the acquired address information and the port (number) of the optical connection automatic-switching apparatus are associated with each other. This correspondence table is retained and managed, for example, in the storage medium 104.

On the other hand, in a case in which the Ethernet frame analysis circuit 142 cannot correctly read the frame, the switch 141 is operated so that the signal path is connected to the fiber channel frame analysis circuit 143. Moreover, if the fiber channel frame analysis circuit 143 can correctly read the frame, the fiber channel frame analysis circuit 143 reads the source address (source ID) from this frame and, likewise, makes out a port-address correspondence table which in turn is preserved, for example, in the storage medium 104.

FIG. 26(A) shows an example of an Ethernet frame structure and FIG. 26(B) shows an example of a fiber channel frame structure. For example, in the case of the Ethernet frame, since, as shown in FIG. 26(A), preamble (7 bytes)+ start of frame delimiter (SFD) (1 byte) always appear at the head of the frame, if the Ethernet frame analysis circuit 142 cannot read the data corresponding to the leading 8 bytes, a decision can be made that this frame does not pertain to the Ethernet (it pertains to the fiber channel). Also in the case of handling the other frames (protocols), a discrimination on various types of protocols becomes feasible by grasping a characteristic point of the frame to make a collation.

Although this configuration handles the two types of interfaces of the Ethernet and the fiber channel, when the switch 141 is changed to a 1×n switch and a frame analysis circuit for a protocol which is to be an object of operation is properly added to the management control circuit 103, it can handle a greater variety of interfaces.

(Different Configuration 1 of Management Control Circuit 103)

Figure 23:
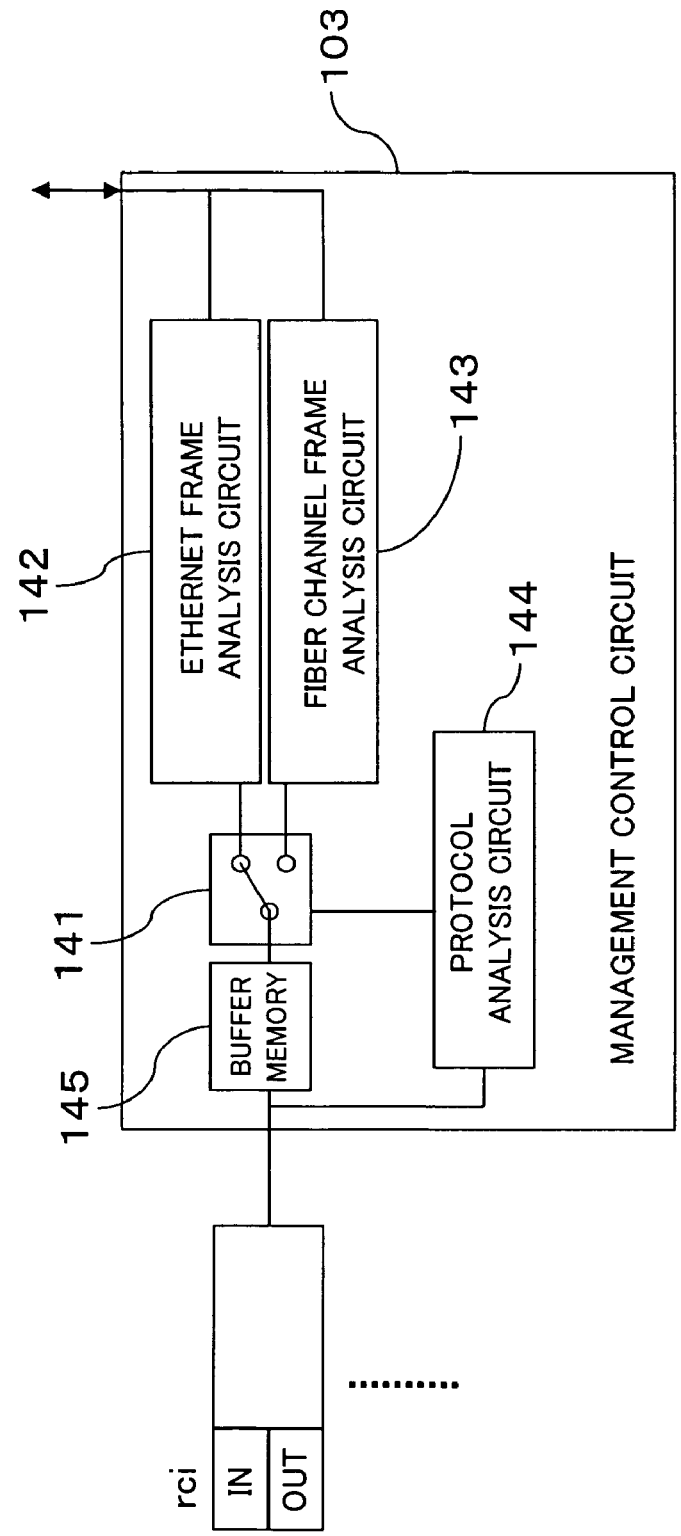
FIG. 23 is a block diagram showing another configuration of the management control circuit shown in FIG. 21.

FIG. 23 is an illustration of a different configuration 1 of the management control circuit 103. The management control circuit 103 shown in FIG. 23 differs from the above-mentioned circuit shown in FIG. 22 in that a protocol analysis circuit 144 and a buffer memory 145 are additionally provided therein.

In this case, the buffer memory 145 is for temporarily storing an inputted signal (data frame) from the optical receiver rci, and the protocol analysis circuit 144 is for making a decision as to the protocol on the inputted signal from an optical receiver rcj on the basis of the difference in frame structure mentioned above with reference to FIGS. 26(A) and 26(B) and, according to this decision result, changing the switch 141 to the frame analysis circuit 142 or 142 side which has an appropriate protocol.

In the management control circuit 103 configured as described above, the signal sent from the optical receiver rcj is divided so that one is inputted to the protocol analysis circuit 144 and the other is inputted to the buffer memory 145. Moreover, the protocol analysis circuit 144 makes a decision the protocol of the inputted signal on the basis of the difference in frame shown in FIGS. 26(A) and 26(B) and, according to the decision result, changes the switch 141 to the frame analysis circuit 142 or 143 which has a proper protocol.

After this change, the data frame accumulated in the buffer memory 145 is inputted to one the frame analysis circuits 142 and 143 so that this frame analysis circuit 142, 143 carries out the frame analysis, thereby specifying the source address (source ID), with this address information being preserved, for example, in the storage medium 104 in a state associated with the port number (in the form of a port-address correspondence table).

(Different Configuration 2 of Management Control Circuit 103)

Figure 24:
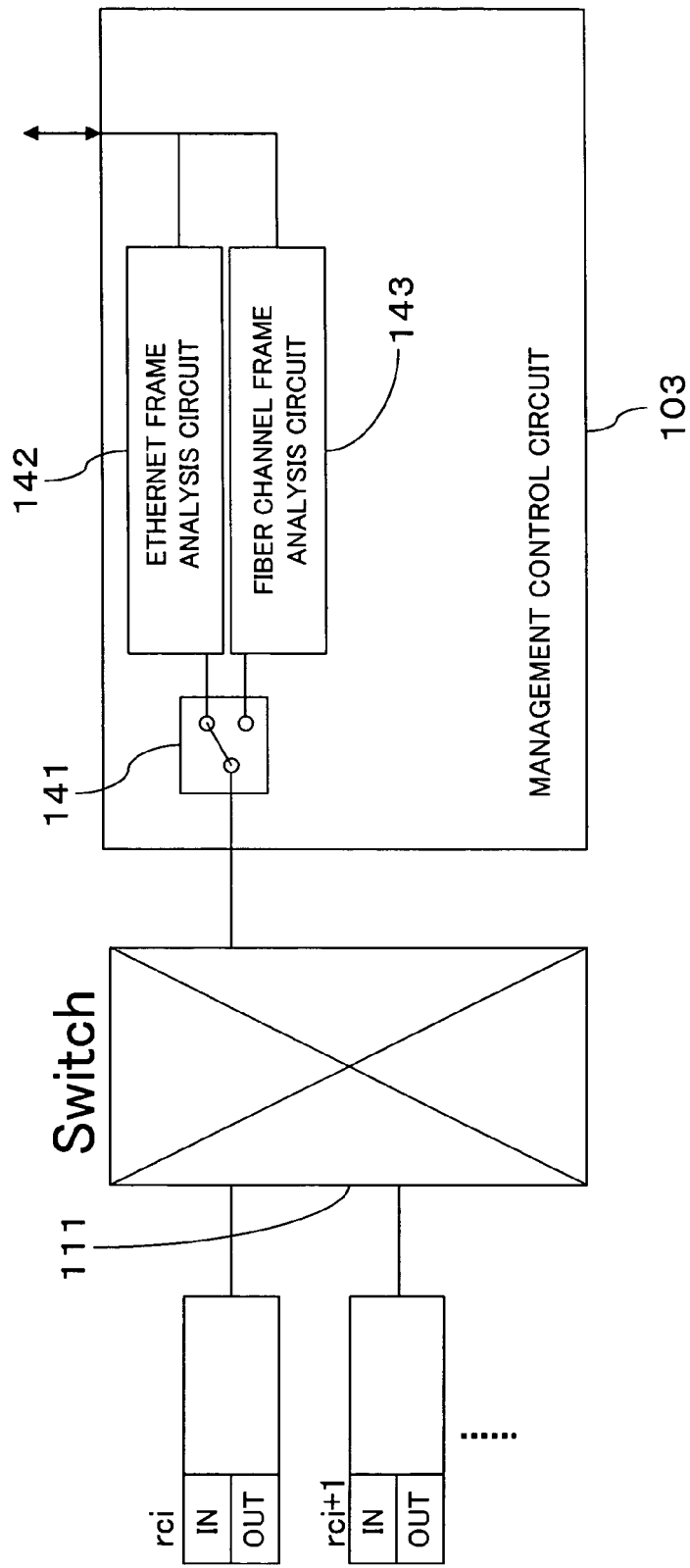
FIG. 24 is a block diagram showing a further configuration of the management control circuit shown in FIG. 21.
Figure 25:
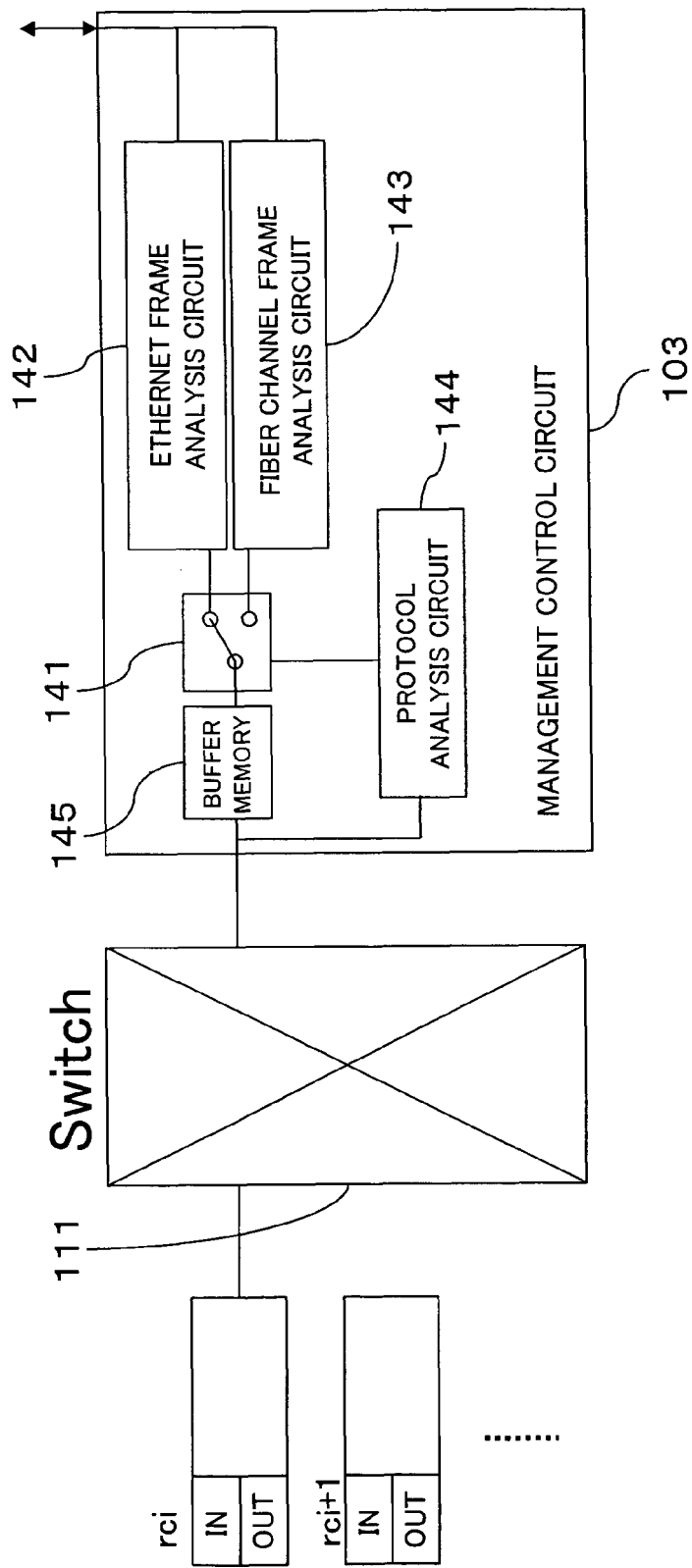
FIG. 25 is a block diagram showing a further configuration of the management control circuit shown in FIG. 21.

In the configuration of the management control circuit 103 shown in FIGS. 22 and 23, since the frame analysis circuits 142, 143, the protocol analysis circuit 144 and the buffer memory 145 become necessary with respect to each of the optical receivers rci, when these are all mounted for each of the receivers rci, an increase in apparatus scale and cost is unavoidable. For this reason, for example, as shown in FIGS. 24 and 25, a switch device 111 is provided between the plurality of optical receivers rci, rci+1, . . . and the management control circuit 103 in the configuration shown in FIGS. 22 and 23.

Through the use of this switch device 111, the signals outputted from the plurality of optical receivers rci, rci+1, . . . are successively fed to the management control circuit 103 in a time-division manner (no order required) to carry out the above-mentioned protocol decision process. Accordingly, even if the number of optical receivers rci, rci+1, . . . increases, the simplification of the management control circuit 103 is realizable without depending upon it.

(B2-4) Signal Monitor in Operation

In the case of employing a configuration in which, as described above with reference to FIGS. 19, 20 and 21, the diverged lights by the optical branch circuits c1, c2, . . . , cN, c1', c2', . . . , cN' are connected to the optical connection switching facility 101 to be fed to the optical transmitting/receiving units by way of the optical connection switching facility 101, as mentioned above, it is possible to analyze a signal from the equipment r which is in operation (communication).

Figure 27:
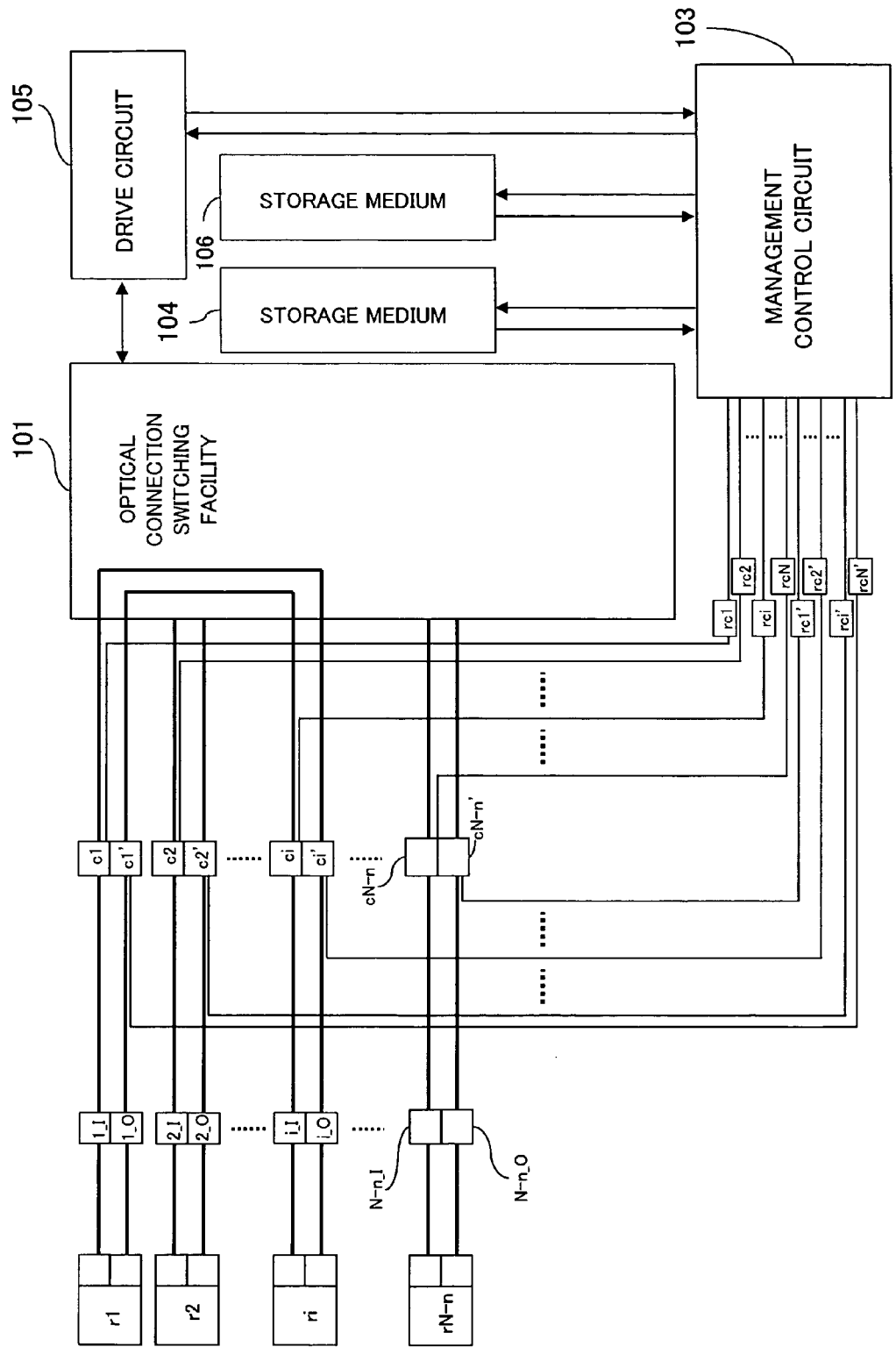
FIG. 27 is a block diagram showing a configuration of an optical connection automatic-switching apparatus for explaining a signal monitor which is in operation in the configuration shown in FIG. 21.

For example, in the configuration shown in FIG. 21, in a case in which an IT equipment r1 and an IT equipment ri are connected through this optical connection automatic-switching apparatus (optical connection switching facility 101) to each other as shown in FIG. 27, the signal outputted from the IT equipment r1 and inputted to the port 1_I of the optical connection automatic-switching apparatus is divided by the optical branch circuit c1 and fed through the optical receiver rc1 to the management control circuit 102 at all times.

Therefore, the management control circuit 103 can not only monitor the presence or absence of a signal but also analyze the contents of the signal to monitor the connection state. A firmer monitoring system can be constructed in cooperation with a management control software which operates in an upper layer.

[C] Description of Further Embodiment

Second One

The following description relates to an embodiment about an apparatus redundancy in the optical connection automatic-switching apparatus. Concretely, it relates to a trouble detecting method and a shift to a spare system after the trouble detection.

(C1) Trouble Detecting Method

First, a description will be given of an embodiment about a trouble detecting method. As mentioned above with reference to FIGS. 6 and 7, a physical path trouble such as an optical fiber disconnection can be monitored through the use of the light reception circuit provided in the optical connection automatic-switching apparatus. However, difficulty is encountered in monitoring a trouble (node trouble) which can originate principally from two troubles: a trouble of a control system such as a control firm (the management control circuit 103 and the drive circuit 105) and a power supply trouble.

Figure 28:
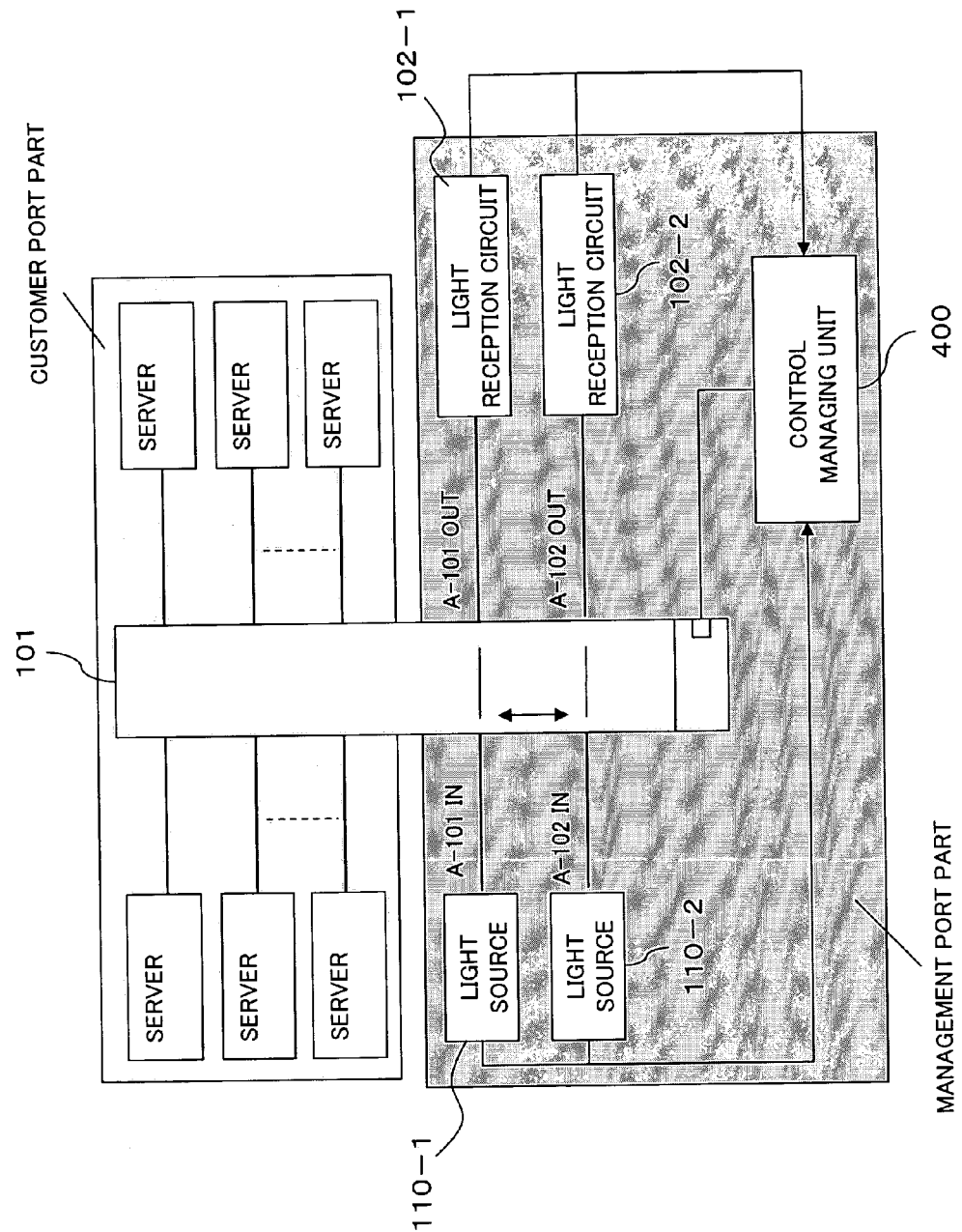
FIG. 28 is a block diagram showing a configuration of an optical connection automatic-switching apparatus (optical connection switching apparatus) according to a further embodiment (second one) of the present invention.

For this reason, with reference to FIG. 28, a description will be given hereinbelow of a method of fast detecting a trouble of a control system causing a node trouble. As shown in FIG. 28, in the optical connection automatic-switching apparatus (optical connection switching facility 101), one or more management (node trouble confirmation) input/output ports (each of which will hereinafter be referred to equally as a "management port" or "monitor port") are prepared (set) in addition to the input/output ports (each of which will hereinafter be referred to equally as a "customer port") for the IT equipment such as servers, and a light source is connected to an input port of the management port while a light reception circuit is connected to an output port of the management port. In FIG. 28, two ports are prepared as the management port and light sources 110-1 and 110-2 are connected to the input ports (A-101 IN, A-102 IN) thereof, respectively, while light reception circuits 102-1 and 102-2 are connected to the output ports (A-101 OUT, A-102 OUT), respectively, thereby placing the light sources and the light reception circuits into a redundant condition (redundant configuration).

However, the aforesaid monitor port can also be used as the aforesaid control port. That is, if some of the aforesaid optical transmitters t1_O, t2_O, . . . , tn_O (see FIG. 1) are used in place of the light sources 110-1 and 110-2 to make a change between the functions as the monitor port and the control port in a time-division manner, there is no need to individually set the aforesaid dedicated monitor ports. Moreover, in the case of carrying out only the monitoring of optical power without depending upon a layer of an optical signal, the light reception circuits 102-1 and 102-2 can have the same function and configuration, and for the analysis of the contents (protocol) of a signal, circuits with a signal analysis function on protocols different in type can be employed therefor.

In addition, the aforesaid light sources 110-1, 110-2 and the light reception circuits 102-1, 102-2 are connected to a control managing unit 400 and the control managing unit 400 is made to confirm the optical outputs of the light sources 110-1 and 110-2 and the light reception powers in the light reception circuits 102-1 and 102-2. The control managing unit 400 is equivalent to means including the above-mentioned management control circuit 103, drive circuit 105 and storage mediums 104 and 106. In addition, the control managing unit 40 is designed to control the optical connection switching facility (optical switch) 101 through the aforesaid drive circuit 105 (omitted in FIG. 28) for periodically changing the output destination of light to be inputted from the aforesaid light sources 110-1 and 110-2 between the aforesaid output ports (A-101 OUT, A-102 OUT) connected the light reception circuits 102-1 and 102-2.

Figure 29:
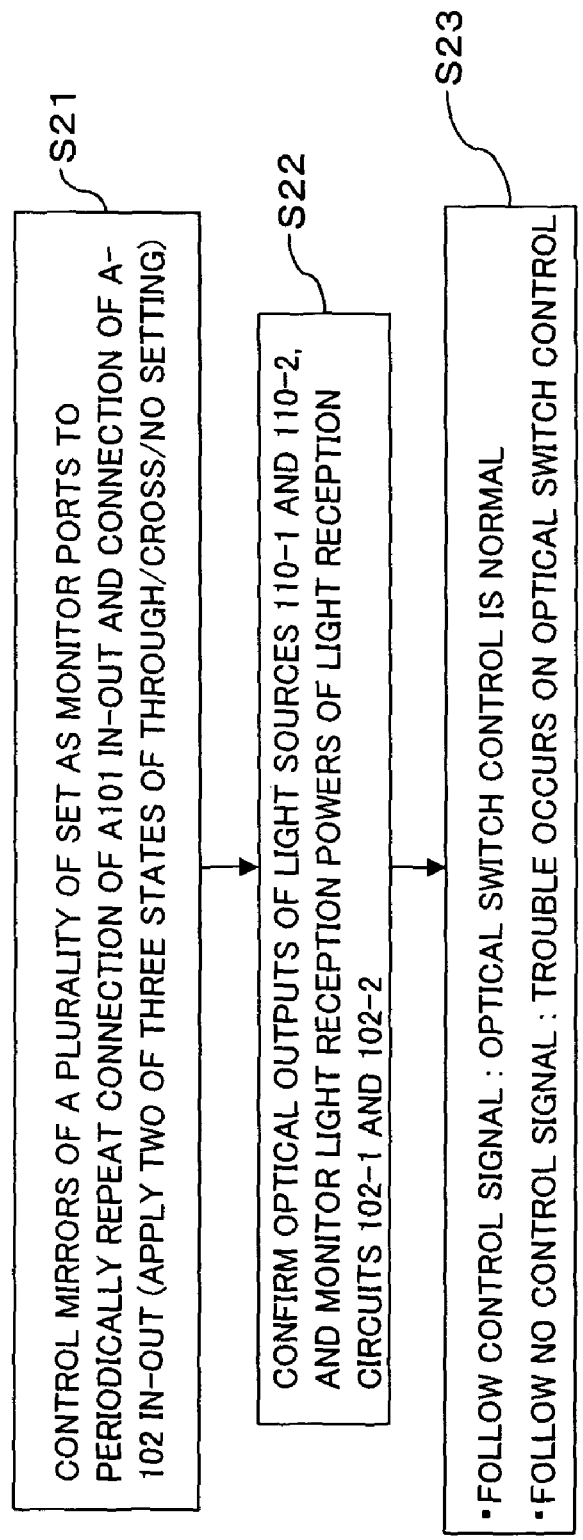
FIG. 29 is a flow chart for explaining a trouble detecting method in the optical connection automatic-switching apparatus shown in FIG. 28.

Referring to FIG. 29, a description will be given hereinbelow of a concrete control procedure (node trouble detecting method) in the control managing unit 400.

(1) The control managing unit 400 controls a mirror (optical deflection means), provided to correspond to the aforesaid monitor port in the optical switch 101, through the drive circuit 105 to periodically repeat the connection (switching) of input/output of each monitor port. At this time, the control managing unit 400 supplies a control signal to the drive circuit 105 so as to take one of two states of three states of through/cross/no setting in the optical switch 101 (see step S21). The "through" state signifies a connection state in which light from the light source 110-1 (or 110-2) is inputted to the light reception circuit 102-1 (or 102-2), and the "cross" state signifies a connection state in which light from the light source 110-1 (or 110-2) is inputted to the light reception circuit 102-2 (or 102-1).

(2) In this periodic connection switching state, the control managing unit 400 confirms the optical outputs of the light sources 110-1 and 110-2 and monitors each of the light reception powers of the light reception circuits 102-1 and 102-2 (step S22).

(3) If the result of the aforesaid monitor shows that the light to the monitor port is repeatedly turned on and off according to the control based on the aforesaid control signal, the control managing unit 400 makes a decision that the optical switch control system (for example, the optical switch 101 and the drive circuit 105) is in a normally operating condition. On the other hand, if the monitor result does not show the operation according to the aforesaid control, it makes a decision that a trouble occurs in the aforesaid optical switch control system (for example, one of or both the optical switches 101 and the drive circuit 105) (step S23).

That is, in this embodiment, the control managing unit 400 functions as a first trouble detecting unit to perform the detection of a trouble of the optical switch 101 by monitoring the light reception states in the light reception circuits 102-1 and 102-2 while switching the connection states between the input ports connected to the light sources 110-1, 110-2 and the output ports connected to the light reception circuits 102-1, 102-2.

In comparison with the method in which, for example, a signal for the confirmation of ping or the like is sent to an optical switch control system to monitor the response state thereto, the employment of the above-described method enables the right of the control to be directly and quickly detected, for that there is no need to wait for the response.

(C2) Trouble Notifying Method

Secondly, a description will be given hereinbelow of a method of quickly notifying trouble information automatically to a spare system when all the links of the optical connection automatic-switching apparatus fall into a disconnection state due to a break of a power supply or the like. The employment of this method enables the spare system itself to detect the shutdown of a work system. This trouble detecting method will be described hereinbelow with reference to FIG. 30.

Figure 30:
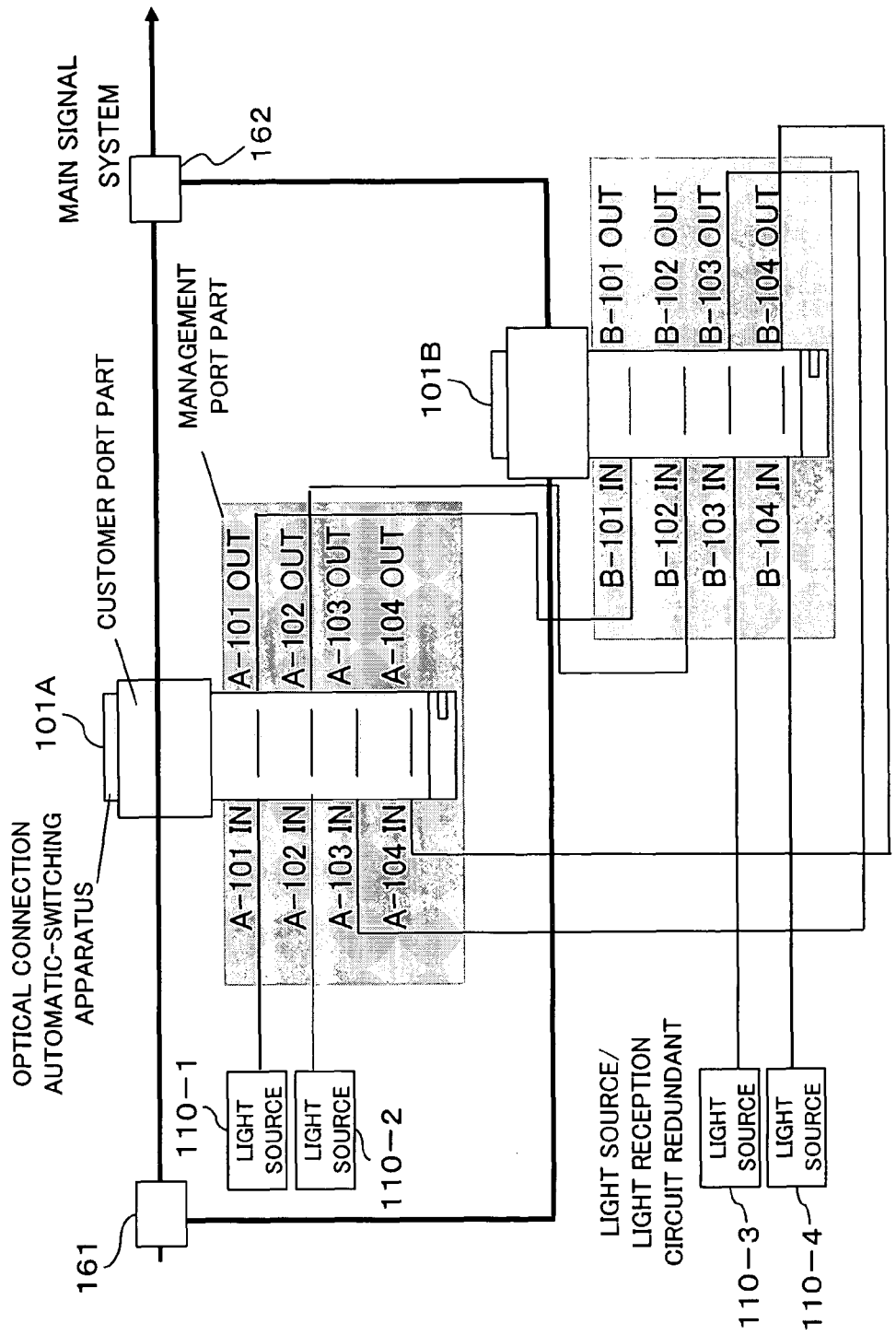
FIG. 30 is a block diagram showing a node redundant configuration based on the configuration shown in FIG. 28.

In FIG. 30, a main signal light is divided into two by an optical coupler 161 and then multiplexed (coupled) by an optical coupler 162 and, in the respective systems, optical connection automatic-switching apparatuses (optical switch 101A and 101B) are put as a work system and a spare system. In more detail, one of branch lights from the former-stage optical coupler 161 is fed to a customer port of the work-system optical switch 101A while the other is fed to a customer port of the spare-system optical switch 101B. Moreover, two or more node trouble confirmation management ports (in this case, four ports A-101 IN/OUT, A-102 IN/OUT, A-103 IN/OUT, A-104 IN/OUT) are prepared (set) for the work-system optical switch 101A, and two or more node trouble confirmation management ports (in this case, four ports B-101 IN/OUT, B-102 IN/OUT, B-103 IN/OUT, B-104 IN/OUT) are also prepared (set) for the spare-system optical switch 101B.

In addition, the light sources (first light sources) 110-1 and 110-2 are connected to the management ports (input ports: in this case, two ports A-101 IN and A-102 IN) of the work-system optical switch 101A, and the corresponding output ports are connected to the management ports (input ports: in this case, two ports B-101 IN and B-102 IN) of the spare-system optical switch 101B. Still additionally, the remaining management ports (input ports: in this case, two ports B-103 IN and B-104 IN) of the spare-system optical switch 101B are connected to the light sources (second light sources) 110-3 and 110-4, and the corresponding output ports (in this case, two ports B-103 OUT and B-104 OUT) are connected to the remaining management ports (in this case, two ports A-103 IN and A-104 IN) of the work-system optical switch 101A.

Moreover, the output optical powers of the output ports of the respective optical switches 101A and 101B are made to be monitored by the control managing units 400, provided in the optical switches 101A and 101B, by way of light reception circuits (not shown) or the like.

That is, this can provide an arrangement in which the optical outputs from the light source 110-1 and 110-2 (or 110-3 and 110-4) of one optical switch 101A (or 101B) are inputted to the other optical switch 101B (or 101A) in a cascaded state to be monitored by one of the control managing units 400 by way of the aforesaid light reception circuit.

Therefore, the main signal lights are transferred in parallel through the customer ports in the optical switches (each of which will hereinafter be referred to equally as a "node") 101A and 101B constituting a redundant configuration, while the lights outputted from the four trouble detection light sources 110-1, 110-2, 110-3 and 110-4 are transferred through the management ports in the optical switches 101A and 101B in a cascaded state, and a trouble occurring in one of the nodes 101A and 101B exerts influence on the other node 101B, 101A constituting a redundant system.

Therefore, each of the control managing units 400 can monitor, through the aforesaid light reception circuit, the optical powers outputted from the two light sources 110-1 and 110-2 or 110-3 and 110-4 to the node 101A, 101B to make a decision on an abnormal equipment by making an inquiry using a trouble detection table 500, for example, shown in FIG. 31. That is, in this embodiment, the control managing unit 400 functions as a second trouble detecting unit to monitor the output optical power (monitor optical power by the light source 110-1, 110-2, 110-3, 110-4) from each output port of one of the nodes 101A and 101B for detecting a trouble of one of the nodes 101A and 101B. For example, the trouble detection table 500 is preserved in the aforesaid storage medium 104 or 106 each of the control managing units 400 can gain access to.

An inquiry method based on the trouble detection table 500 in the management control circuit 103 is as follows.

(1) When no trouble occurs, as indicated by "Case 1" and "Case 3" in the trouble detection table 500, the light reception power in the light reception circuit does not drop with respect to both the nodes 101A and 101B.

(2) When a trouble occurs in the node 101A, as indicated by "Case 2", after passing through the node 101A, a power drop occurs in only the ports (B-101 OUT and B102 OUT) connected to the node 101B, and no power drop occurs in the ports (B-103 OUT and B-104 OUT) going through only the node 101B.

(3) When a trouble occurs in the node 101B, as indicated by "Case 4", after passing through the node 101B, a power drop occurs in only the ports (A-103 OUT and A-104 OUT) connected to the node 101A, and no power drop occurs in the ports (A-101 OUT and A-102 OUT) going through only the node 101A.

Since the other node can singly monitor/detect a trouble of one node on the basis of the above-mentioned criteria for decision, the speeding-up of the switching from the work system to the spare system becomes feasible.

In addition, a combination of the two methods described in the items (C1) and (C2) can achieve more effective trouble detection and classification of the factors thereof.

Incidentally, it is also acceptable that the aforesaid node trouble confirmation ports are also used as the control ports to be connected to the control managing unit 400 as mentioned above. Moreover, although in the above-described configuration two light sources are used for each of the nodes 101A and 101B, the present invention is not limited to this number, and it depends upon a rate of trouble per link port.

(C3) Method of Shifting to Spare System in Link Redundancy Configuration

Furthermore, a description will be hereinbelow of a method for shifting to a spare system in a link redundant configuration described above with reference to FIG. 6 or 7, particularly, of a method of setting a state of a redundant configuration with respect to an equipment information management table (address table) preserved in the aforesaid storage medium 104 or 106 which serves as an equipment information storing unit and a method for shifting thereto.

FIG. 32(A) shows an example of a configuration with link redundancy. As shown in FIG. 32(A), to the optical connection automatic-switching apparatus (optical switch 101), an IT equipment (address=α) (which will hereinafter be referred to as "IT equipment α") is connected through the use of two ports with port numbers=1 and 2, and an IT equipment (address=β) (which will hereinafter be referred to as "IT equipment β") is connected through the use of two ports with port numbers=3 and 4. Incidentally, the "address" of the IT equipment can be used as identification information on this IT equipment and is a physical address (or logical address, alternatively both the physical and logical addresses) of an arbitrary protocol. Moreover, a twin fiber having one optical fiber is connected to each of the input/output ports for each transmission/reception.

In this case, the link redundancy setting is made by (1) producing an address (equipment identification information) table (correspondence table between port number of the optical switch 101 and addresses of the IT equipment α and β) in the control managing unit 400 of the optical connection automatic-switching apparatus and (2) selecting the numbers of ports to be connected to the IT equipment α and β so as to set one as a work system and the other as a spare system. At this time, in the case of a work system being put into operation, the spare system is placed into a non-connection condition.

For example, in FIG. 32(A), the port number=1 connected to the IT equipment α is set as "work" while the port number=2 is set as "spare", and the port number=3 connected to the IT equipment β is set as "work" while the port number=4 is set as "spare". Moreover, the connection destination of the port number=1 connected to the IT equipment α in the normal operation is set, for example, as port number=3 connected to the IT equipment β, and the connection destination of the port number=3 connected to the IT equipment β in the normal operation is set, for example, as port number=1 connected to the IT equipment α.

On the other hand, the connection destination of the port number=2 connected to the IT equipment α at the occurrence of abnormality such as a trouble is set, for example, as port number=4 connected to the IT equipment β, and the connection destination of the port number=4 connected to the IT equipment β at the occurrence of abnormality is set, for example, as port number=2 connected to the IT equipment α. However, an optical signal is outputted from each of the IT equipment α and β in a state placed into a redundant condition and then incident on each port of the optical switch 101. The configuration in this example is only one example, and the number of ports and others are not limited to the above.

The above-mentioned set contents are preserved as an equipment information management table [address (equipment identification information) table] 600 shown in FIG. 32(B) in the storage medium 104 or 106 which serves as an equipment information storing unit of the control managing unit 400. Accordingly, in the normal operation, the IT equipment α and the IT equipment β make communications through the use of a link (work-system optical path) passing through the port numbers=1 and 3, and when the work path falls into abnormality, they make communications through the use of a link (spare-system optical path) passing through the port numbers=2 and 4.

Referring to FIG. 32(C), a description will be given hereinbelow of a switching method at the occurrence of a trouble.

First, the control managing unit 400 always monitors optical signal power transmitted through the work-system optical path through the use of, for example, the above-mentioned light reception circuit 102 (see FIGS. 6 and 7) and, when this power monitor detects an optical power disconnection stemming from the occurrence of a trouble of the work-system optical path (steps S31 and S32), the control managing unit 400 refers to the aforesaid address table 600 (step S33) for changing the connection to a spare-system optical path set in advance (step S34) thereby updating (replacing) the address table 600 (see step S35 and arrow 700 in FIG. 32(B)). That is, in this example, the control managing unit 400 functions as a work/spare switching control unit to, in response to the detection of an optical disconnection of the work port, control the optical switch 101 on the basis of the aforesaid address table 600 for switching the port of the apparatus, which is in use, to a spare port.

In this case, in the aforesaid address table 600, the association of the connection destination in the working state and the connection destination after the switching to the spare system is made as mentioned above, thus realizing the speeding-up of the switching control. Therefore, even if a link trouble occurs, the quick switching to the spare system becomes feasible to shorten the suspension time of the system.

(C4) Method of Shifting to Spare System in Node Redundant Configuration

Meanwhile, in the case of the link redundant configuration mentioned above, because of the redundancy in one optical connection automatic-switching apparatus (node), although possible to cope with a physical path trouble such as optical fiber disconnection, it is impossible to cope with a case in which a trouble occurs in the power supply and the node itself. A description will be given hereinbelow of a means for realizing a node redundant configuration capable of switching a node when a trouble occurs in the node.

Figure 33:
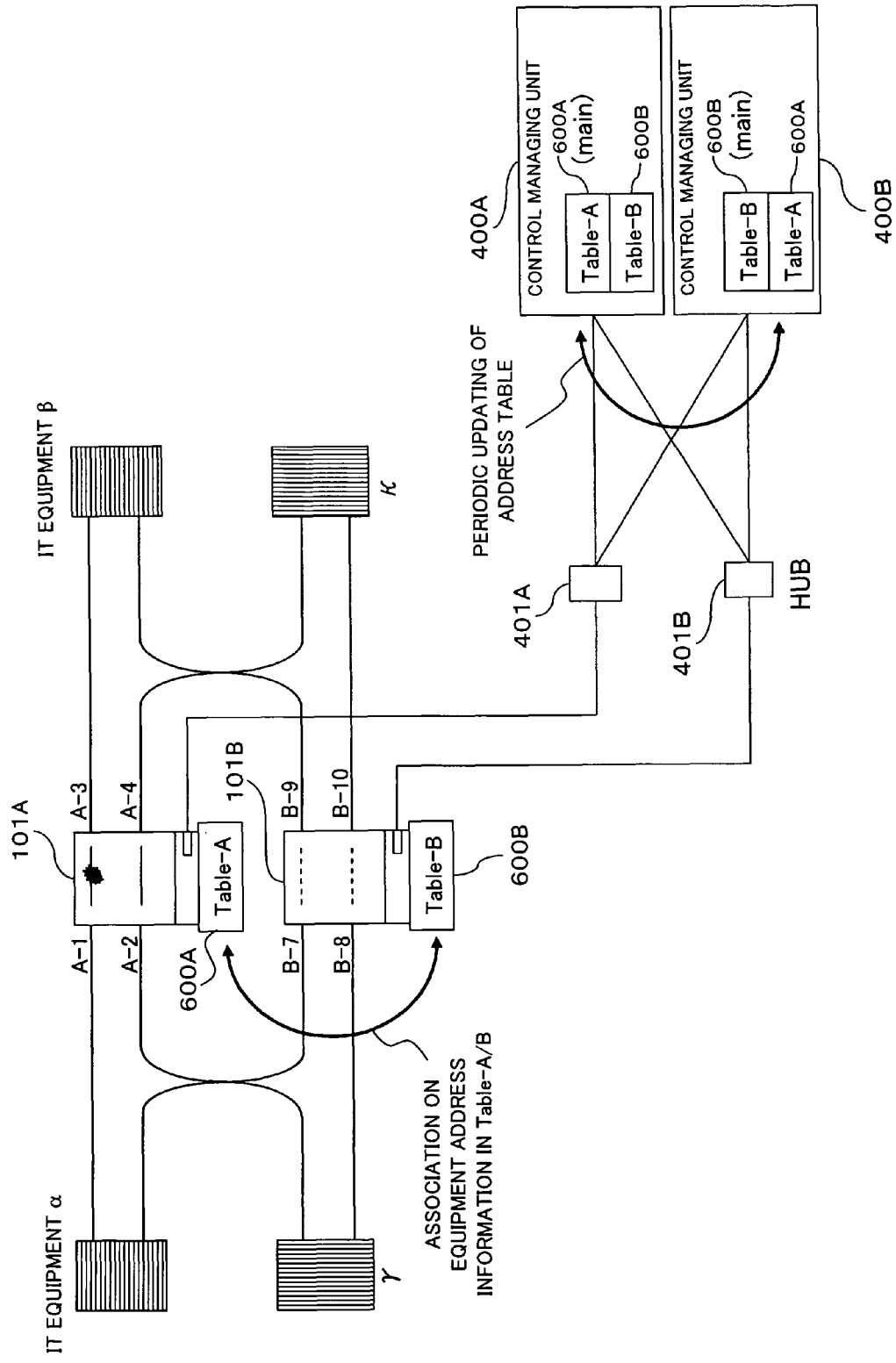
FIG. 33 is a block diagram showing an example of a node redundant configuration according to this embodiment.

FIG. 33 shows one example of a node redundant configuration. This redundant configuration uses two optical switches 101A and 101B. To the nodes (optical switches 101A and 101B), there are connected four IT equipment α, β, γ and κ. The "IT equipment α", "IT equipment β", "IT equipment γ" and "IT equipment κ" signify an IT equipment with an address=α, an IT equipment with an address=β, an IT equipment with an address=γ and an IT equipment with an address=κ, respectively. The "address" is used as identification information on the IT equipment and is a physical address of an arbitrary protocol.

In addition, control managing units 400A and 400B respectively related to the optical switches 101A and 101B are also provided so that the one control managing unit 400A is connected through a hub 401A to the optical switch 101A and the other control managing unit 400B to be communicable thereto and the other control managing unit 400B is connected through a hub 401B to the optical switch 101B and the one control managing unit 400A to be communicable thereto. That is, the control managing units 400A and 400B are connected to each other to be communicable thereto.

In this case, for the link redundancy setting, (1) address (equipment identification information) tables (correspondence tables between the port numbers of the optical switches 101 and the addresses of the IT equipments α, β, γ and κ) 600A and 600B are produced in each of the control managing units 400A and 400B, and (2), after the numbers of the ports to be connected to the same IT equipments α, β, γ and κ are selected, one is set as a work system while the other is set as a spare system. At this time, in a case in which the work system is put into operation, the spare-system link is set in a non-connected state. That is, 600A represents an address table for use in the optical switch 101A and 600B denotes an address table for use in the optical switch 101B, and in the control managing unit 400A, the address table 600A is a work (main) table, while in the control managing unit 400B, the address table 600B is a work (main) table. In the following description, the port numbers=1, 2, 3 and 4 of the optical switch 101A are expressed as A-1, A-2, A-3 and A-4, respectively, and the port numbers=7, 8, 9 and 10 of the optical switch 101B are expressed as B-7, B-8, B-9 and B-10, respectively.

That is, the one (work) control managing unit 400A makes reference to the address tables 600A and 600B under management to make an inquiry about ports which can accept a redundant system with respect to the IT equipments α, β, γ and κ. In the case shown in FIG. 33, the port numbers=A-1 and B-7, the port numbers=A-2 and B-8, the port numbers=A-3 and B-9 and the port numbers A-4 and B-10 are set for a redundant configuration in the control managing unit 400A (in this case, the redundancy setting is updated also in the other control managing unit 400B in a synchronized manner).

In more detail, for example, in FIG. 33, the IT equipment α is connected to the port number=A-1 of the optical switch 101A and the port number=B-7 of the optical switch 101B, the IT equipment β to the port number=A-3 of the optical switch 101A and the port number=B-9 of the optical switch 101B, the IT equipment γ to the port number=A-2 of the optical switch 101A and the port number=B-8 of the optical switch 101B, and the IT equipment κ to the port number=A-4 of the optical switch 101A and the port number=B-10 of the optical switch 101B.

Moreover, the port number A-1 connected to the IT equipment α is set as "work" while the port number=B-7 connected thereto is set as "spare", the port number A-3 connected to the IT equipment β as "work" while the port number=B-9 connected thereto as "spare", the port number A-2 connected to the IT equipment γ as "work" while the port number=B-8 connected thereto as "spare", and the port number A-4 connected to the IT equipment κ as "work" while the port number=B-10 connected thereto as "spare".

In a case in which communications are made between the IT equipments α and β and between the IT equipments γ and κ, the connection destination of the port number=A-1 connected to the IT equipment α in the normal operation is set at, for example, the port number=A-3 connected to the IT equipment β which is the communication partner, the connection destination of the port number=A-3 connected to the IT equipment β in the normal operation at, for example, the port number=A-1 connected to the IT equipment α which is the communication partner, the connection destination of the port number=A-2 connected to the IT equipment γ in the normal operation at, for example, the port number=A-4 connected to the IT equipment κ which is the communication partner, and the connection destination of the port number=A-4 connected to the IT equipment κ in the normal operation at, for example, the port number=A-2 connected to the IT equipment γ which is the communication partner.

On the other hand, the connection destination of the port number=B-7 connected to the IT equipment α at the occurrence of abnormality such as trouble is set at, for example, the port number=B-9 connected to the IT equipment β, and the connection destination of the port number=B-9 connected to the IT equipment β at the occurrence of abnormality at, for example, the port number=B-7 connected to the IT equipment α. Moreover, the connection destination of the port number=B-8 connected to the IT equipment γ at the occurrence of abnormality at, for example, the port number=B-10 connected to the IT equipment κ, and the connection destination of the port number=B-10 connected to the IT equipment κ at the occurrence of abnormality at, for example, the port number=−8 connected to the IT equipment γ. However, an optical signal after placed into a redundant condition is outputted from each of the IT equipments α, β, γ and κ and is incident on each port of the optical switches 101A and 101B. The configuration shown here is one example, and the number of ports and others are not limited to the above description.

The above-described contents are preserved in the storage medium 104 or 106 serving as an equipment information storing unit of each of the control managing units (each of which will be referred to hereinafter as a "control system") in the form of the equipment information management tables (address tables) 600A and 600B, for example, as shown in FIG. 34(A). To the work control system 400A, the address table 600A is a main address table and the address table 600B is a sub address table while, to the spare control system 400B, the address table 600B is a main address table and the address table 600A is a sub address table.

As described above, one control system (management controlling unit 400A or 400B) manages the address tables 600A and 600B of each of the plurality of optical switches 101A and 101B, and the connection relationship of addresses written in the address tables 600A and 600B is managed in a state associated between the plurality of address tables 600A and 600B. For example, the connection relationship among the IT equipments α, β, γ and κ which exists in the one address table 600A is retrieved on the basis of the other address table 600B, and the association on the work/spare port switching is managed in a state converted into the addresses of the IT equipments α, β, γ and κ.

Thus, in comparison with the case in which the switching between the work system and the spare system is made on the basis of the port information (number), (1) the port can arbitrarily be selected and (2) the management is made on the basis of the address, which provide the advantages of making easy the management irrespective of an increase in number of ports without depending upon the number of ports and of enabling the employment of devices different in characteristic such as the number of ports of the plurality of optical switches realizing the redundant configuration. Moreover, since the control systems for managing the plurality of address tables 600A and 600B are placed into a redundant configuration (the control managing units 400A and 400B are prepared), the periodic mutual updating of the address tables 600A and 600B of the plurality of control systems 400A and 400B further enables coping with troubles of the control systems 400A and 400B themselves.

A description will be given hereinbelow of a switching method at the occurrence of a trouble in the node redundant configuration.

First, for example, the one control system 400A grasps the address table 600A as the work-system address table (work table) and also seizes the address table 400B as the spare-system address table (spare table), thereby providing for detection of a trouble. Moreover, the control system 400B is prepared as a spare system for the occurrence of a trouble in the control system 400A. In this case, for providing for the occurrence of a trouble in the control system 400A itself, the spare-system control system 400B makes a communication with the control system 400A and updates its own address tables 600A and 600B at any time to make the synchronization with the address tables 600A and 600B on the work control system 400A side.

Moreover, when the information on a link trouble or a node trouble is notified to the control system 400A according to the trouble detecting methods mentioned above in the items [A] and [B], or the like, the control system 400A selects a switching method according to each trouble.

That is, for example, in a case in which a trouble occurs in a link between the port numbers=A-1 and A-3 of the optical switch 101A (when a trouble occurs on an input/output port in the work optical switch), as shown in FIGS. 34(A) and 34(B), the control system 400A grasping the address tables 600A and 600B makes comparison and reference to the address tables 600A and 600B to switch only a portion of ports, where the trouble has occurred, to a spare system. That is, the IT equipment α and β, which have made communications through the work optical path running between the port numbers=A-1 and A-3, newly make communications through the use of, as a work optical path, the spare-system path running between the port numbers B-7 and B-9.

Figure 35:
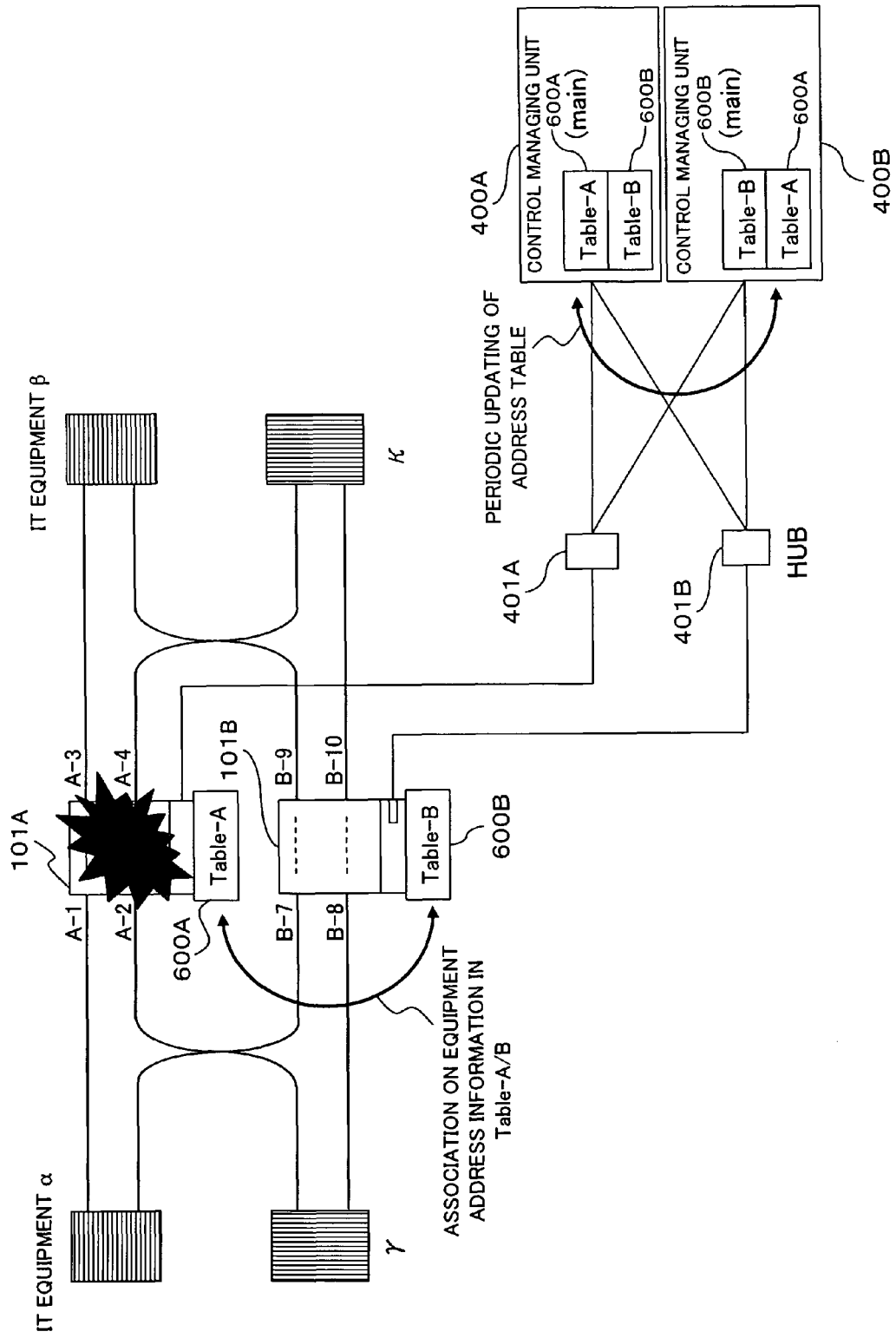
FIG. 35 is a block diagram showing an example of a node redundant configuration according to this embodiment.

On the other hand, for example, in a case in which a node trouble occurs in the node 101A itself as shown in FIG. 35, as shown in FIGS. 36(A) and 36(B), the control system 400A, which has grasped the address tables 600A and 600B, makes comparison and reference to the address tables 600A and 600B to collectively switch all the ports of the optical switch 101A, in which the trouble has occurred, to all the connection ports of the spare optical switch 101B.

That is, in this example, control system 400A (400B) functions as a work/spare switching control unit to, when a trouble (link trouble or node trouble) occurs in an input/output port of the work optical switch 101A or in the work optical switch 101A itself, control each of the optical switches 101A and 110B on the basis of the aforesaid tables 600A and 600B for switching the port, which is in use in the equipment, to an input/output port of the spare optical switch 101B.

At this time, since the retransmission history log becomes large, in addition to the implementation of the switching, this fact (information) is notified to a management server or a manager of each user connected for executing the control of indicating that the retransmission is not a trouble or of masking the retransmission history.

As mentioned above, in the case of a node redundant configuration, in response to the detection of a trouble (link trouble or node trouble), the control system 400A makes reference to the address tables 600A and 600B of each of the work/spare nodes 101A and 101B in a state associated with each other to carry out the port switching and updates the contents of each of the address tables 600A and 600B. At this time, the main table it grasps (the table 600A in the case of the control system 400A, and the table 600B to the control system 400B) is also updated. Moreover, when the control system is also placed into a redundant condition as mentioned above, at the updating of the work address tables 600A and 600B, both the work and spare main tables 600A and 600B are updated in a synchronized condition.

That is, in this example, the control system 400A (400B) also functions as a table synchronization updating unit to update the contents of its own tables 600A and 600B in synchronism with the contents of the table 600A and 600B in the other control system 400B (400A).

Through the use of the above-described procedure, even if a trouble occurs in a power supply or a node itself, the quick switching to the spare system becomes feasible, thus shortening the suspension time of the system.

As described above, when the optical connection automatic-switching apparatus is placed into a redundant condition, the speeding-up of detection of a trouble point based on the detection in a physical layer becomes feasible Moreover, since the switching can be made by making reference to the equipment address, the easy and quick switching to the spare system becomes possible. Still moreover, since the employment of the above-described technique can shorten the time of the system shutdown or the time needed for the switching to the spare system, it is possible to shorten the time of the suspension of the system, thus improving the reliability of the network system employing the optical connection automatic-switching apparatus.

Figure 37:
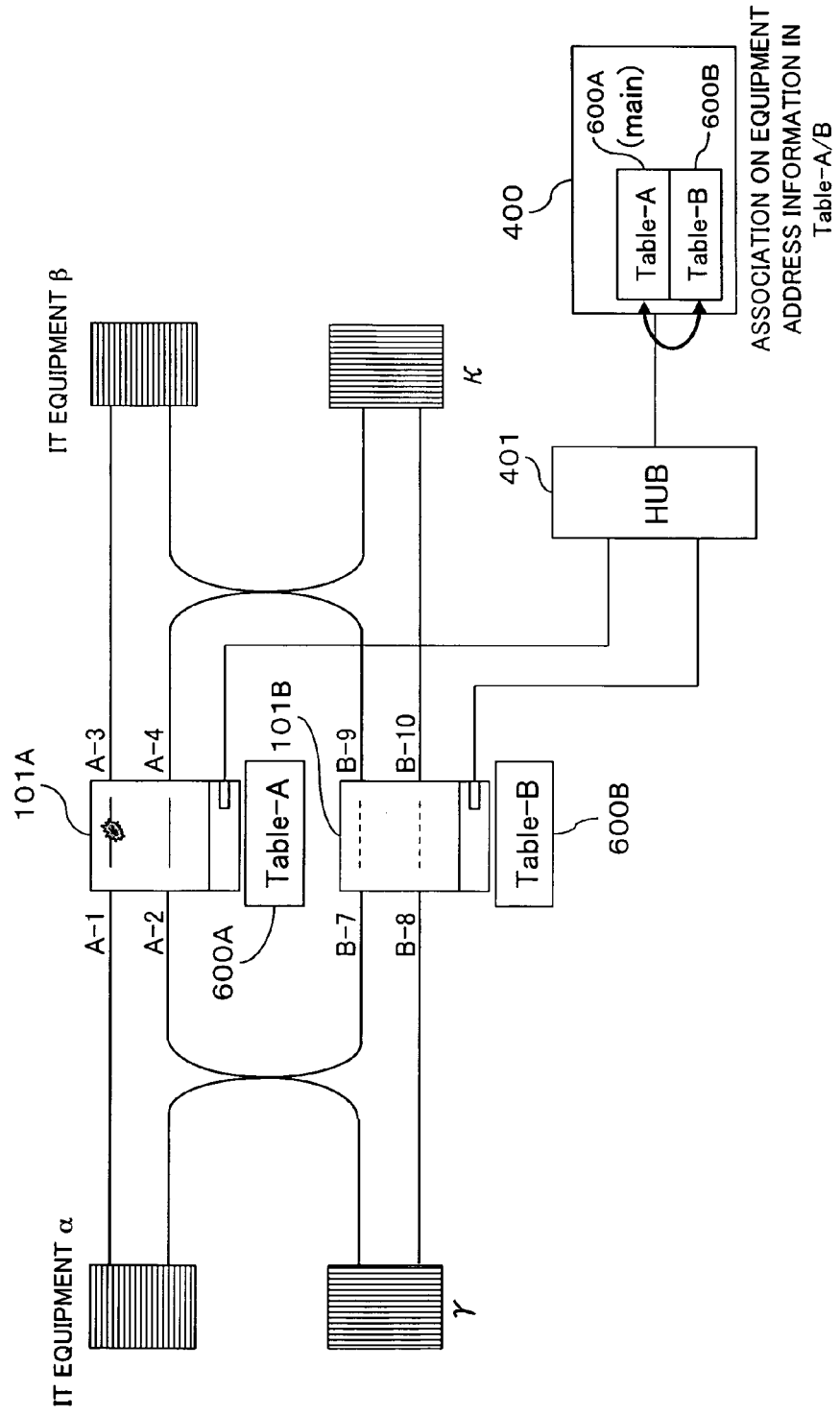
FIG. 37 is a block diagram showing a configuration in a case in which the control system is one in number in the node redundant configuration shown in FIG. 33 or 35.

Although in the above-described examples a control system also has a redundant configuration for providing for a trouble of the control system itself, for example, as shown in FIG. 37, it is also acceptable that a single control system 400 manages the address tables 600A and 600B. That is, in this case, the control system 400 is connected through the hub 401 to the optical switches 101A and 101B. Also in this configuration, in the control system 400, the connection relationship between the addresses written in the address tables 600A and 600B is managed in a state associated between the plurality of address tables 600A and 600B.

In this case, for example, as shown in FIG. 38, the management can also be made through different address tables 600A and 600B and, for example, as shown in FIG. 39, the management can also be made through a single address table 600 in a manner such that the two optical switches 101A and 101B are virtually handled as an input/output port (common port) of one optical switch.

It should be understood that the present invention is not limited to the above-described embodiments, and that it is intended to cover all changes and modifications of the embodiments of the invention herein which do not constitute departures from the spirit and scope of the invention.

As described above in detail, the optical connection switching apparatus according to the present invention can automatically achieve the equipment connection management and the connection switching of an optical network at the re-construction of the optical network and at the occurrence of a trouble and, hence, these works are considerably reducible, and the maintenance, operation and management costs for an optical network such as an optical LAN, constructed using this optical connection automatic-switching apparatus, are considerably reducible. Therefore, it can be considered as being extremely useful in the technical fields of optical communications.

What is claimed is:

1. An optical connection switching apparatus to which a plurality of equipment each having an optical communication interface are connected and which is made to establish an optical connection between different equipment of said plurality of equipment, said optical connection switching apparatus comprising:

an optical connection switching facility which has a plurality of an optical input/output ports each of which includes a pair of an optical input port and an optical output port and making a connection between any one of said optical input ports and any one of said optical output ports;
one or more optical transmitting/receiving units connected to a portion of said optical input/output ports; and
a management control unit which manages a connection between a respective optical input/output port of said plurality of optical input/output ports connected to a respective optical transmitting/receiving unit of said one or more optical transmitting/receiving units and a different respective optical input/output port of said plurality of optical input/output ports connected to a respective equipment of said plurality of equipment according to information on said respective equipment, the information being acquired by making a communication with said respective equipment through the use of said respective optical transmitting/receiving unit; and
wherein the plurality of optical transmitting/receiving units is connected to said optical input/output ports so as to correspond to a plurality of types of optical communication interfaces to be provided in said equipment, and
said management control unit includes an interface scanning unit which controls said optical connection switching facility to make connections between said optical input/output ports connected to said plurality of optical transmitting/receiving units and the optical input/output port connected to said equipment in a circulating fashion for acquiring the information on said equipment through the use of said optical transmitting/receiving units.

2. The optical connection switching apparatus according to claim 1, wherein said management control unit includes an equipment information storing unit which stores identification information on said respective equipment as equipment information, which is information on said respective equipment acquired by the communication with said respective equipment, in a state associated with information on said different respective optical input/output port.

3. The optical connection switching apparatus according to claim 1, wherein said management control unit includes an equipment state monitoring unit which monitors a connection, disconnection or communication state of said respective equipment by monitoring optical power information on said different respective optical input/output port.

4. The optical connection switching apparatus according to claim 3, further comprising:
a light-receiving element which receives light branched from the optical input port of said different respective optical input/output port, and
said equipment state monitoring unit is constructed as an input port equipment state monitoring unit which, when a quantity of light received by said light-receiving element is employed as said optical power information, monitors the connection, disconnection or communication state of said respective equipment by monitoring a variation of said optical power information.

5. The optical connection switching apparatus according to claim 3, further comprising:
a light-receiving element which receives light branched from the optical output port of said different respective optical input/output port, and
said equipment state monitoring unit is constructed as an output port equipment state monitoring unit which controls said optical connection switching facility so that, when a quantity of light reception by said light-receiving element is employed as said optical power information, the connection, disconnection or communication state of said respective equipment is monitored by monitoring a variation of said optical power information.

6. The optical connection switching apparatus according to claim 3, further comprising:
a light-receiving element provided in the optical output port of said different respective optical input/output port, and
said equipment state monitoring unit is constructed as a port turn-around connection equipment state monitoring unit which controls said optical connection switching facility to make direct coupling between the optical input port of said different respective optical input/output port and an optical output port which is not connected to said respective equipment so that, when a quantity of light reception by said light-receiving element is employed as said optical power information, the connection, disconnection or communication state of said equipment is monitored by monitoring a variation of said optical power information.

7. The optical connection switching apparatus according to claim 3, further comprising:
a light-receiving element provided in a respective optical output port of a respective optical input/output port, and
said equipment state monitoring unit is constructed as an adjacent port connection equipment state monitoring unit which controls said optical connection switching facility to make direct coupling between an optical input port and an optical output port which are adjacent to each other.

8. The optical connection switching apparatus according to claim 3, wherein, when one of said equipment is connected to two of said input/output ports so that one is used as a working port and the other is used as a spare port, said management control unit includes a work/spare switching control unit which, when said equipment state monitoring unit detects an optical disconnection on said working port, controls said optical connection switching facility to switch a port to be used for said equipment to said spare port.

9. The optical connection switching apparatus according to claim 1, wherein said management control unit includes:
an equipment information storage unit which stores identification information on said respective equipment as equipment information, which is information on said respective equipment acquired by the communication with said respective equipment, in a state associated with information on said different respective optical input/output port;
an optical power information storage unit which stores optical power information on said different respective optical input/output port; and
an equipment state monitoring unit which monitors connection, disconnection or communication state of said respective equipment on the basis of said equipment information in said equipment information storage unit and said optical power information in said optical power information storage unit.

10. The optical connection switching apparatus according to claim 9, wherein said management control unit includes an inter-port connection control unit which carries out inter-port connection control in said optical connection switching facility on the basis of said equipment information in said equipment information storage unit.

11. The optical connection switching apparatus according to claim 9, wherein a light-receiving element is provided in a respective optical input port of said optical connection switching facility, and said equipment state monitoring unit is constructed as an input port equipment state monitoring unit which, when a quantity of light reception by said light-receiving element is employed as said optical power information, monitors the connection, disconnection or communication state of said respective equipment by monitoring a variation of said optical power information.

12. The optical connection switching apparatus according to claim 9, wherein a light-receiving element is provided in a respective optical output port of said optical connection switching facility, and said equipment state monitoring unit is constructed as an output port equipment state monitoring unit which controls said optical connection switching facility to make a connection between a respective optical input port which is connected to said equipment and said respective optical output port which is not connected to said equipment so that, when a quantity of light reception by said light-receiving element is employed as said optical power information, the connection, disconnection or communication state of said equipment is monitored by monitoring a variation of said optical power information.

13. The optical connection switching apparatus according to claim 12, wherein said output port equipment state monitoring unit includes a port circulation connection control unit which controls said optical connection switching facility to make connections of said plurality of optical input ports connected to said equipment with said respective optical output port, non-connected to said equipment and serving as an optical power monitoring port, in a circulating fashion.

14. The optical connection switching apparatus according to claim 13, wherein a plurality of optical power monitoring ports each corresponding to said optical power monitoring port are provided to monitor the optical power information on said optical input/output ports in said optical connection switching facility in a sharing fashion.

15. The optical connection switching apparatus according to claim 9, wherein a light-receiving element is provided in a respective optical output port of said optical connection switching facility, and said equipment state monitoring unit is constructed as a port turn-around connection equipment state monitoring unit which controls said optical connection switching facility so that, when a quantity of light reception by said light-receiving element is employed as said optical power information, the connection, disconnection or communication state of said respective equipment is monitored by monitoring a variation of said optical power information.

16. The optical connection switching apparatus according to claim 9, wherein a light-receiving element is provided in a respective optical output port of said optical connection switching facility, and said equipment state monitoring unit is constructed as an adjacent port connection equipment state monitoring unit which controls said optical connection switching facility so that, when a quantity of light reception by said light-receiving element is employed as said optical power information, a connection, disconnection or communication state of said respective equipment is monitored by monitoring a variation of said optical power information.

17. The optical connection switching apparatus according to claim 9, wherein, when one of said equipment is connected to two of said input/output ports so that one is used as a work port and the other is used as a spare port, said management control unit includes a work/spare switching control unit which, when said equipment state monitoring unit detects an optical disconnection on said working port, controls said optical connection switching facility to switch a port to be used for said equipment to said spare port.

18. The optical connection switching apparatus according to claim 1, wherein said management control unit includes an inter-port connection control unit which carries out inter-port connection control in said optical connection switching facility on the basis of the equipment information stored in an equipment information storage unit provided in said management control unit.

19. The optical connection switching apparatus according to claim 1, further comprising:

an optical branch circuit provided with respect to one of or both the optical input port and the output port of said different respective optical input/output port in said optical connection switching facility, and one of outputs of said optical branch circuit is connected as main signal light to said optical connection switching facility while the other is connected as monitor control light thereto, and said management control unit controls said optical connection switching facility to make a connection between an optical input/output port connected to a respective optical transmitting/receiving unit and an optical input/output port connected to said monitor control light for acquiring information on said respective equipment from said monitor control light through the use of said respective optical transmitting/receiving unit and managing it, and further monitors information on optical power of said different respective optical input/output port.

20. The optical connection switching apparatus according to claim 19, wherein a monitor control optical branch circuit is provided which further divides said monitor control light and one of outputs of said monitor control optical branch circuit is connected to said optical connection switching facility, and said management control unit is made to monitor the other output of said monitor control optical branch circuit for monitoring information on optical power of said different respective input/output port.

21. The optical connection switching apparatus according to claim 1, further comprising:

a light source connected to one of said input ports of said optical connection switching facility; and a light reception circuit connected to one of said output ports of said optical connection switching facility, said management control unit further comprising a first trouble detecting unit designed to make detection of a trouble of said optical connection switching facility by monitoring a light reception state in said light reception circuit while switching a connection state between said input port connected to said light source and said output port connected to said light reception circuit.

22. The optical connection switching apparatus according to claim 1, wherein at least said optical connection switching facility and said management control unit are placed into a redundant condition, and a first light source connected to one of said input ports of one optical connection switching facility and a second light source connected to one of said input ports of the other optical connection switching facility are provided so that an output port of said one optical connection switching facility which outputs light from said first light source is connected to an input port other than said input port connected to said second light source of the other optical connection switching facility and an output port of the other optical connection switching facility which outputs light from said second light source is connected to an input port other than said input port connected to said first light source of said one optical connection switching facility, and said management control unit further includes a second trouble detecting unit designed to make detection of a trouble of one of said optical connection switching facilities by monitoring an output light power from each of said output ports of said optical connection switching facility.

23. The optical connection switching apparatus according to claim 1, wherein, when one equipment is connected to two of said input/output ports to use one as a work port and the other as a spare port, said management control unit includes:
    an equipment information storing unit which stores an equipment identification information table in which identification information on said equipment connected to said optical connection switching facility is associated with information on said work port and said spare port; and
    a work/spare switching control unit which, when an optical disconnection on said work port is detected, controls said optical connection switching facility on the basis of said equipment identification information table in said equipment information storing unit to make the switching from the port used by the equipment to said spare port.

24. The optical connection switching apparatus according to claim 1, wherein at least said optical connection switching facility and said management control unit are placed into a redundant condition, and
    said management control unit includes:
    an equipment information storing unit which stores a main equipment identification information table in which identification information on equipment connected to a work optical connection switching facility is associated with information on an input/output port of said work optical connection switching facility and a sub equipment identification information table in which identification information on equipment connected to a spare optical connection switching facility is associated with information on an input/output port of said spare optical connection switching facility;
    a work/spare switching control unit which, when a trouble occurs in said input/output port of said work optical connection switching facility or said work optical connection switching facility itself, controls each of said optical connection switching facilities on the basis of each of said tables on said optical connection switching facility for switching the port used by said equipment to said input/output port of said spare optical connection switching facility; and
    a table synchronization updating unit which controls the contents of each of said tables in said management control unit, it pertains to, in synchronism with the contents of each of said tables in the other management control unit.

25. The optical connection switching apparatus according to claim 1, wherein at least said optical connection switching facility is placed into a redundant condition, and
    said management control unit includes:
    an equipment information storing unit which stores a main equipment identification information table in which identification information on equipment connected to a work optical connection switching facility is associated with information on an input/output port of said work optical connection switching facility and a sub equipment identification information table in which identification information on equipment connected to a spare optical connection switching facility is associated with information on an input/output port of said spare optical connection switching facility; and
    a work/spare switching control unit which, when a trouble occurs in said input/output port of said work optical connection switching facility or said work optical connection switching facility itself, controls each of said optical connection switching facilities on the basis of each of said tables on said optical connection switching facility for switching the port used by said equipment to said input/output port of said spare optical connection switching facility.

26. The optical connection switching apparatus according to claim 25, wherein said input/output ports of said optical connection switching facilities are virtually handled as a common port of one optical connection facility to manage the contents of said tables as one table in said equipment information storing unit.

27. An optical connection switching apparatus to which a plurality of equipment each having an optical communication interface are connected and which is made to establish an optical connection between different equipment of said plurality of equipment, said optical connection switching apparatus comprising:
    an optical connection switching facility which has a plurality of an optical input/output ports each of which includes a pair of an optical input port and an optical output port and making a connection between any one of said optical input ports and any one of said optical output ports;
    one or more optical transmitting/receiving units connected to a portion of said optical input/output ports; and
    a management control unit which manages a connection between a respective optical input/output port of said plurality of optical input/output ports connected to a respective optical transmitting/receiving unit of said one or more optical transmitting/receiving units and a different respective optical input/output port of said plurality of optical input/output ports connected to a respective equipment of said plurality of equipment according to information on said respective equipment, the information being acquired by making a communication with said respective equipment through the use of said respective optical transmitting/receiving unit; and
    wherein said optical transmitting/receiving unit is constructed as a multi-interface handling optical transmitting/receiving unit which has a plurality of types of communication functions corresponding to a plurality of types of optical communication interfaces to be provided in said equipment, and
    said management control unit includes an interface scanning unit which selects and sets said communication functions of said optical transmitting/receiving unit in a circulating fashion to acquire the information on said equipment through the use of said optical transmitting/receiving unit.

28. A management control unit for an optical connection switching apparatus which includes an optical connection switching facility having a plurality of optical input/output ports each of which is composed of a pair of an optical input port and an optical output port and making a connection between any one of said optical input ports and any one of said optical output ports, with each of a plurality of equipment each having an optical communication interface being connected to any one of said optical input/output ports to establish an optical connection between different equipment of said plurality of equipment, said management control unit comprising:
one or more optical transmitting/receiving units connected to a portion of said optical input/output ports; and
a management control section which manages a connection between a respective optical input/output port of said plurality of optical input/output ports connected to a respective optical transmitting/receiving unit of said one or more optical transmitting/receiving units and a different respective optical input/output port of said plurality of optical input/output ports connected to a respective equipment of said plurality of equipment according to information on said respective equipment, the information being acquired by making a communication with said respective equipment through the use of said respective optical transmitting/receiving unit; and
wherein the plurality of optical transmitting/receiving units is connected to said optical input/output ports so as to correspond to a plurality of types of optical communication interfaces to be provided in said equipment, and
said management control unit includes an interface scanning unit which controls said optical connection switching facility to make connections between said optical input/output ports connected to said plurality of optical transmitting/receiving units and the optical input/output port connected to said equipment in a circulating fashion for acquiring the information on said equipment through the use of said optical transmitting/receiving units.

29. An optical connection switching apparatus connected to a plurality of equipment each having an optical communication interface for establishing an optical connection between different equipment of said plurality of equipment, said optical connection switching apparatus comprising:
an optical connection switching facility which has a plurality of optical input/output ports each of which includes a pair of an optical input port and an optical output port and making a connection between any one of said optical input ports and any one of said optical output ports;
a plurality of optical receivers;
an optical branch circuit which branches light from one of or both of the optical input port and the optical output port of a pair a respective optical input/output port in said optical connection switching facility into first and second branched lights, with one of the first and second branched lights being connected to said optical connection switching facility and the other of said first and second branched lights being received by a respective optical receiver of said plurality of optical receivers; and
a management control unit which manages a connection between different optical input/output ports of said plurality of optical input/output ports according information on respective equipment of said plurality of equipment from said other of the first and second branched lights received by the respective optical receiver and managing said information; and
wherein said plurality of optical receivers is connected to said optical input/output ports in said optical connection switching facility so as to correspond to a plurality of types of optical communication interfaces to be provided in said equipment, and
said management control unit includes an interface scanning unit which controls said optical connection switching facility to make connections between said optical input/output ports connected to said plurality of optical receivers and the optical input/output port connected to said equipment in a circulating fashion for acquiring the information on said equipment through the use of said plurality of optical receivers.

* * * * *